US012705831B2

(12) United States Patent
Lotti et al.

(10) Patent No.: US 12,705,831 B2
(45) Date of Patent: Aug. 11, 2026

(54) USING TWO-DIMENSIONAL IMAGES OF A SUBJECT AND TARGET MODELS TO GENERATE NOTIFICATIONS IDENTIFYING FACIAL FEATURE VARIATION

(71) Applicant: Brilliance of Beauty, Inc., New York, NY (US)

(72) Inventors: Sahara Lotti, North Hollywood, CA (US); Jesse Chang, Palo Alto, CA (US)

(73) Assignee: Brilliance of Beauty, Inc., North Hollywood, CA (US)

( * ) Notice: Subject to any disclaimer, the term of this patent is extended or adjusted under 35 U.S.C. 154(b) by 0 days.

(21) Appl. No.: 19/174,768

(22) Filed: Apr. 9, 2025

(65) Prior Publication Data

US 2025/0322601 A1 Oct. 16, 2025

Related U.S. Application Data

(60) Provisional application No. 63/632,430, filed on Apr. 10, 2024.

(51) Int. Cl.

*G06T 17/00* (2006.01)
*G06V 10/74* (2022.01)
*G06V 40/16* (2022.01)

(52) U.S. Cl.

CPC ............ *G06T 17/00* (2013.01); *G06V 10/761* (2022.01); *G06V 40/171* (2022.01)

(58) Field of Classification Search

CPC . G06T 11/00; G06T 5/60; G06T 2207/20081; G06V 10/774; G06F 40/284
USPC .......................................................... 345/418
See application file for complete search history.

(56) References Cited

U.S. PATENT DOCUMENTS

| | | | | |
|---|---|---|---|---|
| 10,282,914 B1 * | 5/2019 | Tran | A61B 5/1036 |
| 11,428,960 B2 * | 8/2022 | Fonte | G06F 16/22 |
| 12,118,821 B1 * | 10/2024 | Lotti | G06V 10/82 |
| 12,293,604 B1 * | 5/2025 | Lotti | G06V 40/171 |
| 2016/0210602 A1 * | 7/2016 | Siddique | G16H 10/60 |
| 2023/0120253 A1 * | 4/2023 | Li | G06T 19/20 345/423 |

(Continued)

FOREIGN PATENT DOCUMENTS

CN 118674733 A * 9/2024

OTHER PUBLICATIONS

Lingenfelter, B., 2021. Face Captioning Using Prominent Feature Recognition (Master's thesis, University of Nevada, Reno).*

(Continued)

*Primary Examiner* — Phu K Nguyen
(74) *Attorney, Agent, or Firm* — Lowenstein Sandler LLP

(57) ABSTRACT

A first two-dimensional (2D) image data corresponding to a first 2D image of a human face of a subject is received. First metrics corresponding to a first target model of a target human face are identified among multiple target models. Second metrics that represent one or more facial features of the human face of the subject are generated based on the first 2D image data. Variation information identifying one or more differences between the first metrics corresponding to the first target model of the target human face and the second metrics that represent the one or more facial features of the human face of the subject is determined. A notification reflecting the variation information is provided to a client device.

19 Claims, 20 Drawing Sheets

(56) References Cited

U.S. PATENT DOCUMENTS

| | | | | |
|---|---|---|---|---|
| 2024/0020826 | A1* | 1/2024 | Wiley | G06T 7/0014 |
| 2025/0111655 | A1* | 4/2025 | Povalyaev | G06T 11/00 |

OTHER PUBLICATIONS

Pallett PM, Link S, Lee K. New "golden" ratios for facial beauty. Vision research. Jan. 25, 2010;50(2): 149-54.*

Aarabi P. Hughes D, Mohajer K, Emami M. The automatic measurement of facial beauty. In2001 IEEE International Conference on Systems, Man and Cybernetics. e-Systems and e-Man for Cybernetics in Cyberspace (Cat. No. 01CH37236) Oct. 7, 2001 (vol. 4, pp. 2644-2647). IEEE.*

* cited by examiner

SERVER MACHINE 150
BEAUTY PRODUCTS MODULE 151

MODEL 160

SERVER MACHINE 140
TRAINING ENGINE 141

SERVER MACHINE 130
TRAINING SET GENERATOR 131

CLIENT DEVICE 110
APPLICATION 119
BEAUTY PRODUCTS MODULE 151
UI 112

NETWORK 104

DATA STORE 106
BEAUTY PRODUCTS DATABASE 125

PLATFORM API ENDPOINT 121
BEAUTY PRODUCTS PLATFORM 120
BEAUTY PRODUCTS MODULE 151
MODEL 160
MODEL OUTPUT 165
UI CONTROL MODULE 124

Example lash configuration information (from inner corner to outer corner):
Style info: X, X, X, X, X
Length info (mm): 8, 9, 10, 11, 12
Color info: Black
Position info: A, B, C, D, E
Location info: Arrange from inner corner (start) to outer corner (end) 835

USING TWO-DIMENSIONAL IMAGES OF A SUBJECT AND TARGET MODELS TO GENERATE NOTIFICATIONS IDENTIFYING FACIAL FEATURE VARIATION

RELATED APPLICATIONS

This application claims the benefit of U.S. Provisional Application No. 63/632,430, filed Apr. 10, 2024, which is incorporated by reference herein in its entirety.

TECHNICAL FIELD

Aspects and embodiments of the disclosure relate to data processing, and more specifically, to using two-dimensional images and target models to generate notification of facial feature variation.

BACKGROUND

Image processing can include the manipulation of digital images using various techniques and algorithms to improve their quality, extract useful information, or perform specific tasks.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An embodiment of the disclosure provides a computer-implemented method comprising receiving, by a processing device, first two-dimensional (2D) image data corresponding to a first 2D image of a human face of a subject; identifying, among a plurality of target models, first metrics corresponding to a first target model of a target human face; generating, based on the first 2D image data, second metrics that represent one or more facial features of the human face of the subject; determining variation information identifying one or more differences between the first metrics corresponding to the first target model of the target human face and the second metrics that represent the one or more facial features of the human face of the subject; and providing, to a client device, a notification reflecting the variation information.

In some embodiments, providing the notification identifies user instructions pertaining to the application of beauty products to decrease the one or more differences.

In some embodiments, the method further comprises: generating, based on the variation information, a visual indicator that reflects the one or more differences between the first metrics corresponding to the first target model of the target human face and the second metrics that represent the one or more facial features of the human face of the subject; and generating the notification by compositing the visual indicator with the first 2D image of the human face of the subject.

In some embodiments, the first target model is a first target 3D model, the method further comprising: wherein generating, based on the first 2D image data, the second metrics that represent the one or more facial feature of the human face of the subject comprises: generating, using the first 2D image data, a first three-dimensional (3D) model of the human face of the subject, wherein the second metrics correspond to the first 3D model; wherein generating the visual indicator comprises: generating a modified 3D model of the human face of the subject based on the first 3D model of the human face of the subject and the first target 3D model of the target human face, the modified 3D model comprising a region corresponding to the one or more differences between the first metrics corresponding to the first target 3D model and the second metrics corresponding to the first 3D model; and wherein generating the notification by compositing the visual indicator on the first 2D image of the human face of the subject comprises: compositing the modified 3D model with the first 2D image of the human face.

In some embodiments, the method further comprises: receiving second 2D image data corresponding to a second 2D image of the human face of the subject, the second 2D image of the human face comprising a representation of a beauty product applied at a region of the human face of the subject; generating, based on the second 2D image data, third metrics that represent the one or more facial features with the applied beauty product; determining additional variation information identifying one or more additional differences between the first metrics corresponding to the first target model and the third metrics that represent the one or more facial features with the applied beauty product; generating, based on the additional variation information, an additional visual indicator that reflects the one or more additional differences between the first metrics and the third metrics; and generating the notification by composing the additional visual indicator to the second 2D image of the human face of the subject.

In some embodiments, identifying, among the plurality of target models, the first metrics corresponding to the first target model of the target human face comprises: providing an indication of the plurality of target models for user selection at the client device; and receiving, from the client device, an indication of a user selection of the first target model from the plurality of target models.

In some embodiments, generating the first 3D model of the human face of the subject, comprises: identifying a landmark corresponding to a facial feature of the one or more facial features of the human face of the subject.

In some embodiments, generating the modified 3D model of the human face comprises: determining a difference between the landmark corresponding to the facial feature of the human face of the subject and a target landmark of the first target 3D model of the target human face, wherein the target landmark corresponds to the landmark.

In some embodiments, the first metrics comprise a first ratio of a first target facial feature to a second target facial feature, wherein the second metrics comprise a second ratio of a first facial feature of the one or more facial features to a second facial feature of the one or more facial features of the human face of the subject, and wherein the variation information identifies a difference between the first ratio and the second ratio.

In some embodiments, the first 3D model comprises a geometric model.

In some embodiments, generating, using the first 2D image data, of the second metrics that represent the one or more facial features of the human face of the subject, comprises: providing the first 2D image data as input to a machine learning model; and obtaining one or more outputs of the machine learning model, the one or more outputs identifying the second metrics.

A further embodiment(s) of the disclosure provides a system comprising: a memory; and a processing device, coupled to the memory, the processing device to perform a method according to any aspect or embodiment described herein. A further embodiment(s) of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
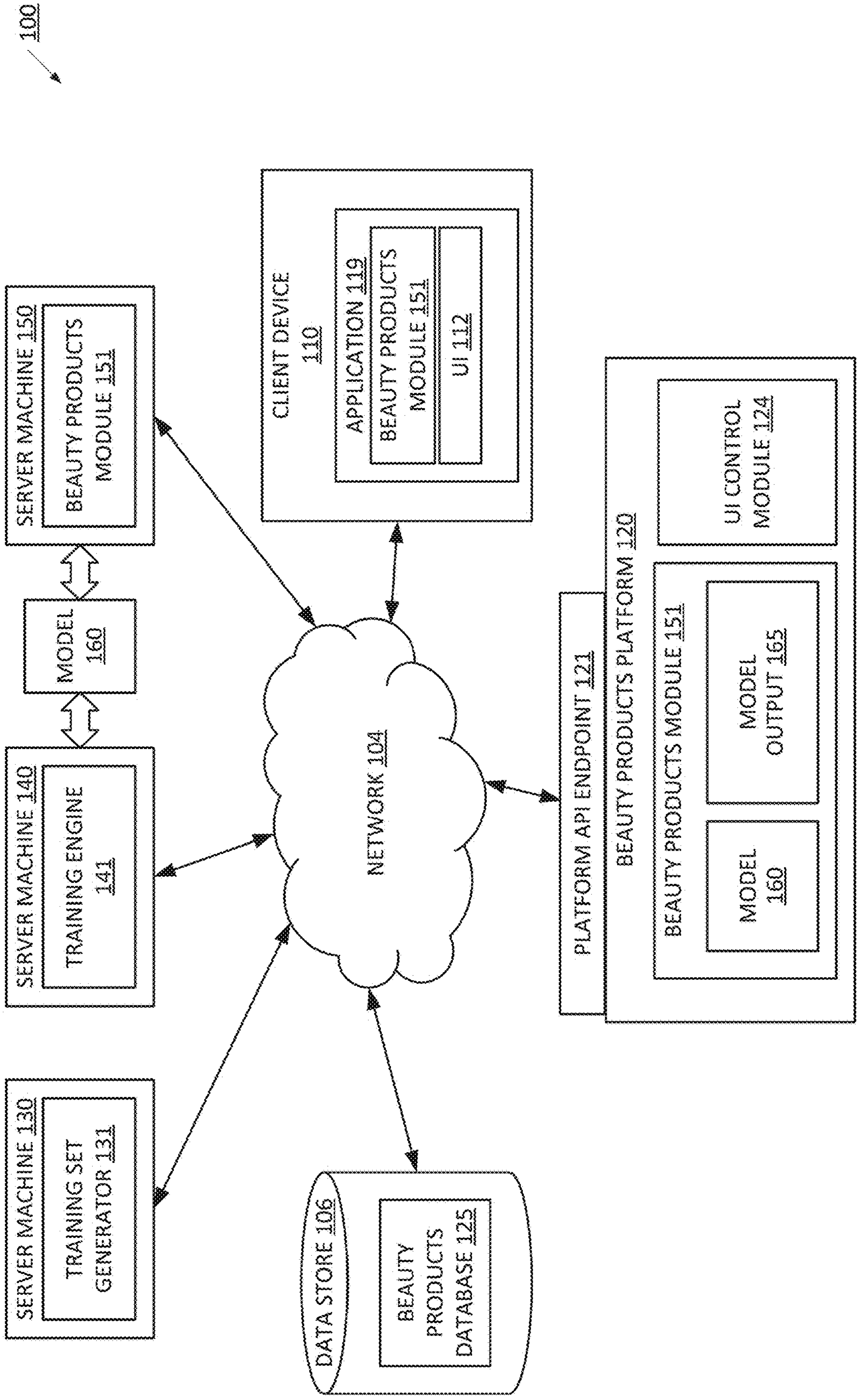
FIG. 1 illustrates an example system, in accordance with some embodiments of the disclosure.

Embodiments described herein are related to methods and systems for using 2D images and target three-dimensional models to determine feedback for application of beauty products.

Variation in human faces can be exceptionally high compared to many other body parts. This high degree of variability in facial features can be due to a combination of genetic, environmental, and stochastic factors. The human face exhibits a wide range of shapes, sizes, colors, and expressions, making each individual's face unique.

Beauty products are often developed to enhance or alter specific facial features, contributing to a relationship between facial variability and beauty products. For example, personal preference for facial features can vary widely among individuals. Beauty products can cater to individual preferences by offering a wide range of products for different purposes. In another example, as awareness of diverse beauty standards grows, the number of beauty products that are suitable for a wide range of facial features and that celebrate the natural variability in facial features also grows. With the high degree of variability in facial features, large number of personal preferences, and the large variety of beauty products, providing relevant information and services associated with beauty products can be challenging.

Users of beauty products may want to achieve a beauty target (also referred to as "facial beauty target" or "facial target" herein). A beauty target can refer to one or more qualities or attributes (e.g., physical characteristics, such as facial features), often of a human face, that are shared between a group. It may be challenging to understand and/or communicate the differences between particular facial features of a subject and the corresponding facial features of a beauty target. Further, it also may be challenging to demonstrate the proper use and application of beauty products to achieve a particular beauty target given the high degree of variability in facial features across people.

Some conventional systems may provide instructions for selection and application of beauty products by a user. For example, a system may provide a variety of beauty products for selection, each having different characteristics and application methods, and each being relevant to different facial features and styles. The system may provide descriptions of beauty products, as well as static and generic instructions for applying beauty products to the user's face. However, users may find it difficult to manually identify appropriate beauty products and apply the beauty products to their unique facial features to achieve a desired look. Further, some conventional systems do not provide real-time feedback that allows the user to visualize the beauty product application product and make corrections.

Embodiments of the disclosure address the above challenges as well as others by using image processing techniques on 2D images representing a subject's face to generate information, such as user metrics that represent one or more facial features of the human face of the subject. Target metrics corresponding to a beauty target (e.g., target model) of a target human face can be identified. Using the user metrics and target metrics, variation information can be determined. The variation information (also referred to as "variation data" herein) can identify one or more differences between the target metrics and user metrics. These differences can represent the difference between the one or more facial features of the subject's face and the corresponding one or more target facial features of the beauty target. A notification reflecting the variation information can be provided to the client device for display. In some embodiments, the notification identifies user instructions pertaining to the application of an application of a beauty product to decrease the one or more differences.

In some embodiments, the visual indicator that reflects the one or more differences between the target metrics and the user metrics is generated using the variation information. The notification can be generated by compositing the visual indicator with the 2D image of the human face of the subject.

In some embodiments, the variation information can be used in an augmented reality (AR) environment to generate visual indicators that are composited with the 2D image or 2D video of the user's face. The visual indicator can identify differences between the subject's face and the target model. The AR environment can provide feedback to the subject as the subject applies the beauty products. The feedback can indicate the subject's level of success in approaching the beauty target in the application of the one or more beauty products.

In some embodiments, a beauty products platform can receive a 2D image taken by a camera and that represents a user's face (e.g., 2D image data representing the 2D image). The 2D image data can be transformed, using image processing techniques, from a 2D representation to a 3D structure (e.g., 3D model represented by 3D model data) that adds a third dimension (e.g., depth) to the information captured in the 2D image. The 3D model can have high dimensional accuracy (e.g., within ±2 millimeters (mm) of the dimensions of the actual object). 2D image data representing the 2D image of the user's face and/or 3D model data representing the 3D model of the user's face can be used to determine 2D facial features (e.g., 2D facial features) and/or 3D landmarks corresponding to the facial features. 2D image data representing the 2D image of the user's face and/or 3D model data representing the 3D model of the user's face can be used to determine 2D geometric data and/or 3D geometric data describing facial features. 2D image data representing the 2D image of the user's face and/or 3D model data representing the 3D model of the user's face can be used to determine 2D relationships between facial features and/or 3D relationships between landmarks. A landmark can refer to a 3D representation of an object, such as a facial feature. The relationships can be determined using techniques such as identifying specific landmarks and calculating distances, ratios, or other metrics between them. For instance, specific relationships between the user's eye and eyebrow, such as a distance (e.g., dimensional data) between the user's eye and eyebrow can be determined (with high accuracy) using the 3D model. In some embodiments, 2D information can include one or more of 2D image data, 2D facial feature data, 2D geometric data, or 2D facial feature relationship data. 3D information can include one or more of 3D model data, 3D landmark data, 3D geometric data, or 3D landmark relationship data.

In some embodiments, a target 3D model that represents a target face can be selected. The 3D information (and/or 2D information) representing the subject's face can be compared to the 3D information corresponding to the target 3D model to determine differences (e.g., difference information) in the respective 3D information. For instance, the ratio of the width of right eye, distance between the eyes, and width of the left eye of the target 3D model can be 1:1:1 and the same ratio for the subject's face can be 0.8:1:0.8.

In some embodiments, a modified 3D model of a human face is generated based on the 3D model of the face of the subject and the target 3D model. The modified 3D model can include one or more regions that correspond to or visualize the differences between the two 3D models. The modified 3D model can be composited with the 2D video (or 2D image) the subject's face. The composited 2D image can be a visual indicator (e.g., virtual element) or be used to place other visual indicators in an AR environment. In some embodiments, the visual indicators can help provide a visual tool or reference that guides a subject on applying one or more beauty products in a manner that helps reduce the differences between the subject's face and the 3D target model. For instance, the virtual element(s) can outline an area around the subject's eyes where eyeliner can be applied such that the ratio of the width of right eye, distance between the eyes, and width of the left eye approaches 1:1:1.

A beauty product can refer to any substance or item designed for use on the body, particularly the face, skin, hair, and nails, often with the purpose of enhancing and/or maintaining beauty and appearance.

A facial feature can refer to a physical characteristic or element that is part of a human face. Facial features can include, but are not limited to the lips, nose, tip of the nose, bridge of the nose, eyes, inner eye, pupil, eyelids, eyebrows, inner eyebrow, outer eyebrow, center eyebrow, cheeks (e.g., cheek bones, etc.), jaw (e.g., jawline, etc.), among others.

FIG. 1 illustrates an example of a system 100, in accordance with embodiments of the disclosure. The system 100 includes a beauty products platform 120, one or more server machines 130-150, a data store 106, and client device 110 connected to network 104. In some embodiments, system 100 can include one or more other platforms (such as those illustrated in FIGS. 2-3).

As noted above, a beauty product can refer to any substance or item designed for use on the body, particularly the face, skin, hair, and nails, often with the purpose of enhancing and/or maintaining beauty and appearance. Beauty products can often be part of personal care and grooming routines, and can serve various functions, such as cleansing, moisturizing, styling, and embellishing. Beauty products include, but are not limited to, skincare products such as cleansers, moisturizers, serums, toners, or other products designed to care for the skin and/or address specific skin concerns. Beauty products can include haircare product, such as shampoos, conditioners, hair masks, styling products, and treatments often designed to clean, nourish, and/or style the hair. Beauty products can include cosmetics, such as foundation, lipstick, eyeshadow, mascara, eyeliner, bronzer, or other items often applied to enhance facial features and/or create different "looks." Beauty products can include nail care products, such as nail polish, nail polish remover and/or other products that can help maintain healthy and/or attractive nails. Beauty products can include fragrance products such as perfumes and colognes designed to add or enhance the scent of the body or user. Beauty products can include personal care products such as deodorants, body lotions, shower gels, or other products designed to maintain personal hygiene. Beauty products can include false eyelashes, such as strip lashes, individual clusters, individual hairs, or artificial lash extensions that are designed for application at the eye area often to enhance or accentuate a user's eyes or eyelashes. Beauty products can include artificial nails, such as acrylic nails, gel nails, press-on nails, fiberglass or silk wraps, nail tips, semi-cured artificial nails and other products that are designed to protect and/or enhance a user's nails. Beauty products can include eyebrow products such as eyebrow pencils or pens, eyebrow powders, eyebrow gels, eyebrow pomades, eyebrow waxes, eyebrow highlighters, eyebrow stencils, eyebrow brushes or combs or other products that are designed to enhance and/or shape the eyebrows. Beauty products can include tools and accessories such as brushes, combs, sponges, applicators and/or other tools used in the application of various beauty products.

In some embodiments, network 104 can include a public network (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

Data store 106 can be a persistent storage that is capable of storing data such as beauty products information, 2D image information, 3D model information, machine learning model data, etc. Data store 106 can be hosted by one or more storage devices, such as main memory, magnetic or optical storage-based disks, tapes or hard drives, network-attached storage (NAS), storage area network (SAN), and so forth. In some embodiments, data store 106 can be a network-attached file server, while in other embodiments the data store 106 can be another type of persistent storage such as an object-oriented database, a relational database, and so forth, that can be hosted by beauty products platform 120, or one or more different machines coupled to the server hosting the beauty products platform 120 via the network 104. In some embodiments, data store 106 can be capable of storing one or more data items, as well as data structures to tag, organize, and index the data items. A data item can include various types of data including structured data, unstructured data, vectorized data, etc., or types of digital files, including text data, audio data, image data, video data, multimedia, interactive media, data objects, and/or any suitable type of digital resource, among other types of data. An example of a data item can include a file, database record, database entry, programming code or document, among others.

In some embodiments, data store 106 can implement beauty products database 125. In some embodiments, beauty products database 125 can store information (e.g., data items) related to one or more beauty products.

In some embodiments, beauty products database 125 can include a vector database. In some embodiment, a vector database can index and/or store vector data, such as vector embeddings (e.g., also referred to as vector embedding data). In some embodiments, the vector embedding data can have the same or variable dimensionality. The vector embedding data can include one or more of word embedding data (e.g., vector representation of a word), image embedding data (e.g., vector representation of an image), audio embedding data (e.g., vector representation of audio content), and so forth. In some embodiments, the vector embedding data can represent one or more beauty products. Additional details of beauty products database 125 are further described herein.

The client device(s) (e.g., client device 110) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client device(s) may also be referred to as a "user device" herein. Although a single client device 110 is shown for purposes of illustration rather than limitation, one or more client devices can be implemented in some embodiments. Client device 110 will be referred to as client device 110 or client devices 110 interchangeably herein.

In some embodiments, a client device, such as client device 110, can implement or include one or more applications, such as application 119 executed at client device 110. In some embodiments, application 119 can be used to communicate (e.g., send and receive information) with beauty products platform 120. In some embodiments, application 119 can implement user interfaces (UIs) (e.g., graphical user interfaces (GUIs)), such as a user interface (UI) (e.g., UI 112) that may be webpages rendered by a web browser and displayed on the client device 110 in a web browser window. In another embodiment, the UIs 112 of client application, such as application 119 may be included in a stand-alone application downloaded to the client device 110 and natively running on the client device 110 (also referred to as a "native application" or "native client application" herein). In some embodiments, beauty products module 151 can be implemented as part of application 119. In other embodiments, beauty products module 151 can be separate from application 119 and application 119 can interface with beauty products module 151.

In some embodiments, one or more client devices 110 can be connected to the system 100. In some embodiments, client devices, under direction of the beauty products platform 120 when connected, can present (e.g., display) a UI 112 to a user of a respective client device through application 119. The client devices 110 may also collect input from users through input features.

In some embodiments, a UI 112 may include various visual elements (e.g., UI elements) and regions, and can be a mechanism by which the user engages with the beauty products platform 120, and system 100 at large. In some embodiments, the UI 112 of a client device 110 can include multiple visual elements and regions that enable presentation of information, for decision-making, content delivery, etc. at a client device 110. In some embodiments, the UI 112 may sometimes be referred to as a graphical user interface (GUI)).

In some embodiments, the UI 112 and/or client device 110 can include input features to intake information from a client device 110. In one or more examples, a user of client device

110 can provide input data (e.g., a user query, control commands, etc.) into an input feature of the UI 112 or client device 110, for transmission to the beauty products platform 120, and system 100A at large. Input features of UI 112 and/or client device 110 can include space, regions, or elements of the UI 112 that accept user inputs. For example, input features may include visual elements (e.g., GUI elements) such as buttons, text-entry spaces, selection lists, drop-down lists, etc. For example, in some embodiments, input features may include a chat box which a user of client device 110 can use to input textual data (e.g., a user query). The application 119 via client device 110 can then transmit that textual data to beauty products platform 120, and the system 100 at large, for further processing. In other examples, input features can include a selection list, in which a user of client device 110 can input selection data e.g., by selecting, or clicking. The application 119 via client device 110 can then transmit that selection data to beauty products platform 120, and the system 100 at large, for further processing.

In some embodiments, client device 110 can include a camera (e.g., digital camera) to capture images, such as two-dimensional (2D) images, and video (e.g., sequential video frames of a video item). The images and/or video can be sent to beauty products platform 120 using application 119. In some embodiments, client device 110 can stream a video item to beauty products platform 120 using application 119. The video frames of a video item can be arranged (e.g., sequentially arranged) using timestamps. In some embodiments, application 119 can be used to implement augmented reality (AR) or virtual reality (VR) features at client device 110.

In some embodiments, a client device 110 can access the beauty products platform 120 through network 104 using one or more application programming interface (API) calls via platform API endpoint 121. In some embodiments, beauty products platform 120 can include multiple platform API endpoints 121 that can expose services, functionality, or information of the beauty products platform 120 to one or more client devices 110. In some embodiments, a platform API endpoint 121 can be one end of a communication channel, where the other end can be another system, such as a client device 110 associated with a user account. In some embodiments, the platform API endpoint 121 can include or be accessed using a resource locator, such a universal resource identifier (URI), universal resource locator (URL), of a server or service. The platform API endpoint 121 can receive requests from other systems, and in some cases, return a response with information responsive to the request. In some embodiments, HTTP (Hypertext Transfer Protocol), HTTPS (Hypertext Transfer Protocol Secure) methods (e.g., API calls) can be used to communicate to and from the platform API endpoint 121.

In some embodiments, the platform API endpoint 121 can function as a computer interface through which access requests are received and/or created. In some embodiments, the platform API endpoint 121 can include a platform API whereby external entities or systems can request access to services and/or information provided by the beauty products platform 120. The platform API can be used to programmatically obtain services and/or information associated with a request for services and/or information.

In some embodiments, the API of the platform API endpoint 121 can be any suitable type of API such as a REST (Representational State Transfer) API, a GraphQL API, a SOAP (Simple Object Access Protocol) API, and/or any suitable type of API. In some embodiments, the beauty products platform 120 can expose through the API, a set of API resources which when addressed can be used for requesting different actions, inspecting state or data, and/or otherwise interacting with the beauty products platform 120. In some embodiments, a REST API and/or another type of API can work according to an application layer request and response model. An application layer request and response model can use HTTP, HTTPS, SPDY, or any suitable application layer protocol. Herein HTTP-based protocol is described for purposes of illustration, rather than limitation. The disclosure should not be interpreted as being limited to the HTTP protocol. HTTP requests (or any suitable request communication) to the beauty products platform 120 can observe the principals of a RESTful design or the protocol of the type of API. RESTful is understood in this document to describe a Representational State Transfer architecture. The RESTful HTTP requests can be stateless, thus each message communicated contains all necessary information for processing the request and generating a response. The platform API can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

It can be appreciated that in some embodiments, any element, such as server machine 130, server machine 140, server machine 150, and/or data store 106 may include a corresponding API endpoint for communicating with APIs.

In some embodiments, the beauty products platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to data or services. Such computing devices can be positioned in a single location or can be distributed among many different geographical locations. For example, beauty products platform 120 can include multiple computing devices that together may comprise a hosted computing resource, a grid computing resource, or any other distributed computing arrangement. In some embodiments, beauty products platform 120 can correspond to an elastic computing resource where the allotted capacity of processing, network, storage, or other computing-related resources may vary over time.

In some embodiments, beauty products platform 120 can implement beauty products module 151. In some embodiments, beauty products module 151 can implement one or more features and/or operations as described herein. In some embodiments, beauty products module 151 can include or access one or more of model 160, and model output 165. In some embodiments, beauty products platform 120 can receive 2D image data of a 2D image representing a human face of a subject and/or 3D model data of a 3D model representing the human face of the subject. Beauty products platform 120 can provide the 2D image data and/or the 3D model data to the beauty products module 151. In some embodiments, beauty products module 151 can use the 2D image data and/or the 3D model data as an input to a trained machine learning model, such as model 160. Model 160 can generate outputs, including model output 165. The model output 165 can include information such as one or more of: (i) information identifying 2D facial features data represented in the 2D image data, (ii) information identifying 2D geometric data for respective 2D facial features, (iii) information identifying relationships between the 2D facial features represented in the 2D image data (e.g., 2D facial feature relationship data), (iv) information identifying 3D landmarks corresponding to the facial features (e.g., 3D landmark data), (v) information identifying 3D geometric data pertaining to the 3D landmark data corresponding to the 2D facial features, (vi) information identifying relationships between the 3D landmarks (e.g., 3D landmark relationship data), and/or (vii) information identifying variation information.

In some embodiments, beauty products platform 120 and in particular, the UI control module 124 may perform user-display functionalities of the system such as generating, modifying, and monitoring the client-side UIs (e.g., graphical user interfaces (GUI)) and associated components that are presented to users of the beauty products platform 120 through UI 112 client devices 110. For example, beauty products module 151 via UI control module 124 can generate the UIs (e.g., UI 112 of client device 110) that users interact with while engaging with the beauty products platform 120.

In some embodiments, a machine learning model (e.g., also referred to as an "artificial intelligence (AI) model" herein) can include a discriminative machine learning model (also referred to as "discriminative AI model" herein), a generative machine learning model (also referred to as "generative AI model" herein), and/or other machine learning model.

In some embodiments, a discriminative machine learning model can model a conditional probability of an output for given input(s), A discriminative machine learning model can learn the boundaries between different classes of data to make predictions on new data. In some embodiments, a discriminative machine learning model can include a classification model that is designed for classification tasks, such as learning decision boundaries between different classes of data and classifying input data into a particular classification. Examples of discriminative machine learning models include, but are not limited to, support vector machines (SVM) and neural networks.

In some embodiments, a generative machine learning model learns how the input training data is generated and can generate new data (e.g., original data). A generative machine learning model can model the probability distribution (e.g., joint probability distribution) of a dataset and generate new samples that often resemble the training data. Generative machine learning models can be used for tasks involving image generation, text generation and/or data synthesis. Generative machine learning models include, but are not limited to, gaussian mixture models (GMMs), variational autoencoders (VAEs), generative adversarial networks (GANs), large language models (LLMs), visual language models (VLMs), multi-modal models (e.g., text, images, video, audio, depth, physiological signals, etc.), and so forth.

Training of and inference using discriminative machine learning models and generative machine learning models is described herein. It should be noted that although the training of and inference using discriminative machine learning model and generative machine learning model are described separately for the purposes of clarity, it can be appreciated that elements described with respect to discriminative machine learning models can apply to generative machine learning models, and vice versa, unless otherwise described.

In some embodiments, some elements of FIG. 1, such as training set generator 131 of server machine 130, training engine 141 of server machine 140, and model 160 can apply to a discriminative machine learning model, unless otherwise described.

Server machine 130 includes a training set generator 131 that is capable of generating training data (e.g., a set of training inputs and a set of target outputs) to train a model 160 (e.g., a discriminative machine learning model). In some embodiments, training set generator 131 can generate the training data based on various data (e.g., stored at data store 106 or another data store connected to system 100A via the network 104). Data store 106 can store metadata associated with the training data.

Server machine 140 includes a training engine 141 that is capable of training a model 160 using the training data from training set generator 131. The model 160 (also referred to "machine learning model" or "artificial intelligence (AI) model" herein) may refer to the model artifact that is created by the training engine 141 using the training data that includes training inputs (e.g., features) and corresponding target outputs (correct answers for respective training inputs) (e.g., labels). The training engine 141 may find patterns in the training data that map the training input to the target output (the answer to be predicted) and provide the model 160 that captures these patterns. The model 160 may be composed of, e.g., a single level of linear or non-linear operations (e.g., a support vector machine (SVM), or may be a deep network, i.e., a machine learning model that is composed of multiple levels of non-linear operations). An example of a deep network is a neural network with one or more hidden layers, and such machine learning model may be trained by, for example, adjusting weights of a neural network in accordance with a backpropagation learning algorithm or the like. Model 160 can use one or more of a support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc. For convenience rather than limitation, the remainder of this disclosure describing discriminative machine learning model will refer to the implementation as a neural network, even though some implementations might employ other type of learning machine instead of, or in addition to, a neural network.

In some embodiments, such as with a supervised machine learning model, the one or more training inputs of the set of the training inputs are paired with respective one or more training outputs of the set of training outputs. The training input-output pair(s) can be used as input to the machine learning model to help train the machine learning model to determine, for example, patterns in the data.

In some embodiments, training data, such as training input and/or training output, and/or input data to a trained machine learning model (collectively referred to as "machine learning model data" herein) can be preprocessed before providing the aforementioned data to the (trained or untrained) machine learning model (e.g., discriminative machine learning model and/or generative machine learning model) for execution. Preprocessing as applied to machine learning models (e.g., discriminative machine learning model and/or generative machine learning model) can refer to the preparation and/or transformation of machine learning model data.

In some embodiments, preprocessing can include data scaling. Data scaling can include a process of transforming numerical features in raw machine learning model data such that the preprocessed machine learning model data has a similar scale or range. For example, Min-Max scaling (Normalization) and/or Z-score normalization (Standardization) can be used to scale the raw machine learning model. For instance, if the raw machine learning model data includes feature representing temperatures in Fahrenheit, the raw machine learning model data can be scaled to a range of [0, 1] using Min-Max scaling.

In some embodiments, preprocessing can include data encoding. Encoding data can include a process of converting categorical or text data into a numerical format on which a machine learning model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories, but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, preprocessing can include data embedding. Data embedding can include an operation of representing original data in a different space, often of reduced dimensionality (e.g., dimensionality reduction), while preserving relevant information and patterns of the original data (e.g., lower-dimensional representation of higher-dimensional data). The data embedding operation can transform the original data so that the embedding data retains relevant characteristics of the original data and is more amenable for analysis and processing by machine learning models. In some embodiments embedding data can represent original data (e.g., word, phrase, document, or entity) as a vector in vector space, such as continuous vector space. Each element (e.g., dimension) of the vector can correspond to a feature or property of the original data (e.g., object). In some embodiments, the size of the embedding vector (e.g., embedding dimension) can be adjusted during model training. In some embodiments, the embedding dimension can be fixed to help facilitate analysis and processing of data by machine learning models.

In some embodiments, the training set is obtained from server machine 130. Server machine 150 includes a beauty products module 151 that provides current data (e.g., 2D image data, etc.) as input to the trained machine learning model (e.g., model 160) and runs the trained machine learning model (e.g., model 160) on the input to obtain one or more outputs.

In some embodiments, confidence data can include or indicate a level of confidence of that a particular output (e.g., output(s)) corresponds to one or more inputs of the machine learning model (e.g., trained machine learning model). In one example, the level of confidence is a real number between 0 and 1 inclusive, where 0 indicates no confidence that output(s) corresponds to a particular one or more inputs and 1 indicates absolute confidence that the output(s) corresponds to a particular one or more inputs. In some embodiments, confidence data can be associated with inference using a machine learning model.

In some embodiments, machine learning model, such as model 160, may be (or may correspond to) one or more computer programs executed by processor(s) of server machine 140 and/or server machine 150. In other embodiments, machine learning model may be (or may correspond to) one or more computer programs executed across a number or combination of server machines. For example, in some embodiments, machine learning models may be hosted on the cloud, while in other embodiments, these machine learning models may be hosted and perform operations using the hardware of a client device 110. In some embodiments, the machine learning models may be a self-hosted machine learning model, while in other embodiments, machine learning models may be external machine learning models accessed by an API.

In some embodiments, server machines 130 through 150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to one or more data items of the beauty products platform 120. The beauty products platform 120 can also include a website (e.g., a webpage) or application back-end software that can be used to provide users with access to the beauty products platform 120.

In some embodiments, one or more of server machine 130, server machine 140, model 160, server machine 150 can be part of beauty products platform 120. In other embodiments, one or more of server machine 130, server machine 140, server machine 150, or model 160 can be separate from beauty products platform 120 (e.g., provided by a third-party service provider).

Also as noted above, for purpose of illustration, rather than limitation, embodiments of the disclosure describe the training of a machine learning model (e.g., model 160) and use of a trained machine learning model (e.g., model 160). In other embodiments, a heuristic model or rule-based model can be used as an alternative. It should be noted that in some other embodiments, one or more of the functions of beauty products platform 120 can be provided by a greater number of machines. In addition, the functionality attributed to a particular component of the beauty products platform 120 can be performed by different or multiple components operating together. Although embodiments of the disclosure are discussed in terms of beauty products platforms, embodiments can also be generally applied to any type of platform or service.

Figure 2:
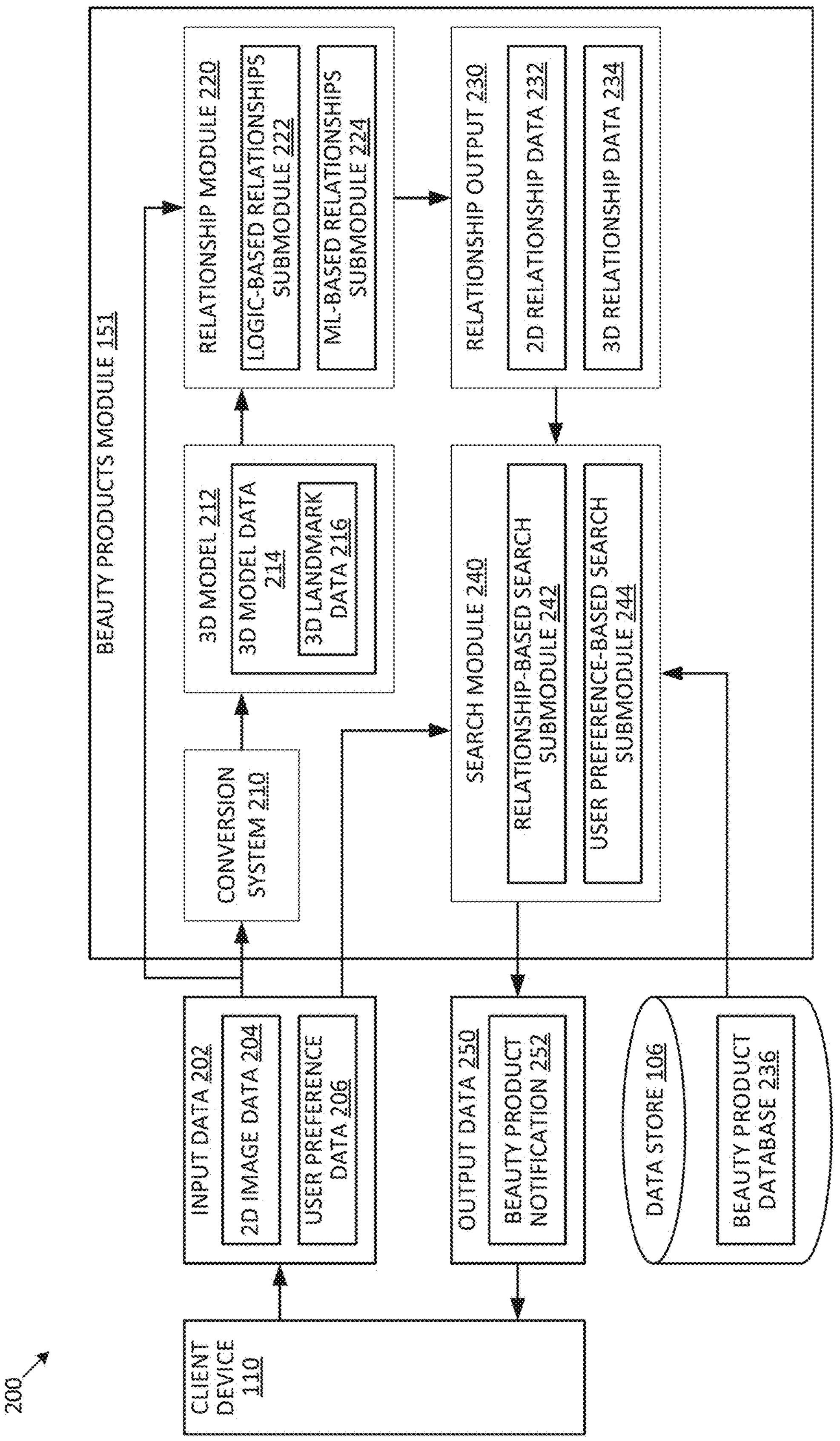
FIG. 2 depicts an example beauty products module using two-dimensional images and target three-dimensional models to determine feedback for application of beauty products, in accordance with some embodiments of the disclosure.

FIG. 2 is an example system 200 for using 2D image data enhanced by image processing techniques to perform a search, such as a search of beauty products, in accordance with embodiments of the disclosure. System 200 includes data store 106, client device 110, and beauty products module 151, which may correspond to respective components of FIG. 1. Input data 202 can be provided to beauty products module 151 by client device 110, and output data 250 can be provided to client device 110 by the beauty products platform 120, such as by beauty products module 151. Beauty products module 151 can use input data 202 to generate a 3D model of a user's face and/or eye area and determine relationships between 3D landmarks on the model. The relationship data can be used, in combination with user preferences, to generate search parameters and search a beauty products database. In some embodiments, system 200 can include more or fewer components than those depicted in FIG. 2.

In some embodiments, input data 202 can include one or more of 2D image data 204 and user preference data 206. In some embodiments, beauty products module 151 can receive some or all of input data 202 from client device 110 or from other sources, such as data store 106. In some embodiments, client device 110 can generate or obtain input data 202. For example, client device 110 can cause an imaging device coupled to client device 110, such as a camera, to capture a 2D image represented by 2D image data 204. In another example, client device 110 can retrieve 2D image data 204 from a memory location, such as from data store 106. As previously described, 2D image data 204 can be 2D image data of a 2D image representing a human face of a subject or regions thereof. For example, 2D image data 204 can correspond to a 2D image of an eye area of a subject. In some embodiments, the 2D image data 204 can represent a frontal facial image of the subject. 2D image data 204 can be used (e.g., through various image processing techniques) to search or filter beauty products based on facial features or landmarks of the face (e.g., of the eye area), as described herein. 2D image data 204 can represent one or more 2D video images (e.g., frames) of a video stream or other types of 2D images. 2D image data 204 may correspond to image 1102 of FIG. 11.

In some embodiments, user preference data 206 can identify user preferences of a subject, which can be used to search or filter beauty products. For example, user preference data 206 can identify one or more of a color preference, a style preference, length preference, or any other preference. In some embodiments, user preference data 206 indicates user preference information that may not be identified from 2D image data. In some embodiments, user preference data 206 can be obtained from a user of client device 110. For example, user preference data 206 can be received by presenting the user with a predetermined, selectable list (e.g., in a user interface of application 119). In another example, user preference data 206 can be received as a free-response from the user of client device 110 (e.g., a text or other input into a free-response field). In another example, user preference data 206 can be received as a multi-modal input from the user of client device 110. A multimodal input field can include a field capable of accepting two or more different input modalities, such as two or more of a text input, an image input, an audio input, a video input, etc., from a user of client device 110.

In some embodiments, input data can include other types of input data, such as user/account data, calendar/event data, facial feature type data, metadata, additional 2D or 3D data, other types of data described herein, or other data that may be relevant to beauty products module 151 (e.g., for searching or filtering beauty products). In some embodiments, 2D image data 204 or user preference data 206 may be absent from input data 202.

In some embodiments, beauty products module 151 includes one or more of conversion system 210, relationship module 220, and search module 240. In some embodiments, 3D model 212 can be provided to relationship module 220 by conversion system 210, and relationship output 230 can be provided to search module 240 by relationship module 220. In some embodiments, beauty products module 151 can include more or fewer components than those depicted in FIG. 2. For example, components depicted in FIG. 2 as being included in beauty products module 151 may alternatively be included in client device 110 (e.g., conversion system 210).

In some embodiments, 3D model 212 can include 3D model data 214. In some embodiments, 3D model data 214 can represent a three-dimensional digital representation of a scene or object (e.g., a 3D model). In some embodiments, 3D model data 214 of 3D model 212 can include width information, height information, and depth information of the scene and/or object. 3D model data 214 can include geometric data that describes the corresponding scene or object. The geometric data can include one or more of vertices (e.g., points), edges, and/or faces. In some embodiments, vertices (e.g., nodes or points) can include points of a 3D model. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges). In some embodiments, one or more of vertices, edges and faces can define the geometry of 3D model 212.

In some embodiments, 3D model data 214 of 3D model 212 can include texture information that describes an object's surface texture. In some embodiments, 3D model data 214 does not include texture information. In some embodiments, 3D model data 214 includes material information that can influence the appearance of 3D model 212 at rendering (e.g., how light reflects from the material). In some embodiments, 3D model data 214 does not include material information. In some embodiments, 3D model data 214 includes lighting information that describes the interaction of light (and absence of light) with the scene or object. In some embodiments, 3D model data 214 does not include lighting information. In some embodiments, 3D model data 214 includes color information that indicates the colors of surface (e.g., faces) of 3D model 212.

In some embodiments, 3D model data 214 of 3D model 212 can include landmark data, such as 3D landmark data 216 (also referred to as "landmark data" herein). In some embodiments, one or more landmarks can be represented by 3D landmark data 216. A landmark can refer to a specific point or a specific grouping of points of a 3D model 212. A landmark can represent or correspond to one or more features, such as one or more facial features of a subject's face. The one or more features, such as facial features can be represented in 3D model 212 by the specific point or specific grouping of points. For example, a landmark can correspond to or represent the right eye, the inner corner of the eyes, the bridge of the nose, a center line of a face, and so forth. The landmark can be represented by the grouping of points of 3D model 212 that represent the right eye, the inner corner of the eyes, the bridge of the nose, a center line of a face, or some other facial feature. In some embodiments, a landmark can include relationships between one or more points (e.g., edges, faces, geometric data, such as length, height, and depth, and/or ratios of geometric data). For instance, the landmark can include a distance between the inner corner of the right eye and the outer corner of the right eye. In some embodiments, a landmark can include a combination of facial features and/or relationships between multiple facial features.

In some embodiments, 3D landmark data 216 can include information identifying one or more points of 3D model 212 (e.g., specific grouping of points and/or 3D coordinate data of the points) that correspond to a feature, such as a facial feature. In some embodiments, 3D landmark data 216 can include information identifying the relationship between one or more points of a landmark. To identify the relationship between the one or more points of a landmark, 3D landmark data 216 can include information identifying one or more of edges, faces, geometric data, such as length, height, and depth, and/or ratios of geometric data. To identify the relationship between the one or more points of a landmark, 3D landmark data 216 can include one or more of absolute or relative values (e.g., deviations from average or template values). In some embodiments, 3D landmark data 216 can include information identifying relationships between multiple landmarks. 3D landmark data 216 that identifies relationships between multiple landmarks can identify one or more of edges, faces, geometric data, such as length, height, and depth, ratios of geometric data, and/or absolute or relative values (e.g., deviations from average or template values). For instance, a ratio between the length of the eyebrow and the distance between the eyebrow and a point on the eye can be included on 3D landmark data 216. In some embodiments, 3D model data 214 and/or 3D landmark data 216 can further include 2D and/or 3D geometric data, as described with reference to FIG. 9.

In some embodiments, conversion system 210 converts 2D image data to a corresponding 3D model. For example, conversion system 210 can convert 2D image data representing a human face or and eye area of a face to a 3D model of the face or eye area of the face, respectively. The 2D image data input may be 2D image data 204, and the 3D model output may be 3D model 212. Conversion system 210 can use various image processing techniques to convert 2D image data to a 3D model, such as ML-based or non-ML-based techniques. An example technique for converting 2D image data to a 3D model using principal component analysis (PCA) is further described with reference to FIGS. 11-14B. In some embodiments, conversion system 210 is, includes, or is included in model 160 of FIG. 1. Model output 165 may correspond to 3D model 212. In some embodiments, as described above, conversion system 210 may be included in client device 110 rather than beauty products module 151. Input data 202 would thus include 3D model 212 in place of or in addition to 2D image data 204.

Relationship output 230 includes 2D relationship data 232 and/or 3D relationship data 234. In some embodiments, 2D relationship data 232 or 3D relationship data 234 may be absent from relationship output 230. In some embodiments, relationship output 230 may include other types of relationship data.

In some embodiments, 2D relationship data 232 can include data identifying a relationship between two or more facial features (e.g., as present in 2D image data 204, or as determined by relationship module 220). In some embodiments, 2D relationship data 232 can include data identifying a relationship between 2D geometric data of two or more facial features. In some embodiments, the relationships between data corresponding to a first facial feature (e.g., first 2D facial feature data, and/or first 2D geometric data) and data corresponding to a second facial feature (e.g., second 2D facial feature data, and/or second 2D geometric data) can include one or more of distances between 2D points, angles, positions, or ratios of 2D information.

In some embodiments, 2D relationship data 232 can include data identifying a line or curve between one or more 2D points of a first facial feature and one or more 2D points of a second facial feature. For instance, 2D relationship data 232 can include data identifying a distance between one or more points representing the left eye and one or more points representing the right eye.

In some embodiments, 2D relationship data 232 can include data identifying a first line between two or more 2D points of a first facial feature and a second line between two or more 2D points of a second facial feature, and the angle between the first line and the second line. For instance, 2D relationship data 232 can include data identifying an angle between a horizontal line between 2D points representing the right and left pupils, and a right eye line between 2D points representing the inner corner of the right eye and the outer corner of the right eye.

In some embodiments, 2D relationship data 232 can include data identifying a first position corresponding to one or more 2D points of a first facial feature and a second position corresponding to one or more 2D points of a second facial feature, and a relationship between the first position and the second position (e.g., represented as x-, y-coordinate data). For instance, 2D relationship data 232 can include data identifying a relationship between a first x-, y-coordinate of one or more 2D points representing the nose, and a second x-, y-coordinate of one or more 2D points representing the mouth.

In some embodiments, 2D relationship data 232 can include data identifying a first size corresponding to one or more 2D points of a first facial feature and a second size corresponding to one or more 2D points of a second facial feature, and a ratio between the first size and the second size. For instance, 2D relationship data 232 can include data identifying a ratio between an eye size (represented by one or more 2D points representing the eye) and a mouth size (represented by one or more 2D points representing the mouth).

In some embodiments, 3D relationship data 234 can include data identifying a relationship between 3D landmark data corresponding to two or more respective facial features (e.g., 3D landmark data 216). In some embodiments, 3D relationship data 234 can include data identifying a relationship between 3D geometric data corresponding to two or more facial features. In some embodiments, the relationships between data corresponding to a first facial feature and data corresponding to a second facial feature can include one or more of distances, angles, positions, or ratios.

In some embodiments, 3D relationship data 234 can include data identifying a line or curve between one or more 3D points corresponding to a first facial feature and one or more 3D points corresponding to a second facial feature. In some embodiments, one or more of the first facial feature or second facial feature can be represented in 3D landmark data 216. For example, 3D relationship data 234 can include data identifying a 3D distance between one or more points representing the left eye and one or more points representing the right eye (e.g., the distance between the left and right eye).

In some embodiments, 3D relationship data 234 can include data identifying a first line between two or more 3D points of a first facial feature and a second line between two or more 3D points of a second facial feature, and an angle(s) (e.g., 3D angle) between the first line and the second line. For example, 3D relationship data 234 can include data identifying a 3D angle(s) between a horizontal plane that intersects the 3D points representing the right and left pupils, and a right eye line between 3D points representing the inner corner of the right eye and the outer corner of the right eye.

In some embodiments, 3D landmark relationship data 234 can include data identifying a first 3D position corresponding to one or more 3D points corresponding to a first facial feature and a second position corresponding to one or more 3D points of a second facial feature, and a relationship between the first 3D position and the 3D second position (e.g., represented as x-, y-, and z-coordinate position). For instance, 3D relationship data 234 can include data identifying a relationship between a first x-, y-, z-coordinate representing the nose, and a second x-, y-, z-coordinate representing the mouth.

In some embodiments, 3D relationship data 234 can include data identifying a first measurement (e.g., size, length, depth, width, area, etc.) corresponding to a first facial feature (corresponding to one or more 3D points) and a second measurement corresponding to a second facial feature (corresponding to one or more 3D points), and a ratio between the first measurement and the second measurement. For instance, 3D relationship data 234 can include data identifying a ratio between an eye size (represented by one or more 3D points representing the eye) and a mouth size (represented by one or more 3D points representing the mouth).

Additional details regarding 2D facial feature relationship data such as 2D relationship data 232 and 3D landmark relationship data such as 3D relationship data 234 are described below with reference to FIGS. 5A-B.

In some embodiments, relationship module 220 determines 2D relationships between facial features and/or 3D relationships between 3D landmarks. For example, relationship module 220 may receive 2D image data 204 and/or 3D model 212 as inputs and provide 2D relationship data 232 and/or 3D relationship data 234 as outputs. Relationship module 220 can use various techniques for determining 2D and 3D relationships. In some embodiments, relationship module 220 includes logic-based relationships submodule 222 for using logic-based techniques to determine relationships. In some embodiments, relationship module 220 includes ML-based relationships submodule 224 for using ML-based techniques to determine relationships. An example system for determining relationships using ML techniques is further described with reference to FIGS. 9-10. In some embodiments, relationships may be determined by other components of system 200 or system 100. For example, 3D relationship data may be determined conversion system 210 during generation of 3D model 212.

In some embodiments, logic-based relationships submodule 222 determines 2D and/or 3D relationships using one or more operations, algorithms, steps, or similar. In some embodiments, logic-based relationships submodule 222 identifies a set of facial features of a 2D image or a set of landmarks of a 3D model. For example, logic-based relationships submodule 222 may identify a pair of landmarks of 3D landmark data 216, with a first landmark corresponding to, e.g., a pupil and a second landmark corresponding to, e.g., a midpoint of an eyebrow. In some embodiments, landmarks may be identified based on textual identifiers or characteristics provided by client device 110, conversion system 210, or other module. For example, conversion system 210 may provide textual identifiers for landmarks as part of the 2D-to-3D conversion process (e.g., points [a-n] and lines [a-n] represent an "right eye"). In some embodiments, the landmarks may be identified using ML textual identifiers. For example, ML-based relationships submodule 224 may provide textual identifiers which are used by logic-based relationships submodule 222 to identify the landmarks.

In some embodiments, logic-based relationships submodule 222 determines a distance, ratio, or other metric between facial features of a set of facial features or between landmarks of a set of landmarks. For example, after identifying a pair of landmarks as described above (e.g., a pupil and an eyebrow midpoint), logic-based relationships submodule 222 may perform one or more operations (e.g., subtraction) on the x-, y-, and z-coordinates of the landmarks (e.g., obtained from 3D model data 214) to determine a distance between the landmarks. In another example, logic-based relationships submodule 222 may perform one or more operations (e.g., division) on a pair of distances between respective pairs of landmarks to determine a ratio between the landmarks. The determined distance, ratio, or other metric may be the determined relationship or may be part of the determined relationship (e.g., the relationship may include multiple distances, etc.).

In some embodiments, data store 106 includes beauty products database 236. Beauty products database 236 may include identifiers of one or more beauty products. As described with reference to FIGS. 6-7, some false eyelash products (an example of beauty products), in some embodiments, can be designed or configured for application at the underside of the natural eyelashes of the user, or alternatively, even the top side of the natural eyelashes of a user. Beauty products database 236 can further or alternatively identify sets of false eyelashes in accordance with lash configuration information (e.g., sets of false eyelashes corresponding to respective lash configuration information), as described with reference to FIG. 8. In some embodiments, data store 106 can further or alternatively include other beauty products databases, such as lipstick databases, eyeliner databases, combined databases, etc. Beauty products database 236 (or other beauty products databases of data store 106) may identify beauty products of one or more beauty products entities (e.g., producers or suppliers). In some embodiments, beauty products database 236 may identify characteristics associated with each of the beauty products within beauty products database 236. For example, beauty products database 236 may identify one or more of a color characteristic, a style characteristic, a description characteristic, a price characteristic, or similar. Each beauty product identified in beauty products database 236 may correspond to a respective value (or range of values) for a given characteristic.

In some embodiments, output data 250 can be provided by beauty products module 151 to client device 110 or other recipient device or component. In some embodiments, output data 250 includes beauty product notification 252. Beauty product notification 252 can include an indication (e.g., identifier) of one or more beauty products, such as identifiers of beauty products, images of beauty products, other types of media, or similar. In some embodiments, beauty product notification 252 can be associated with a presentation of the indication to a user of client device 110. For example, the indication of one or more beauty product may be presented to the user via UI 112.

In some embodiments, search module 240 can search or filter a beauty products database such as beauty products database 236 to identify a subset of beauty products. For example, search module 240 may identify a subset of beauty product that may be of interest to the user based on various input data. In some embodiments, search module 240 may receive one or more of relationship output 230, user preference data 206, or other data as input data. Search module 240 can further include one or more search submodules, such as relationship-based search submodule 242 and user preference-based search submodule 244, to search beauty products based on these various input data.

In some embodiments, relationship-based search submodule 242 identifies a subset of the beauty products of beauty products database 236 based on relationship output 230. In some embodiments, relationship-based search submodule 242 uses 2D relationship data 232 and/or 3D relationship data 234 to determine a range for a value of a characteristic of beauty products database 236. The determined range may be a continuous range (including a single value), a discrete range (including a single value), an enumerated range (e.g., a list of values), or other type of range. In some embodiments, relationship-based search submodule 242 uses the determined range(s) to identify, select, filter, etc. the subset of beauty products from beauty products database 236. For example, beauty products having values of characteristics within the determined range(s) may be identified as part of the subset.

In some embodiments, user preference-based search submodule 244 identifies a subset of the beauty products of beauty products database 236 based on user preference data 206. In some embodiments, user preference-based search submodule 244 uses user preference data 206 to determine a range for a value of a characteristic of beauty products database 236. For example, user preference data 206 can indicate a desired style or group of styles for f beauty products based on the user's preferences. The determined range may be a continuous range (including a single value), a discrete range (including a single value), an enumerated range (e.g., a list of values), or other type of range. In some embodiments, user preference-based search submodule 244 uses the determined range(s) to identify, select, filter, etc. the subset of beauty products from beauty products database 236. For example, beauty products having values of characteristics within the determined range(s) may be identified as part of the subset.

In some embodiments, the subset of beauty products can be identified from a table or matrix. For example, a Structured Query Language (SQL) query including the determined range(s) can be used to identify the subset from a database table.

In some embodiments, relationship-based search submodule 242 identifies a subset of beauty products of an output of user preference-based search submodule 244, or vice versa. For example, beauty products of beauty products database 236 may be searched a first time by relationship-based search submodule 242, and the search results (e.g., first subset of false eyelashes) may be searched a second time by user preference-based search submodule to determine the subset of beauty products (e.g., sub subset of beauty products) to be presented to the user via client device 110. In some embodiments, relationship-based search submodule 242 and user preference-based search submodule 244 may be used together to determine the subset of beauty products of beauty products database 236.

Figure 3A:
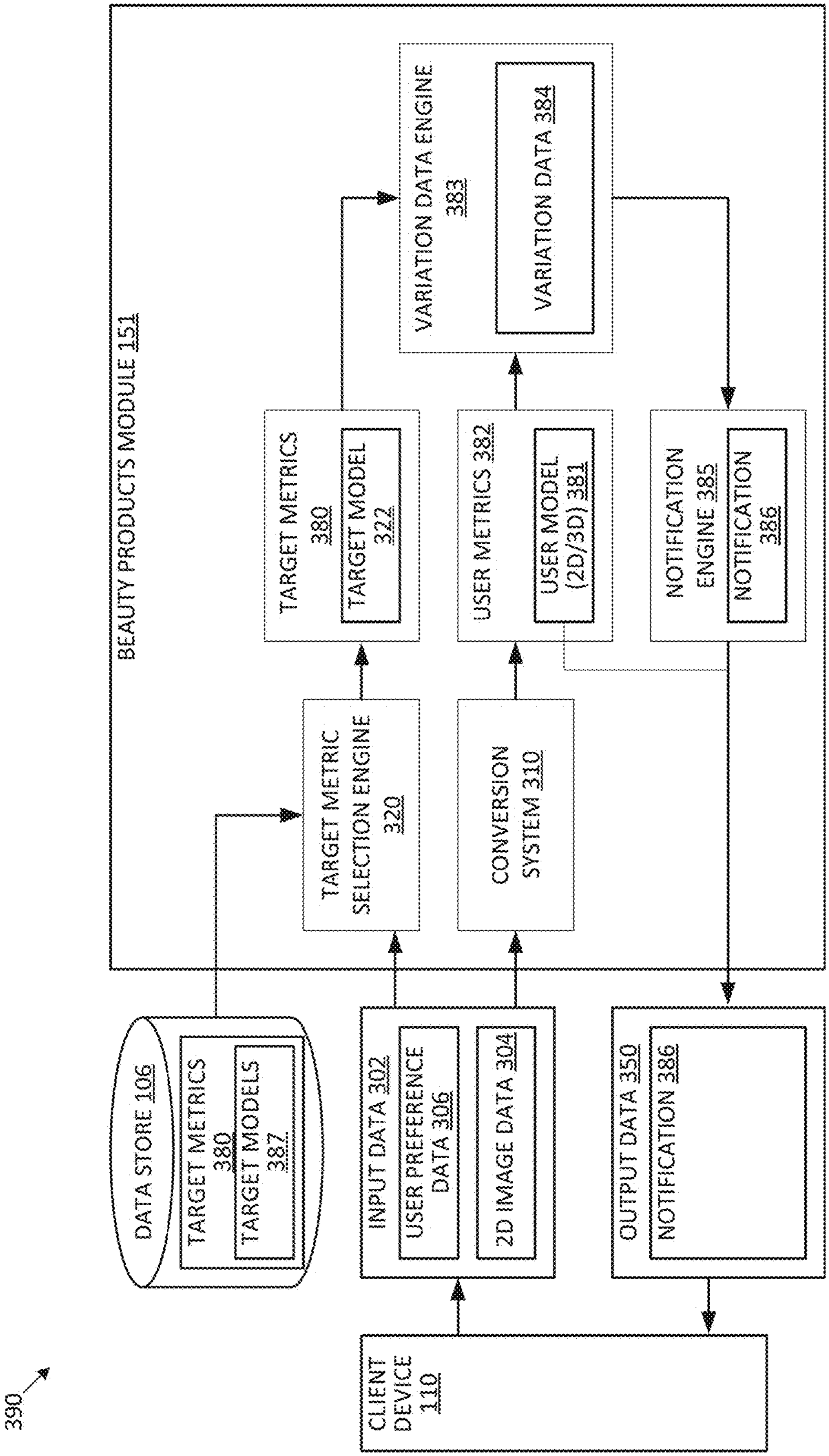
FIG. 3A-3B illustrates an example system for using 2D image data enhanced by image processing techniques along with target metrics to determine differences between the subject's face and the target metrics, in accordance with embodiments of the disclosure.

FIG. 3A illustrates an example system 390 for using 2D image data enhanced by image processing techniques along with target metrics to determine differences between the subject's face and the target metrics, in accordance with embodiments of the disclosure. System 390 can include one or more of data store 106, client device 110, and beauty products module 151, which may correspond to respective components of FIGS. 1-2. Input data 302 can be provided to beauty products module 151 by client device 110, and output data 350 can be provided to client device 110 by the beauty products platform 120, such as by beauty products module 151. Beauty products module 151 can use input data 302 to generate user metrics 382 corresponding to features (e.g., facial features) of a user's face and determine differences between the user's face and a target metrics 380. The differences can be used to generate a notification indicative of and/or identifying the differences. In some embodiments, system 390 can include more or fewer components than those depicted in FIG. 3A.

In some embodiments, client device 110 can send input data 302 to beauty products platform 120, and specifically beauty products module 151. In some embodiments, the input data 302 can include one or more of user preference data 306 and/or 2D image data 304. In some embodiments, the 2D image data 305 represents a 2D image or video (e.g., video segment) of a human face of a subject For instance and in some embodiments, the 2D image data 304 can include one or more images of a frontal view of the user's face.

In some embodiments, user preference data 306 can identify one or more user preferences of the user of client device 110. For instance and in some embodiments, the user can select a beauty target among multiple beauty targets. A beauty target (also referred to as "facial beauty target" or "facial target" herein) can refer to one or more qualities or attributes (e.g., physical characteristics, such as facial features), often of a human face, that are shared between a group. The attributes may be measurable and quantifiable using, for example, target metrics 380. Beauty target is further described below at least with respect to FIG. 9. In some embodiments, the user does not select a beauty target. In some embodiments, a beauty target be described and/or measured using target metrics 380, such as a target model 387. In some embodiments, a beauty target is selected by beauty products platform 120.

In some embodiments, target metric selection engine 320 can select the target metrics 380 that correspond to the selected beauty target. In some embodiments, a target model 322 is selected by the user among multiple target models 387. In some embodiments, the beauty products platform 120 selects the target metric without a user selection by the user. In some embodiments, the target metrics 380, such a target model 387 can be retrieved from data store 106.

A metric can refer to a description and/or measure that describes part or whole of one or more facial features and/or relationships between facial features. A target metric 380 can include data of one or more target models 387. User metrics 382 can correspond to metrics of the user, and in particular to the 2D image(s) of the user's face represented in 2D image data 304. User metrics 382 can be derived and/or generated from the 2D image data 304. A metric can include 2D information (e.g., 2D metric) and/or 3D information (e.g., 3D metric). A metric can include one or more of 2D information corresponding to facial features (e.g., one or more of 2D image data, 2D model data, 2D facial feature data, 2D geometric data, 2D facial feature relationship data, and/or 2D variation data) and/or 3D information corresponding to facial features (e.g., one or more of 3D model data of a 3D model, 3D landmark data, 3D geometric data, 3D landmark relationship data, and/or 3D variation data). A 3D model can be represented by 3D model data. 3D model data (and/or 3D model) can represent a three-dimensional digital representation of a scene or object, such as a facial feature or a human face. 3D model data can include one or more of 3D geometric data, 3D landmark data, and/or 3D landmark relationship data. A 2D model can be represented by 2D model data. 2D model data (and/or 2D model) can represent a two-dimensional digital representation of a scene or object, such as a facial feature. 2D model data can include one or more of 2D facial feature data, 2D geometric data, and/or 2D facial feature relationship data. Variation data (also referred to as "variation information" herein) can refer to information that describes the differences between the 2D information and/or 3D information corresponding to the subject's facial features and the 2D information and/or 3D information corresponding to the beauty target's facial features. 2D information and 3D information pertaining to user metrics 382 and target metrics 380 is further described at least with respect to FIGS. 5A and 5B. It can be understood that the 2D information and 3D information, combination of 2D information and/or combination of 3D information described in FIGS. 5A and 5B can be used as user metrics 382 and/or target metrics 380.

For example and in some embodiments, the target metrics 380 can include a record of one or more of points and/or dimensions of facial features of a 2D beauty target or 3D beauty target. In some embodiments, the target metrics 380 can include ratios between different facial features of a 2D beauty target or 3D beauty target. In an example, the target metrics 380 can include data (2D and/or 3D) identifying a ratio between an eye height (represented as a first line between an eye apex and an eye bottom) and an eye width (represented as a second line between an inner eye corner and an outer eye corner). In another example, the target metrics 380 can include data (2D and/or 3D) identifying the ratio of the distance between the left and right eye (e.g., distance between the inner corners of each eye) and eye width.

In some embodiments, the target metric selection engine 320 can pass the relevant target metrics 380 to variation data engine 383. In some embodiments, the target metrics 380 include relevant 2D information and/or 3D information, such as data of a particular target model 322. The variation data engine 383 can generate variation data 384 that identifies differences between the target metrics 380 and the user metrics 382.

In some embodiments, 2D image data 304 of input data 302 can be sent to conversion system 310. Conversion system 310 can use one or more image processing operations to convert the 2D image data 304 representing a 2D image(s) (and/or video) into user metrics 382, such as 2D information and/or 3D information. In some embodiments, the user metrics 382 can include a record of one or more of 2D and/or 3D points and/or 2D and/or 3D dimensions of facial features of the user. In some embodiments, the user metrics 382 can include ratios between different facial features the user. In an example, the user metrics 382 can include data (2D and/or 3D) identifying a ratio between an eye height (represented as a first line between an eye apex and an eye bottom) and an eye width (represented as a second line between an inner eye corner and an outer eye corner). In another example, the user metrics 382 can include data (2D and/or 3D) identifying the ratio of the distance between the left and right eye (e.g., distance between the inner corners of each eye) and eye width.

In some embodiments, the conversion system 310 can generate a user model 381 representing a user's face using the 2D image data 304. In some embodiments, the user model 381 can include a 2D model and/or a 3D model of the user's face. For example and in some embodiments, conversion system 310 can perform one or more image processing operations on the 2D image data 304 and generate 2D points representing one or more facial features of the user. The 2D points can be used to calculate dimensions of one or more facial features and/or 2D relationship data that reflects relationships between multiple facial features of the user.

In some embodiments, conversion system 310 can perform one or more image processing operations on the 2D image data 304 and generate 3D points representing one or more facial features of the user. The 3D points can be used to calculate dimensions of one or more facial features and/or 3D relationship data that reflects relationships between multiple facial features of the user. In some embodiments, the calculated information can be part of a 3D model representing the user's face.

In some embodiments, conversion system 310 can send the user metrics 382 to variation data engine 383. As noted above, variation data engine 383 can generate variation data 383 that identifies one or more differences between the target metrics 380 and user metrics 382. For example and in some embodiments, the variation data 383 can reflect differences in a ratio between an eye and an eye width reflected in the target metrics 380 and a ratio between an eye and an eye width reflected in the user metrics 382. In some embodiments, variation data 383 can reflect differences in a ratio between an eye height (represented as a first line between an eye apex and an eye bottom) and an eye width (represented as a second line between an inner eye corner and an outer eye corner) reflected in target metrics 380 and a ratio between an eye height and an eye width reflected in user metrics 382. Variation data is further described at least with respect to FIG. 9.

In some embodiments, variation data engine 383 can send variation data 384 to notification engine 385. Notification engine 385 can generate notification 386 for presentation at client device 110. In some embodiments, notification 386 can correspond to the variation data 384. For example and in some embodiments, the notification 386 can report the variation data 384 as a difference in values between one or more facial features of the user and the target model.

In some embodiments, the notification 386 can identify user instructions pertaining to an application of a beauty product to decrease the one or more differences. For example, the instructions can include one or more of textual instruction, video instructions, image instructions, visual indicators (e.g., overlay) that instructs the user in the application of one or more beauty products to decrease the differences between one or more regions of the user's face and the beauty target (e.g., between the user metrics 382 and target metrics 380).

In some embodiments, the notification 386 can report a score (e.g., beauty score) based on the variation data 384. The score can reflect the variation (or adherence) of the user's face and/or specific facial feature(s) to the corresponding face and/or specific facial feature(s) of the beauty target. For example, if the user's face matches a face of a target model (or target metric) the score can be 100 reflecting 100 percent adherence to the target model (or target metric). In another example, if a facial feature such as the user's eyes match the corresponding eyes of a target model, the score can also be 100 reflecting 100 percent adherence to the target model. In still another example, if the user's eyes vary from the eyes of the target model (or target metrics) by 10 percent the score can be 90 reflecting 90 percent adherence to the target model (target metrics).

In some embodiments, the notification 386 can include visual indications, such as visual elements that reflect the variation data 384. In some embodiments, the visual indications can be generated and inserted into the 2D image or video for presentation at the client device. The visual indications can provide a "paint-by-numbers" feature that directs the user to a region to add or apply one or more beauty products to reduce the differences between the user's facial features and the beauty target.

In some embodiments, the notification 386 can include a visual indication that includes a model (2D model or 3D model converted to 2D) (e.g., modified model) that is composited with 2D image or 2D video. The composited model can reflect the variation data 384. For example and in some embodiments, the composited model can reflect or show the differences between the user's face and/or features thereof and the beauty target. The modified model that is composited with the 2D image or 2D video is further described with respect to FIG. 3B.

In some embodiments, the notification 386 can include information, such as instructions, score(s), and/or visual inductions as described above that reflect changes in variation data 384. In some embodiments, the changes in variation data 384 can be caused by the application of a beauty product to one or more regions of the user's face. For example, as the user applies a beauty product (e.g., artificial lash extensions) to a region (e.g., eye area) the difference between the user's facial feature and the beauty target can change (e.g., can increase or decrease). In some embodiments, the notification 386 can be continually updated to reflect the changes. For instance, updated overlay(s) or other visual indicators can illustrate the changing correspondence between a user's facial feature and the target model with the application of a beauty product.

Figure 3B:
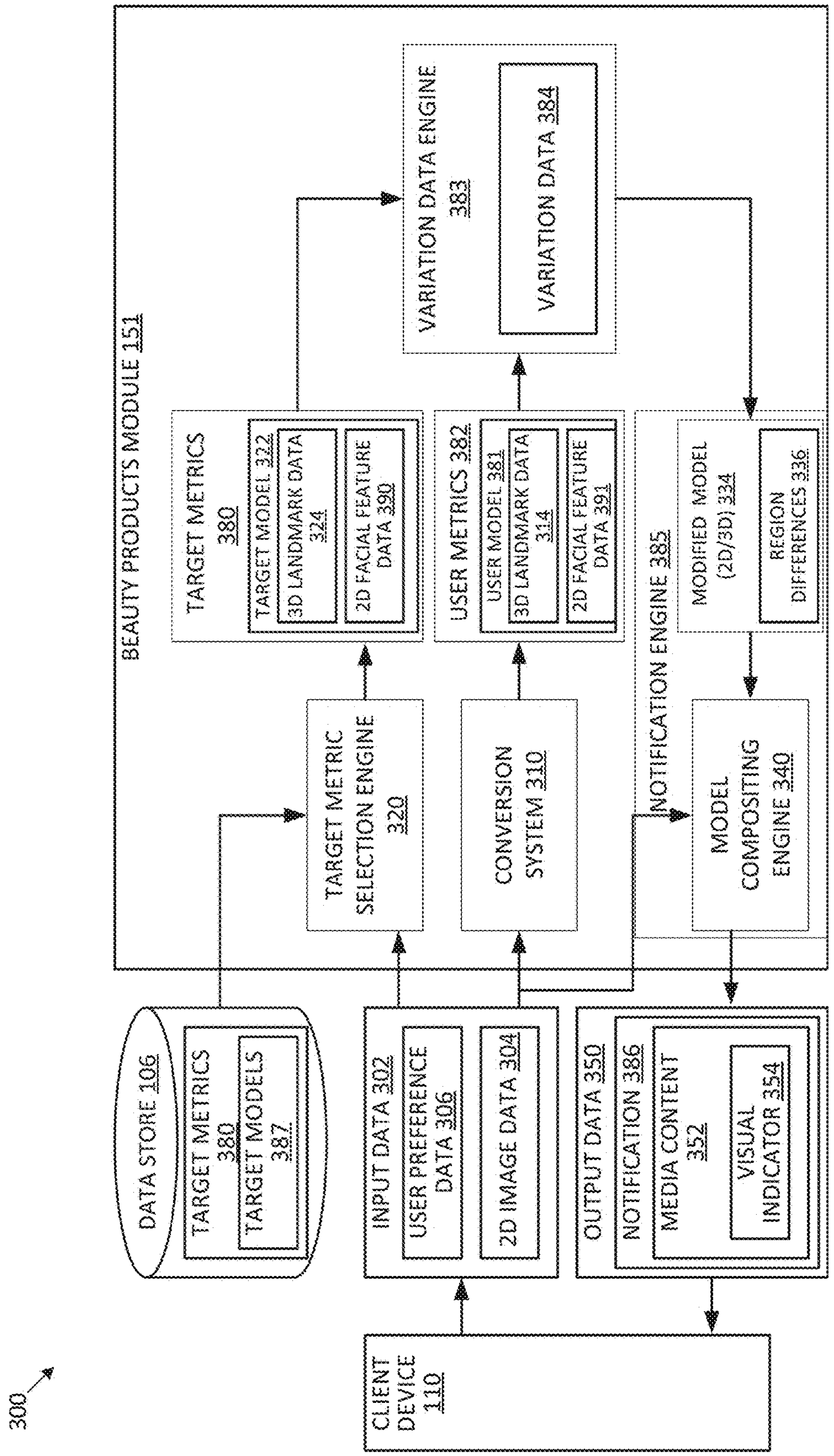

FIG. 3B illustrates an example system 300 for using 2D image data enhanced by image processing techniques along with target metrics to determine differences between the subject's face and the target metrics. System 300 includes data store 106, client device 110, and beauty products module 151, which may correspond to respective components of FIGS. 1-3A. The description of elements of FIG. 3A will not be repeated for the sake of brevity but should be understood to apply to the corresponding elements of FIG. 3B, unless otherwise described. In some embodiments, system 300 can include more or fewer components than those depicted in FIG. 3B.

As noted above and in some embodiments, target metrics 380 can be selected by target metric selection engine 320 (e.g., without selection by the user) and retrieved from data store 106. In some embodiments, target metrics 380 can be selected by the user of client device 110 where the selection is indicated by user preference data 306. For instance, the user can select a particular beauty target and the corresponding target metrics be selected by the target metric selection engine 320. In some embodiments, the selected target metrics 380 can include 3D information such as 3D model data of a target model 322. In some embodiments, the 3D model data include 3D landmark data 324. In some embodiments, one or more landmarks can be represented by 3D landmark data 324. A landmark can refer to a specific point or a specific grouping of points of a 3D model. A landmark can represent or correspond to one or more features, such as one or more facial features of a subject's face. The one or more features, such as facial features can be represented in 3D model by the specific point or specific grouping of points. For example, a landmark can correspond to or represent the right eye, the inner corner of the eyes, the bridge of the nose, and/or a center line of a face, and so forth. Although not illustrated it can be appreciated that target model 322 can include other 3D model data in some embodiments.

In some embodiments, the selected target metrics 380 can include 2D information such as 2D model data of a target model. For example, the 2D model data can include 2D facial feature data 390 representing one or more facial features of a face, such a face of a target model. In some embodiments, the target metrics 380 are sent by the target metric selection engine 320 to variation data engine 383. Although not illustrated it can be appreciated that target model 322 can include other 2D model data in some embodiments.

In some embodiments, conversion system 310 can receive 2D image data 304 representing a 2D image of the user's face. The conversion system 310 can perform one or more image processing techniques to convert the 2D image data 304 into user metrics 382. In some embodiments, the user metrics 382 can be of a 2D model and/or 3D model representing all or part (e.g., one or more particular facial features) of the user's face. In some embodiments, the user metrics 383 can include 3D landmark data 314 representing one or more facial features of the user's face. In some embodiments, the user metrics 382 can include 2D facial feature data 391 representing one or more facial features of the user's face. Although not illustrated it can be appreciated that user model 381 can include other 2D model data and/or other 3D model data, in some embodiments.

In some embodiments, conversion system 310 sends the user metrics 382 of the user model 381 to variation data engine 383. In some embodiments, variation data engine 383 generates variation data 384 that reflects differences between the target metrics 380 and the user metrics 382.

In some embodiments, the variation data 384 can be sent to the notification engine 385 where the notification engine 385 generates a notification 386 that reflects the variation data 384. In some embodiment, generating a notification 386 can include generating a modified model 334. In some embodiments, the modified model 334 reflects the variation data 384. In some embodiments, the modified model 334 reflects the differences between a face or region(s) of the face of the user and the face or region(s) or a target face the beauty target (e.g., represented by target model 322). In some embodiments, the region can refer to an area of the face. The region can include one or more facial features. The modified model 334 can include a 2D model of 3D model.

In some embodiments, the modified 2D model can be based on the 2D information, such as the 2D facial feature data 390 and 391. In some embodiments, the modified 2D model can be based on the 3D model converted to two dimensions. In some embodiments, the modified 3D model can be based on 3D information, such as 3D landmark data 314 and 324. In some embodiments, the modified 2D or 3D model can be a modified or adjusted version of the target model 322 or user model 381. In some embodiments, the modified model 334 can incorporate the differences (e.g., variation data 384) between at least one or more regions (e.g., also referred to as region differences 336) of the target face and user's face reflected in a respective one of the target metrics 380 and user metrics 382. For example, the modified model 334 can incorporate differences between the region of the eyes of the target metrics 380 and user metrics 382.

In some embodiments, notification engine 385 can generate a visual indicator 354 reflecting the differences between the target metrics 380 and the user metrics 382. In some embodiments, the visual indicator 354 can be composited with an image or video, such as an image or video of a user's face represented by 2D imaged data 304. Compositing can refer to combining multiple visual elements (often from separate sources) into a single image or video. In some embodiments, model compositing engine 340 can generate an overly using the modified model 334 and composite the overlay with the 2D image represented by 2D image data 304. In some embodiments, the modified model 334 can be composited with the 2D image of the user's face and the composited 2D image (or 2D video) can be provided for presentation at the client device 110. In some embodiments, the visual indicator 354 can be for the entire face. In some embodiments, the visual indicator 354 can be for one or more specific regions of the face. For example, the visual indicator 354 can be generated for one or more of the eye area of the user, the cheeks of the user, the nose of the user, the eyebrows of the user, the lips of the user and so forth. In some embodiments, it can be appreciated that the visual indicator 354 can reflect any of the model data (2D and/or 3D) as described with respect to FIG. 5A through 5B as described below.

In some embodiments, the visual indicator 354 can displayed with the 2D image of the user's face via the 2D image data. In some embodiment, the visual indicator 354 can be displayed as composited with the 2D image or 2D video of the user's face.

In some embodiments, the operations described with respect to FIGS. 3A and 3B can be used to continually update the variation data 384 to reflect the application of one or more beauty products to a user's face. In some embodiments, the changes in variation data 384 can be caused by the application of a beauty product to one or more regions of the user's face. For example, as the user applies a beauty product (e.g., artificial lash extensions) to a region (e.g., eye area) the difference between the user's facial feature and the beauty target can change (e.g., can increase or decrease). In some embodiments, the modified model 334 for can be continually updated to reflect the changes. The model composting engine 340 can continually composite changing visual indicators 354 to the same or new 2D images and 2D video to reflect the changes to the user's facial features caused by the application of a beauty product.

Figure 4A:
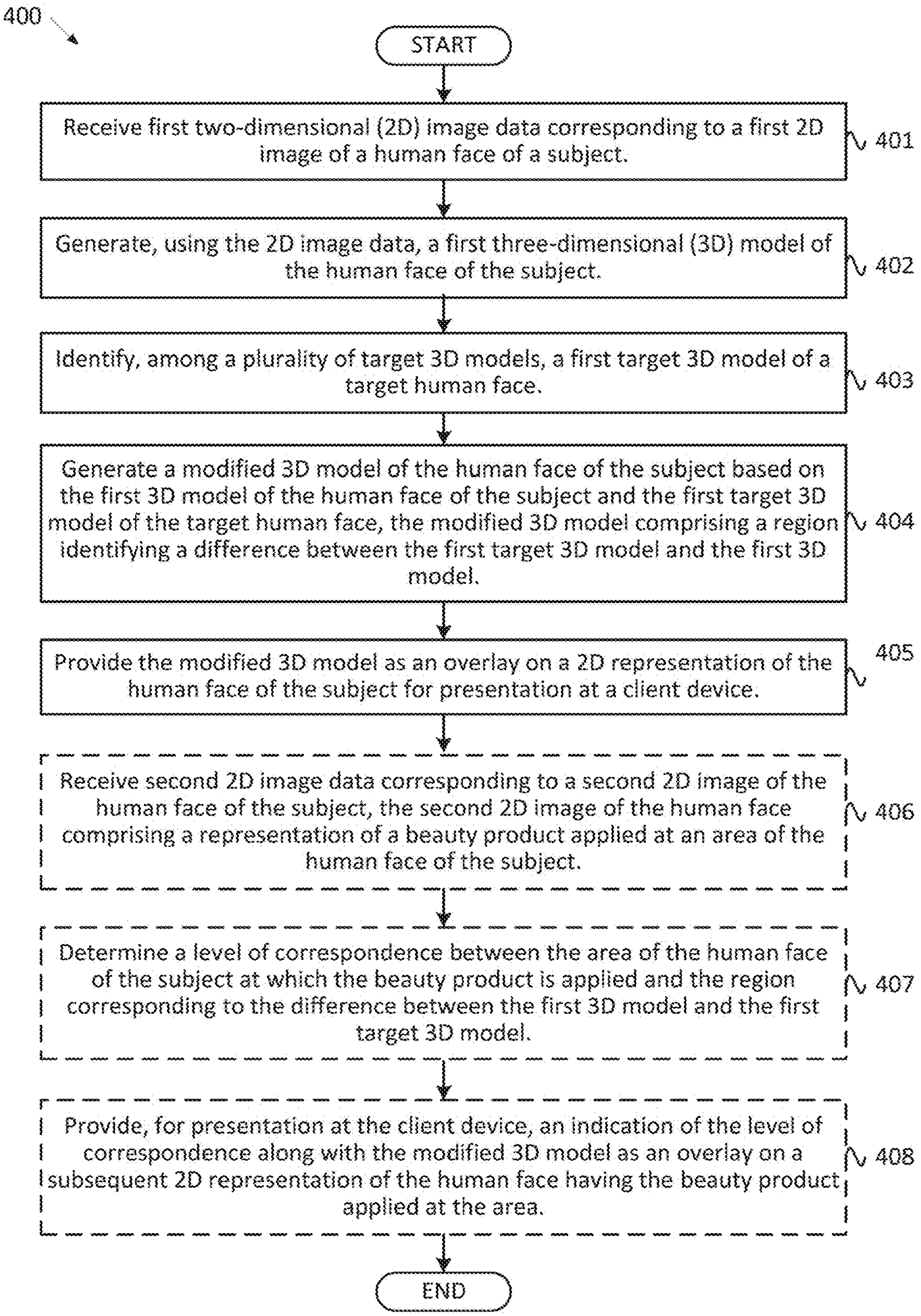
FIGS. 4A-B depicts a flow diagram of an example method for using two-dimensional images and target three-dimensional models to determine feedback for application of beauty products, in accordance with some embodiments of the disclosure.

FIG. 4A depicts a flow diagram of one example of a method 400 for using 2D images to determine feedback for application of beauty products, in accordance with embodiments of the disclosure. The method 400 is performed by processing logic that can include hardware (circuitry, dedicated logic, etc.), software (e.g., instructions run on a processing device), or a combination thereof. In one embodiment, some or all the operations of method 400 can be performed by one or more components of system 100, system 200, system 260, system 390 or system 300 of FIGS. 1-3B, such as beauty products module 151. It can be noted that components described with reference to FIGS. 1-3B can be used to illustrate aspects of FIG. 4A. In some embodiments, the operations (e.g., operations 401-408) can be the same, different, fewer, or greater. For example, operations indicated with a dashed outline (e.g., 406-408) may be absent in some embodiments.

At operation 401, processing logic implementing the method 400 receives first two-dimensional (2D) image data corresponding to a first 2D image of a human face of a subject.

At operation 402, processing logic generates, using the first 2D image data, a first three-dimensional (3D) model of the human face of the subject. In some embodiments, the first 3D model comprises a geometric model. In some embodiments, generating the first 3D model of the human face of the subject comprises identifying a landmark corresponding to a facial feature of the human face of the subject. In some embodiments, generating the modified 3D model of the human face comprises determining a difference between the landmark corresponding to the facial feature of the human face of the subject and a target landmark of the first target 3D model of the target human face, wherein the target landmark corresponds to the landmark. In some embodiments, the landmark is a first landmark, and generating the modified 3D model of the human face comprises: determining a first metric associated with the first landmark corresponding to the facial feature of the human face of the subject; determining a second metric associated with a second landmark corresponding to another facial feature of the human face of the subject; and determining a difference in a ratio of the first metric and the second metric and a pre-determined ratio corresponding to the first target 3D model, wherein the difference is reflected in the modified 3D model. In some embodiments, generating, using the first 2D image data, the first 3D model using the first 2D image data of the human face of the subject, comprises: providing the first 2D image data as input to a machine learning model; and obtaining one or more outputs of the machine learning model, the one or more outputs corresponding to the first 3D model At operation 403, processing logic identifies, among a plurality of target 3D models, a first target 3D model of a target human face. In some embodiments, identifying the first target 3D model of the target human face comprises: providing the plurality of target 3D models for user selection at the client device; and receiving, from the client device, an indication of a user selection of the first target 3D model from the plurality of target 3D models.

At operation 404, processing logic generates a modified 3D model of the human face of the subject based on the first 3D model of the human face of the subject and the first target 3D model of the target human face, the modified 3D model comprising a region identifying a difference between the first target 3D model and the first 3D model.

At operation 405, processing logic provides the modified 3D model as an overlay on a 2D representation of the human face of the subject for presentation at a client device. In some embodiments, providing the modified 3D model as the overlay on the 2D representation of the human face of the subject for presentation at the client device comprises providing one or more visual indicators identifying the region corresponding the difference between the first 3D model and the first target 3D model.

At operation 406, processing logic receives second 2D image data corresponding to a second 2D image of the human face of the subject, the second 2D image of the human face comprising a representation of a beauty product applied at an area of the human face of the subject.

At operation 407, processing logic provides, for presentation at the client device, an indication of the level of correspondence along with the modified 3D model as an overlay on a subsequent 2D representation of the human face having the beauty product applied at the area.

At operation 408, processing logic generates, for presentation at a client device, an updated 2D image of the eye area of the subject, the updated 2D image representing the first false eyelash applied to the eye area of the subject. In some embodiments, the updated 2D image may be included in false eyelash media content 282 and may be generated by augmented reality module 270. In some embodiments, the updated 2D image represents one or more artificial lash extensions applied to the underside or topside of natural lashes of the subject.

Figure 4B:
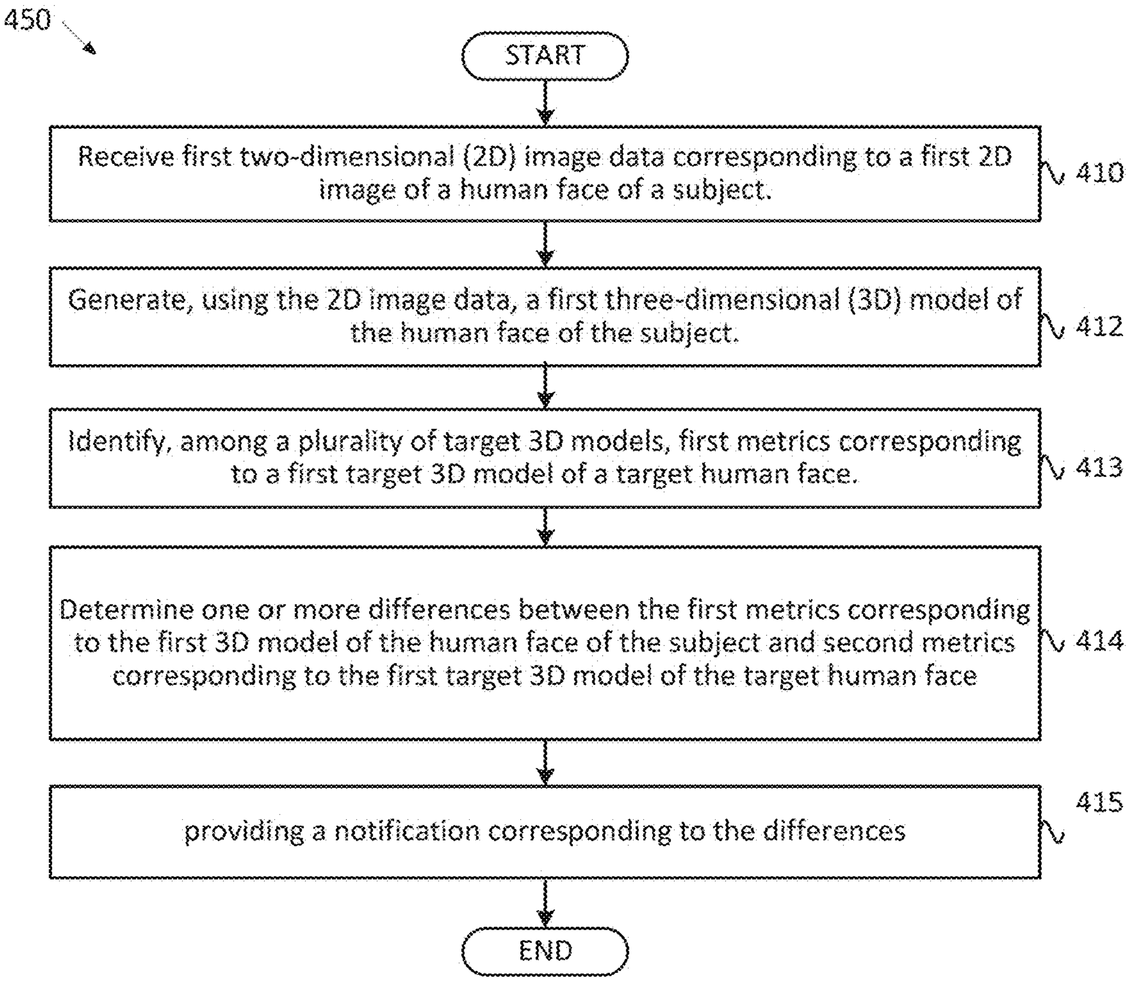

FIG. 4B depicts a flow diagram of one example of a method 450 for using 2D images to determine feedback for application of beauty products, in accordance with embodiments of the disclosure. The method 450 is performed by processing logic that can include hardware (circuitry, dedicated logic, etc.), software (e.g., instructions run on a processing device), or a combination thereof. In one embodiment, some or all the operations of method 450 can be performed by one or more components of system 100, system 200, system 260, system 390 or system 300 of FIGS. 1-3B, such as beauty products module 151. It can be noted that components described with reference to FIGS. 1-3B can be used to illustrate aspects of FIG. 4B. In some embodiments, the operations (e.g., operations 410-415) can be the same, different, fewer, or greater. For example, operations indicated with a dashed outline (e.g., 406-408) may be absent in some embodiments.

At operation 401, processing logic implementing the method 400 receives first two-dimensional (2D) image data corresponding to a first 2D image of a human face of a subject.

At operation 402, processing logic generates, using the first 2D image data, a first three-dimensional (3D) model of the human face of the subject. In some embodiments, the first 3D model comprises a geometric model.

At operation 403, processing logic identifies, among a plurality of target 3D models, first metrics corresponding to a first target 3D model of a target human face.

At operation 404, processing logic determines one or more differences between the first metrics corresponding to the first 3D model of the human face of the subject and second metrics corresponding to the first target 3D model of the target human face At operation 405, processing logic, providing, to a client device, a notification corresponding to the differences.

Figure 4C:
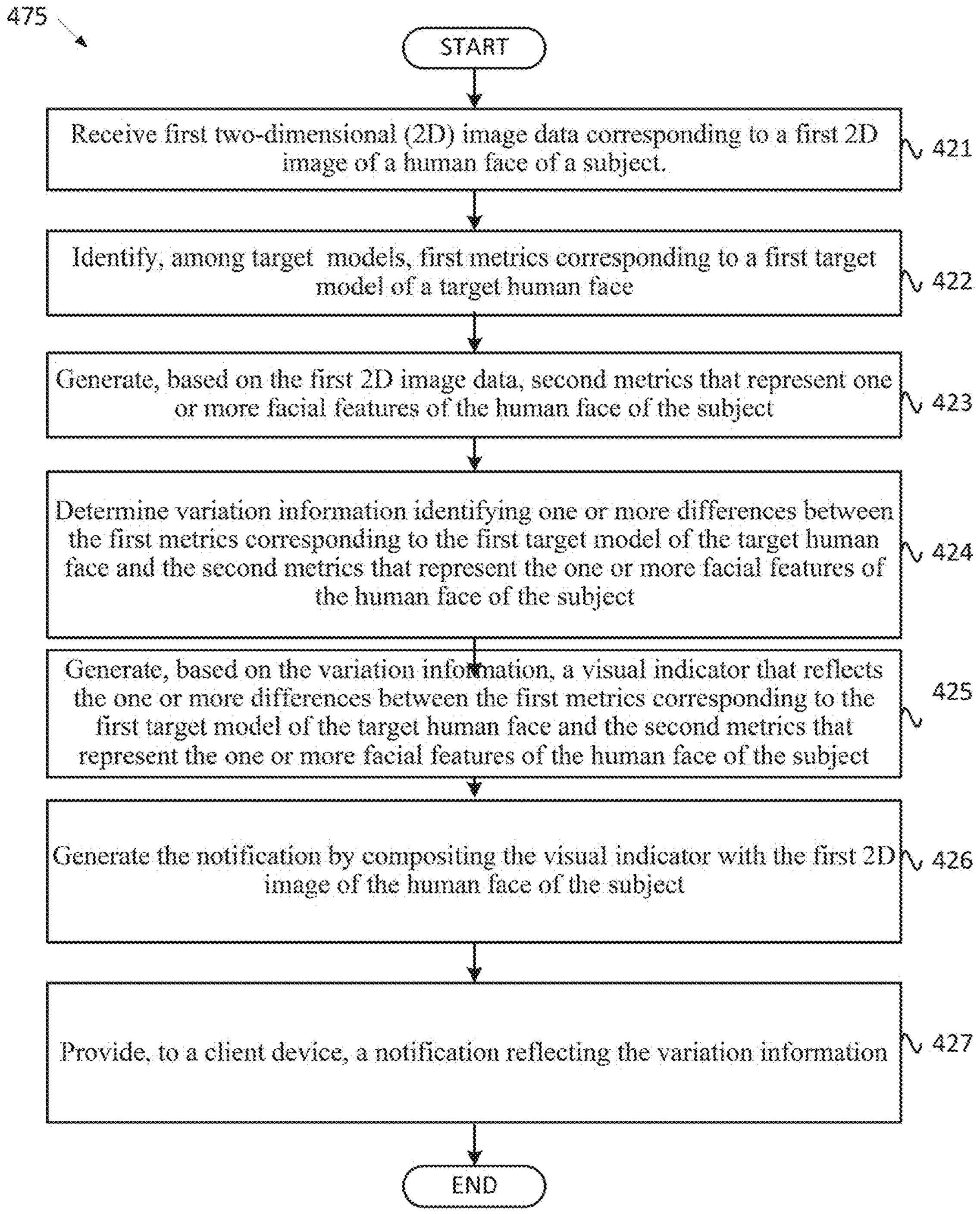
FIG. 4C depicts a flow diagram of one example of a method using 2D image data enhanced by image processing techniques along with target metrics to determine differences between the subject's face and the target metrics.

FIG. 4C depicts a flow diagram of one example of a method using 2D image data enhanced by image processing techniques along with target metrics to determine differences between the subject's face and the target metrics. The method 475 is performed by processing logic that can include hardware (circuitry, dedicated logic, etc.), software (e.g., instructions run on a processing device), or a combination thereof. In one embodiment, some or all the operations of method 475 can be performed by one or more components of system 100, system 200, system 260, system 390 or system 300 of FIGS. 1-3B, such as beauty products module 151. It can be noted that components described with reference to FIGS. 1-3B can be used to illustrate aspects of FIG. 4C. In some embodiments, the operations (e.g., operations 421-426) can be the same, different, fewer, or greater.

At operation 421, processing logic receives first two-dimensional (2D) image data corresponding to a first 2D image of a human face of a subject.

At operation 422, processing logic identifies, among target models, first metrics corresponding to a first target model of a target human face. In some embodiments, to identify, among the plurality of target models, the first metrics corresponding to the first target model of the target human face processing logic provides an indication of the plurality of target models for user selection at the client device. Processing logic receives, from the client device, an indication of a user selection of the first target model from the plurality of target models.

At operation 423, processing logic generates, based on the first 2D image data, second metrics that represent one or more facial features of the human face of the subject. In some embodiments to generate, using the first 2D image data, of the second metrics that represent the one or more facial features of the human face of the subject, processing logic provides the first 2D image data as input to a machine learning model. Processing logic obtains one or more outputs of the machine learning model, the one or more outputs identifying the second metrics.

At operation 424, processing logic determines variation information identifying one or more differences between the first metrics corresponding to the first target model of the target human face and the second metrics that represent the one or more facial features of the human face of the subject. In some embodiments, the first metrics include a first ratio of a first target facial feature to a second target facial feature. The second metrics include a second ratio of a first facial feature of the one or more facial features to a second facial feature of the one or more facial features of the human face of the subject. In some embodiments, the variation information identifies a difference between the first ratio and the second ratio.

At operation 425, processing logic generates, based on the variation information, a visual indicator that reflects the one or more differences between the first metrics corresponding to the first target model of the target human face and the second metrics that represent the one or more facial features of the human face of the subject.

At operation 426, processing logic generates the notification by compositing the visual indicator with the first 2D image of the human face of the subject.

At operation 427, processing logic provides, to a client device, a notification reflecting the variation information. In some embodiments, the notification identifies user instructions pertaining to an application of a beauty product to decrease the one or more differences.

In some embodiments, the first target model is a first target 3D model. To generate, based on the first 2D image data, the second metrics that represent the one or more facial feature of the human face of the subject processing logic generates, using the first 2D image data, a first three-dimensional (3D) model of the human face of the subject, wherein the second metrics correspond to the first 3D model. In some embodiments, to generate the visual indicator processing logic generates a modified 3D model of the human face of the subject based on the first 3D model of the human face of the subject and the first target 3D model of the target human face, the modified 3D model that includes a region corresponding to the one or more differences between the first metrics corresponding to the first target 3D model and the second metrics corresponding to the first 3D model. In some embodiments, to generate the notification by compositing the visual indicator on the first 2D image of the human face of the subject processing logic composites the modified 3D model with the first 2D image of the human face.

In some embodiments, to generate the first 3D model of the human face of the subject, processing logic identifies a landmark corresponding to a facial feature of the one or more facial features of the human face of the subject.

In some embodiments, to generate the modified 3D model of the human face processing logic determines a difference between the landmark corresponding to the facial feature of the human face of the subject and a target landmark of the first target 3D model of the target human face, wherein the target landmark corresponds to the landmark.

In some embodiments, subsequent to operation 427, processing logic receives second 2D image data corresponding to a second 2D image of the human face of the subject, the second 2D image of the human face including a representation of a beauty product applied at a region of the human face of the subject. In some embodiments, processing logic generates, based on the second 2D image data, third metrics that represent the one or more facial features with the applied beauty product. In some embodiments, processing logic determines additional variation information identifying one or more additional differences between the first metrics corresponding to the first target model and the third metrics that represent the one or more facial features with the applied beauty product. In some embodiments, processing logic generates, based on the additional variation information, an additional visual indicator that reflects the one or more additional differences between the first metrics and the third metrics. In some embodiments, processing logic generates the notification by composing the additional visual indicator to the second 2D image of the human face of the subject.

Figure 5A:
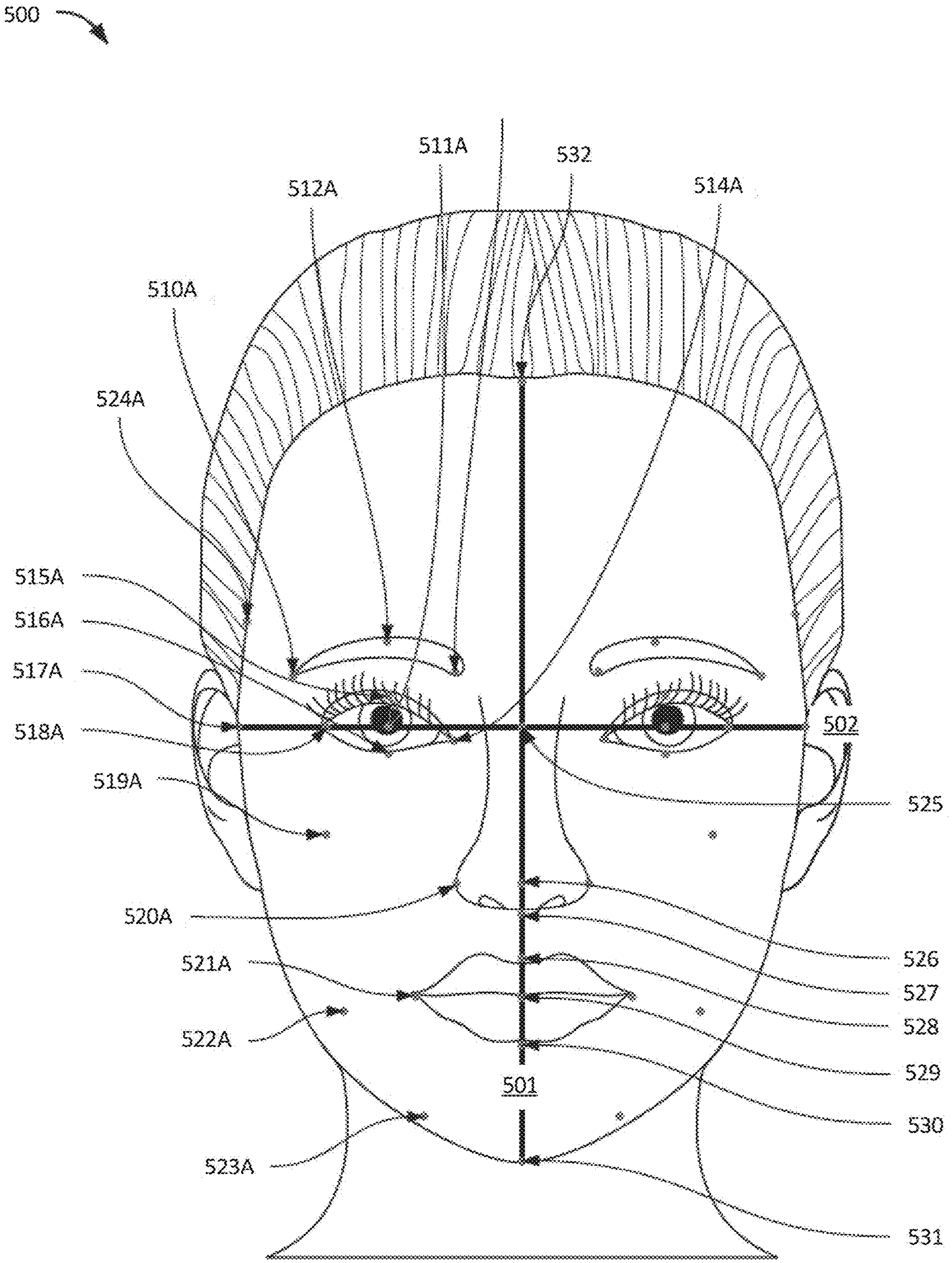
FIG. 5A illustrates an example human face that can be represented by image data, in accordance with some embodiments of the disclosure.

FIG. 5A illustrates a depiction of a human face 500, in accordance with embodiments of the disclosure. Human face 500 is illustrated as a 2D representation of a 3D model for purposes of illustration, rather than limitation. Points on the human face 500 are described here as 3D points of a 3D model, for purposes of illustration rather than limitation. It should be noted that the description of FIG. 5A can apply equally to a 2D image and/or 2D points, unless otherwise described.

In some embodiments, multiple reference points (e.g., 3D points 510-532) can correspond to or represent facial features of the human face 500. In some embodiments, a number of 3D points 510-532 that correspond to each 3D landmark can be the same. For example, the number of 3D points corresponding to the nose can be the same as the number of 3D points corresponding to the mouth. In some embodiments, the number of 3D points 510-532 that correspond to each 3D landmark can be different. In some embodiments, the number of 3D points 510-532 that correspond to each 3D landmark can be based on an importance of the 3D landmark. For example, a machine learning model can determine that the nose has a higher importance than the mouth, and more 3D points can be generated and/or used to correspond to the nose than to the mouth. In some embodiments, the number of 3D points that correspond to each 3D landmark can be determined by the training set generator 131 or model 160 of FIG. 1, and/or received as input to the model 160 or training set generator 131.

As illustrated in FIG. 5A, 3D points 510A-524A correspond to one half of the face. 3D points 510B-524B (not illustrated) correspond to the other half of the face, but for clarity, are not labeled in FIG. 5A. It can be appreciated that each of the illustrated 3D points 510A-524A corresponds to a respective 3D point 510B-524B opposite the centerline (e.g., symmetric about the centerline). 3D points 525-531 line on, or near the centerline 501. As used herein, 3D points 510-532 can collectively refer to 3D points 510A-524A, 3D points 510B-524B (also, referred to herein as 3D points 510A/B-524A/B), and 3D points 525-531. As used herein, 3D points 510-532 can be referred to individually such as "3D point 510A," or "3D point 510B," or "3D point 510A/B," or "3D point 510," or "3D point 525" respectively as applicable.

It can be appreciated that the 3D points 510-532 do not represent an exhaustive list of 3D reference points for a human face but are merely illustrative of the types of 3D reference points that can be used by a machine learning model in the process of identifying 3D landmarks that correspond to facial features based on human face data (e.g., 2D image data). In some embodiments, one or more 3D points 510-532 can correspond to one or more 3D landmarks of 3D landmark data. In some embodiments, corresponding 2D points can correspond to one or more facial features of 2D facial feature data.

3D Landmark Data

In some embodiments, the following illustratively named 3D points and groups of 3D points 510-532 (as described herein below) can represent 3D landmark data of the human face 500, such as 3D landmark data 216 of FIG. 2. In some embodiments, corresponding 2D points (which may be located at similar x-, y-coordinate positions as respective 3D points 510-532) can represent 2D facial feature data of the human face 500. For example, 3D point 525 can be representative of a "center point of the face," and can correspond to a 3D landmark. In another example, centerline 501 approximately intersects a majority of the 3D points 525-532 and can represent the "centerline of the face," and can represent a 3D landmark of 3D landmark data. In another example, the horizontal line 502 approximately intersects a majority of 3D points 511A/B, 518A/B, 517A/B, and 525, and can be a 3D landmark of 3D landmark data.

In some embodiments, 3D point 510 can be representative of an "outer brow corner."

In some embodiments, 3D point 511 can be representative of a "center of the pupil" or "eye center." As used herein, "pupil" can refer to the adjustable opening in the center of the eye that regulates the amount of light entering the eye. Generally, the pupil can be dark in color (e.g., black), and is surrounded by the iris. As used herein, "iris" can refer to a colored muscular structure that can contract or dilate to control the size of the pupil (e.g., to control the amount of light entering the eye). The iris is surrounded by the sclera. As used herein, "sclera" can refer to a light-colored (e.g., white, or nearly white) outer layer that protects maintains the structural integrity of the eyeball.

In some embodiments, 3D point 512 can be representative of a "brow apex."

In some embodiments, 3D point 513 can be representative of an "inner brow corner."

In some embodiments, 3D point 514 can be representative of an "inner eye corner."

In some embodiments, 3D point 515 can be representative of an "eye apex."

In some embodiments, 3D point 516 can be representative of an "eye bottom (nadir)."

In some embodiments, 3D point 517 can be representative of a "temporomandibular joint (TMJ)."

In some embodiments, 3D point 518 can be representative of an "outer eye corner."

In some embodiments, 3D point 519 can be representative of a "cheekbone," or "upper cheek."

In some embodiments, 3D point 520 can be representative of an "alar wing."

In some embodiments, 3D point 521 can be representative of a "mouth corner."

In some embodiments, 3D point 522 can be representative of a "lower cheek."

In some embodiments, 3D point 523 can be representative of a "chin." As illustrated, in some embodiment, 3D point 523 is located based on the position of 3D point 521 (e.g., the mouth corner) outline of the shape of the human face (e.g., a lower jawline).

In some embodiments, 3D point 524 can be representative of a "temple."

In some embodiments, 3D point 525 can be representative of a "center point," and/or the "center of the bridge of the nose."

In some embodiments, 3D point 526 can be representative of a "nose tip."

In some embodiments, 3D point 527 can be representative of a "nose bottom (nadir)."

In some embodiments, 3D point 528 can be representative of a "lips apex."

In some embodiments, 3D point 529 can be representative of a "lips center."

In some embodiments, 3D point 530 can be representative of a "lips bottom (nadir)."

In some embodiments, 3D point 531 can be representative of a "chin bottom (nadir)."

In some embodiments, 3D point 532 can be representative of a "forehead apex."

In some embodiments, 3D points 510, 512, and 513 can be representative of the "brow" or "eyebrow" facial feature.

In some embodiments, 3D points 511, 514, 515, 516, and 518 can be representative of the "eye" facial feature.

In some embodiments, 3D points 510-513 can be representative of an "eyelid area" facial feature.

In some embodiments, 3D points 510-518 can be representative of the "eye area" facial feature.

In some embodiments, 3D points 520A/B, and 525-527 can be representative of the
"nose" facial feature.

In some embodiments, 3D points 521A/B and 528-530 can be representative of the "mouth" facial feature.

In some embodiments, 3D points 519 and 522 can be representative of the "cheek" facial feature.

In some embodiments, 3D points 517A/B, 523A/B and 531 can be representative of the "jawline," or "lower face shape" facial feature.

In some embodiments, 3D points 523A/B and 530-531 can be representative of the "chin" facial feature.

3D Geometric Data 3D geometric data (e.g., 3D geometric data 246A) can describe a scene or object, and can include one or more vertices (e.g., points), edges, and/or faces of a 3D model represented by 3D model data (e.g., 3D model data 233A). In some embodiments, 3D geometric data can be represented by x-, y-, z-coordinate positions of one or more 3D points. For example, an x-, y-, z-coordinate position of the nose tip (e.g., 3D point 526) can represent a portion of 3D geometric data.

In some embodiments, 3D geometric data can be represented as a relationship between two or more 3D points of a particular facial feature. For example, a distance between the 3D point 520A and the 3D point 520B can represent a portion of 3D geometric data. In another example, centerline 501 can represent a relationship (e.g., a distance) between 3D point 531 and 3D point 532 as a "face height." In another instance, horizontal line 502 can represent a relationship (e.g., a distance) between 3D points 517A/B as a "face width." In some embodiments, 2D geometric data can similarly be represented by x-, y-coordinate positions of a 2D point, or a relationship between two or more 2D points. In some embodiments, a relationship between two or more points (e.g., two or more 2D points or two or more 3D points) can correspond to a facial feature.

In some embodiments, a relationship between 3D point 510A and 3D point 510B can represent an "outer brow width."

In some embodiments, a relationship between 3D point 511A and 3D point 511B can represent an "inner pupillary distance (IPD)."

In some embodiments a relationship between 3D point 513A and 3D point 513B can represent an "inner brow distance."

In some embodiments, a relationship between 3D point 518A and 3D point 514A can represent an "eye width."

In some embodiments, a relationship between 3D point 514A and 3D point 514B can represent an "inner eye corner distance."

In some embodiments, a relationship between 3D point 520A and 3D point 520B can represent a "nose width."

In some embodiments, a relationship between 3D point 525 and 3D point 527 can represent a "nose height."

In some embodiments, a relationship between 3D point 521A and 3D point 521B can represent a "mouth width."

In some embodiments, a relationship between 3D point 528 and 3D point 530 can represent a "mouth height."

3D Landmark Relationship Data 3D landmark relationship data (e.g., 3D landmark relationship data 247A) can describe a relationship between first information corresponding to a first facial feature (e.g., 3D landmark data 245A or 3D geometric data 246A) and second information of a second facial feature (e.g., a relationship between two or more facial features). In some embodiments, 3D geometric data can describe relationships between 3D points corresponding to the same facial feature (e.g., lengths, distances, ratios, etc. derived between 3D landmark data and 3D geometric data), 3D landmark relationship data can describe relationships between 3D points corresponding to different facial features. For example, a ratio of the length of the centerline 501 to the length of the horizontal line 502 can represent 3D landmark relationship data. In another example, a difference between a first slope of the horizontal line 502 and a second slope of a line between the inner and outer eye corners (e.g., 3D points 514 and 518 respectively) can be expressed as an angle and represent 3D landmark relationship data. In another example, a difference in the x-, y-, z-coordinate position of the 3D points representing the nose and 3D points representing an eye can be expressed as a ratio or distance and represent 3D landmark relationship data. In another example, a relationship between a width of the nose (e.g., first facial feature), and a width of an eye (e.g., second facial feature) can be a portion of 3D landmark relationship data. A specific illustrative example of 3D landmark relationship data is described below with reference to FIG. 5B. In some embodiments, 2D facial feature relationship data can similarly describe relationships between 2D points of two or more (different) facial features (e.g., based on 2D facial feature data 242A, and 2D geometric data 243A).

Figure 5B:
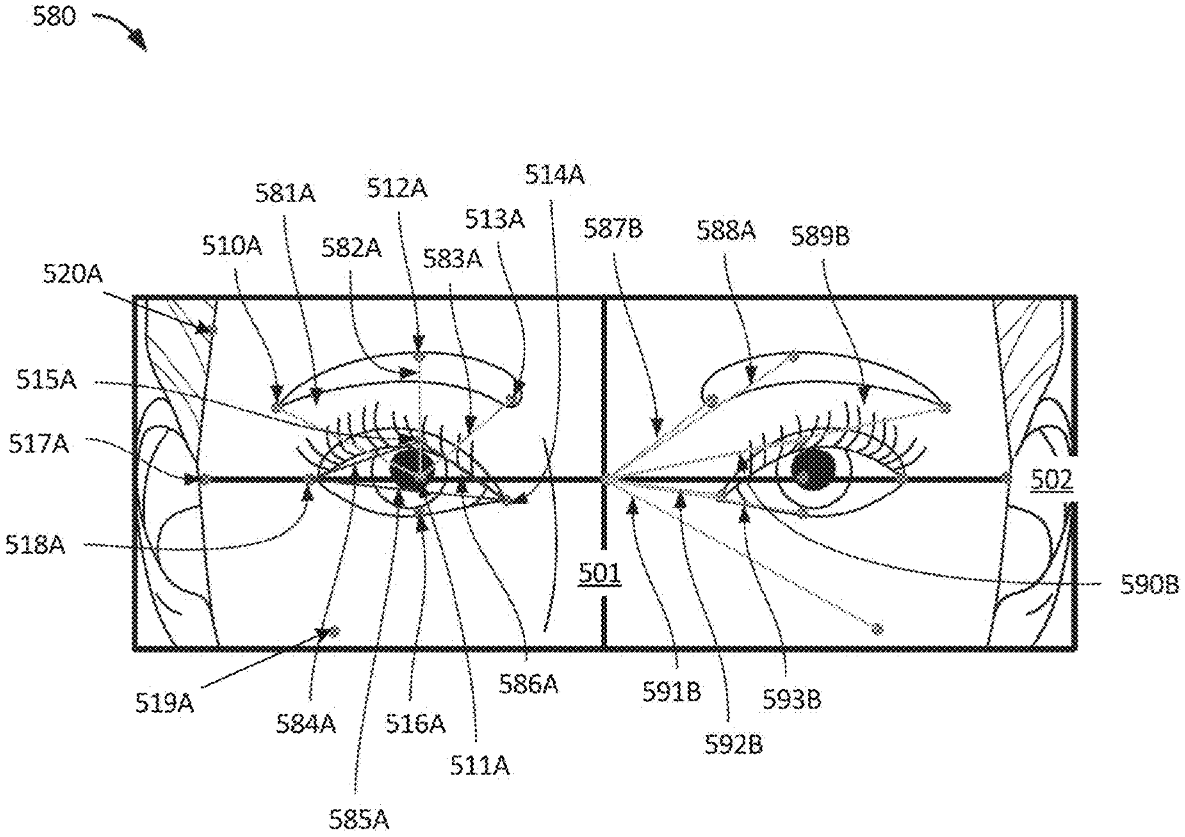
FIG. 5B represents an example eye area of an example human face that can be represented by image data, in accordance with some embodiments of the disclosure.

FIG. 5B illustrates a depiction of an eye area 580 of a human face, in accordance with embodiments of the disclosure. In some embodiments, the human face can be a human face 500 as described with reference to FIG. 5A. Eye area 580 includes 3D relationships 581-586 and 3D relationships 587-593 (also referred to collectively as "3D relationships 581-593") between 3D points 510-519 as illustrated above in FIG. 5A. In some embodiments, the illustrative depictions of 3D relationships 581-593 can represent relationships between 3D points (e.g., 3D geometric data 246A). In some embodiments, the illustrative depictions of 3D relationships 581-593 can represent relationships between 3D landmarks (e.g., 3D landmark relationship data). In some embodiments, 3D relationships, such as 3D relationships 581-593, can represent 3D landmark relationship data.

Eye area 580 is illustrated as a 2D representation of a 3D model for purposes of illustration, rather than limitation. Points on eye area 580 are described here as 3D points of a 3D model, for purposes of illustration rather than limitation. It should be noted that the description of FIG. 5B can apply equally to a 2D image and/or 2D points unless otherwise described.

As illustrated in FIG. 5B, 3D relationships 581-593 correspond to one half of the face. It can be appreciated that for clarity, each of the 3D relationships 581-593 have been illustrated only on one half of the face, but that each of the 3D relationships 581-593 can correspond to either side of the face (not illustrated). It can be appreciated that the 3D relationships 581-593 do not represent an exhaustive list of relationships between reference points for the eye area 580 a human face, but are merely illustrative of the types of relationships that can be used by a machine learning model in the process of identifying 3D landmark relationship data (e.g., 3D relationship data 234) based on image input data (e.g., 2D image data 204 and 3D model data 214). In some embodiments, relationships represented in 2D facial feature relationship data (e.g., 2D relationship data 232) can similarly be identified by a machine learning model based on image input data (e.g., 2D image data 204 and 3D model data 214).

In some embodiments, multiple relationships (e.g., represented by 3D geometric data) between reference points (e.g., 3D points 510-532) can correspond to or represent facial features of the eye area 580. In some embodiments, a number of relationships (e.g., represented by 3D geometric data) that correspond to each facial feature can be the same (e.g., each facial feature has an equal number of relationships), or can be based on an importance of the facial feature (e.g., more important facial features (for example, as determined by an algorithm or machine learning model) have a higher number of relationships than less important facial features). In some embodiments, multiple relationships represented by 2D geometric data can similarly correspond to or represent facial features of the eye area 580.

In some embodiments, multiple relationships (e.g., represented by 3D landmark relationship data) between 3D landmarks represented in the eye area 580 can correspond to facial features of the eye area 580. In some embodiments, a number of relationships (e.g., represented by 3D relationship data 234) can be based on an importance of the facial feature, such as an importance determined by an algorithm or machine learning model (e.g., more important 3D landmarks can have a higher number of relationships to other 3D landmarks than less important 3D landmarks).

In some embodiments, 3D relationship 581A can span between 3D point 510A and 3D point 511A (e.g., between the outer brow corner and the eye, such as the pupil or center of the pupil).

In some embodiments, 3D relationship 582A can span between 3D point 512A and 3D point 511A (e.g., between the brow apex and the eye, such as the pupil or center of the pupil).

In some embodiments, 3D relationship 583A can span between 3D point 513A and 3D point 511A (e.g., between the inner brow corner and the eye, such as the pupil or center of the pupil).

In some embodiments, 3D relationship 584A can span between 3D point 515A and 3D point 518A (e.g., between the eye apex and the outer eye corner).

In some embodiments, 3D relationship 585A can span between 3D point 514A and 3D point 518A (e.g., between the inner eye corner and the outer eye corner).

In some embodiments, 3D relationship 586A can span between 3D point 514A and 3D point 515A (e.g., between the eye apex and the inner eye corner).

In some embodiments, 3D relationships 587-593 can span between 3D point 525 (e.g., the center point) and respective 3D points of the eye area 580.

For example, 3D relationship 587B can span between 3D point 525 and 3D point 513A (e.g., the inner brow corner).

For example, 3D relationship 588B can span between 3D point 525 and 3D point 512A (e.g., brow apex).

For example, 3D relationship 589B can span between 3D point 525 and 3D point 510A (e.g., outer brow corner).

For example, 3D relationship 590B can span between 3D point 525 and 3D point 515A (e.g., eye apex).

For example, 3D relationship 591B can span between 3D point 525 and 3D point 519A (e.g., cheekbone).

For example, 3D relationship 592B can span between 3D point 525 and 3D point 514A (e.g., inner eye corner).

For example, 3D relationship 593B can span between 3D point 525 and 3D point 516A (e.g., eye bottom (nadir)).

In some embodiments, a ratio between two or more 3D relationships 581-593 corresponding to different facial features can represent a relationship between two or more 3D landmarks (e.g., 3D relationship data 234). Similarly, in some embodiments, a ratio between two or more 2D relationships corresponding to different facial features can represent a relationship between two or more 2D facial features (e.g., 2D relationship data 232).

For example, for the facial features of the brow (e.g., represented by 3D points 510, 512, and 513) and the eye (represented by 3D points 511, 514, 515, 516, and 518), a ratio between the eye width (e.g., 3D relationship 585A) and the brow height (e.g., 3D relationship 582A) can be 3D landmark relationship data expressed as a ratio of eye-width to brow-height.

In some embodiments, an angle between two or more 3D relationships 581-593 corresponding to different facial features can represent a relationship between two or more 3D landmarks (e.g., 3D relationship data 234). Similarly, in some embodiments, an angle between two or more 2D relationships corresponding to different facial features can represent a relationship between two or more 2D facial features (e.g., 2D relationship data 232).

For example, the facial feature of the horizontal line 502 and the eye (represented by 3D points 511, 514, 515, 516, and 518), an angle between the 3D relationship 585A (e.g., the relationship corresponding to the eye width) and the horizontal line 502 can be 3D landmark relationship data expressed as an angle representing "eye slant."

Figure 6:
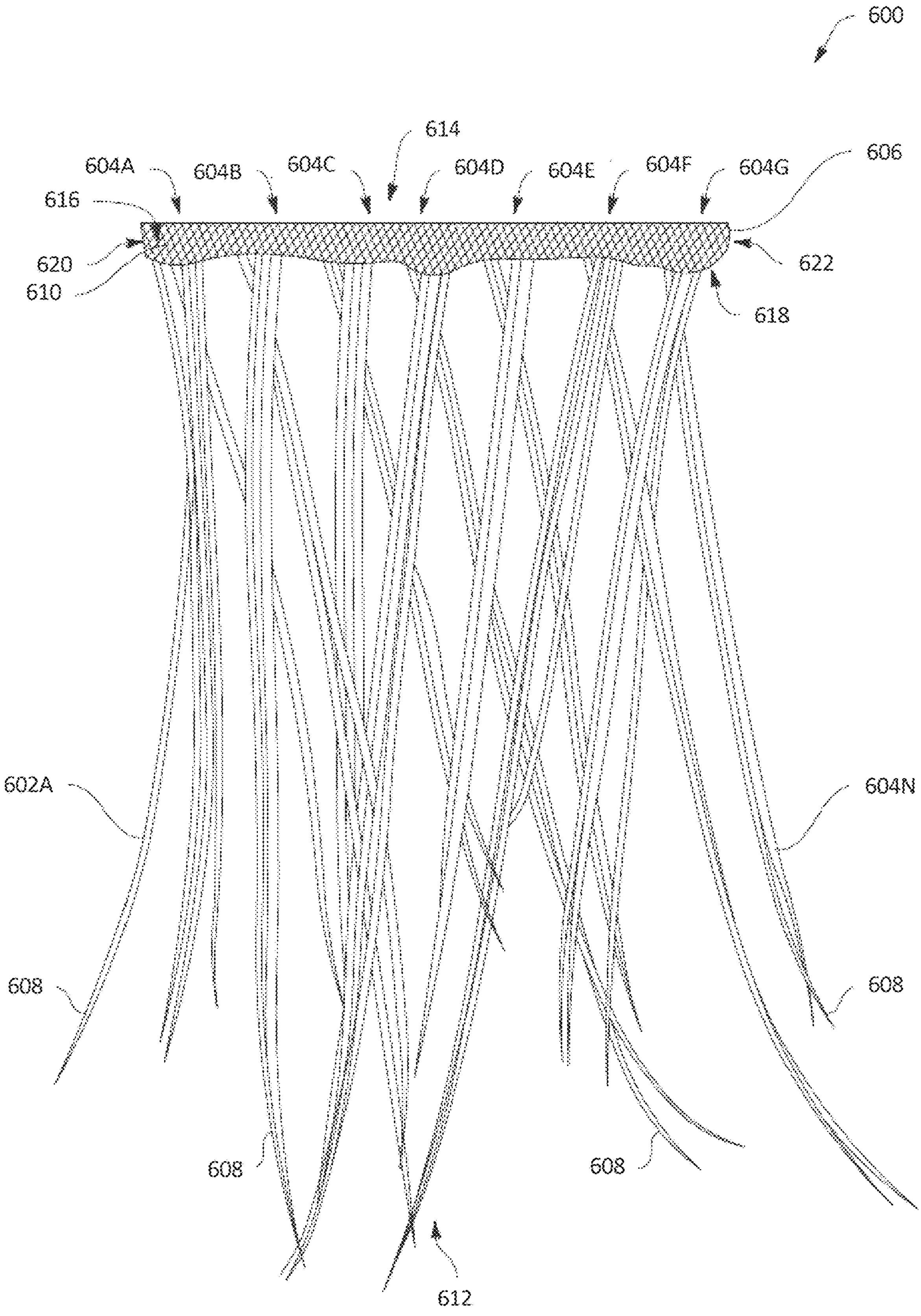
FIG. 6 is an illustration of an exemplary artificial lash extension with a textured base, in accordance with some embodiments of the disclosure.
Figure 7:
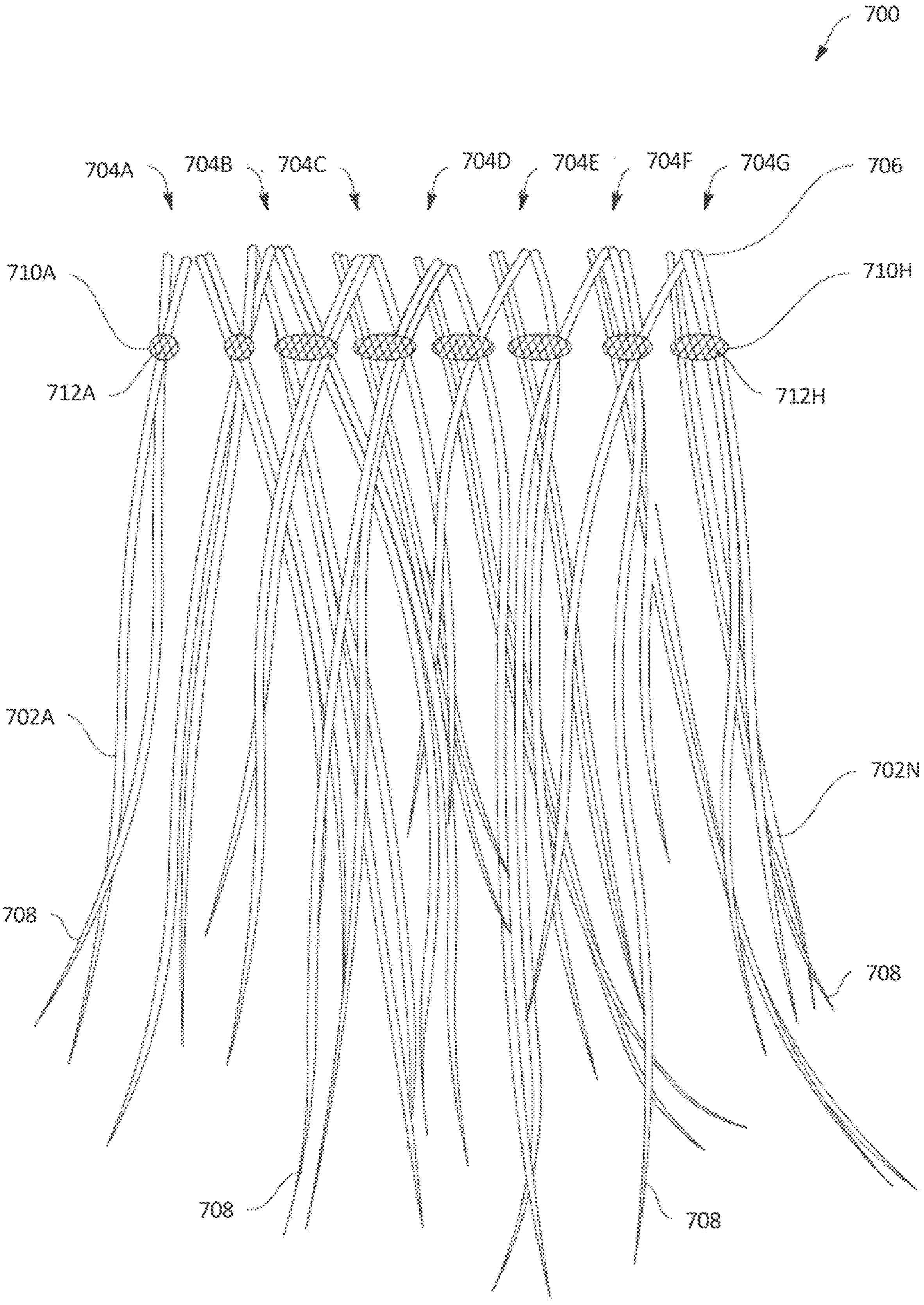
FIG. 7 is an illustration of another exemplary artificial lash extension with a textured base, in accordance with some embodiments of the disclosure.

FIG. 6 is an illustration of an exemplary artificial lash extension with a textured base, in accordance with some embodiments of the disclosure. FIG. 7 is an illustration of another exemplary artificial lash extension with a textured base, in accordance with some embodiments of the disclosure.

In some embodiments, one or more of artificial lash extension 600 or artificial lash extension 700 (both also referred to as "lash extension," "artificial eyelash extension," "lash segment" or "artificial lash segment" herein) are designed or configured for application at the underside of the natural eyelashes of the user, or alternatively, even the top side of the natural eyelashes of a user. In some embodiments, one or more of artificial lash extension 600 or artificial lash extension 700 can be part of a set of multiple artificial lash extensions. In some embodiments, one or more of artificial lash extension 600 or artificial lash extension 600 can be a segment of a "full" artificial lash extension such that when multiple artificial lash extensions are arranged adjacent to one another at the underside of natural eyelashes the arranged artificial lash extensions span the length of the natural eyelashes to form a full artificial lash extension. In some embodiments, the artificial lash extensions (e.g., segments) can be shorter than the horizontal length of the natural eyelashes (e.g., length of the lash line). In some embodiments, 3-5 artificial lash extensions can be arranged adjacent to one another at the underside of the natural eyelashes so that the set of arranged artificial lash extensions span the length of the natural eyelashes. In other embodiments, an artificial lash extension can be longer such that the artificial lash extension is a "full" artificial lash extension that substantially spans the horizontal length of the natural eyelashes. The artificial lash extension can be arranged to substantially align with the lash line of the user. In some embodiments, using artificial lash extensions that are independent segments can allow an individual artificial lash extension to move independently when bonded to the underside of a natural lash, which mimics the movement of the natural lash and can improve the feel, comfort, and longevity of the artificial lash extensions.

Artificial lash extension 600 and artificial lash extension 700 respectively depict artificial hairs 602A-602N (collectively referred to as "artificial hairs 602" herein) and 702A-702N (collectively referred to as "artificial hairs 703" herein). In some embodiments, the artificial hairs of an artificial lash extension, such as artificial lash extension 600 or artificial lash extension 700, can be formed from one or more synthetic materials, including but not limited to polybutylene terephthalate (PBT), acrylic resin, polyester (e.g., polyethylene terephthalate (PET)), other polymers, other synthetic material, or a combination thereof. In alternative embodiments, a natural material such as natural hair (e.g., human hair or mink hair) can be used. In some embodiments, the artificial hairs of a particular artificial lash extension can have one or more lengths and/or one or more diameters. In some embodiments, the diameter of an artificial hair can be between approximately 0.0075 millimeters (mm) (e.g., 0.0075 mm+/−0.0025 mm) to 0.3 mm (e.g., 0.3 mm+/−0.05 mm). In some embodiments, the ends of one or more of the artificial hairs can be tapered. In some embodiments, the one or more of artificial hairs can be curled or shaped in a particular direction. For example, the ends 608 of artificial hairs 602 or the ends 708 of artificial hairs 702 can be tapered or curled or both. In another example, the ends 608 of artificial hairs 602 can be curled upwards in the direction of the top side of the artificial lash extension 600. In some embodiments, the artificial hairs can range from 3 mm to 30 mm in length, or in some instances even longer.

In some embodiments, artificial lash extension 600 of FIG. 6 and artificial lash extension 700 FIG. 7 can include multiple sides, such a front side, a rear side, a top side, a bottom side, a first end, and a second end opposite the first end. The sides are described relative to an orientation of an artificial lash extension when attached to a user's natural eyelashes, for the sake of illustration, rather than limitation. Referring to artificial lash extension 600 of FIG. 6, the front side 612 can refer to a side that is a forward part of the artificial lash extension. For example, the front side 612 of artificial lash extension 600 faces opposite the user when attached to a user's natural eyelashes. The back side 614 can refer to a side that is opposite the front side 612 and faces the user's face when attached to a user's natural eyelashes. The top side 616 can refer to an uppermost part and faces towards the top of the user's head when attached to a user's natural eyelashes. The bottom side 618 is opposite the top side 616 and faces towards the user's feet when attached to a user's natural eyelashes. The first end 620 and the second end 622 can refer to lateral parts or lateral sides of an artificial lash extension. For example, the first end 620 can be a left side and the second end 622 can be a right side (or vice versa) when the artificial lash extension is attached to the user's natural eyelashes. Although multiple sides are described with respect to artificial lash extension 600, artificial false eyelashes and other artificial lash extensions, such as artificial lash extension 700 can be described having similar sides. Additionally, the sides as described with respect to an artificial lash extension 600 can also be used to describe sides of a base of an artificial lash extension, as further described below.

In some embodiments, an artificial lash extension can include a base. For example, artificial lash extension 600 includes base 606. In some embodiments, artificial lash extension 700 may or may not (as illustrated) include a base similar to base 606 of artificial lash extension 600. The base can include a top side (e.g., facing out of the page and towards the reader), a bottom side, a back side, a front side, and two ends (e.g., two lateral sides). In some embodiments, one or more of the multiple artificial hairs of artificial lash extension protrude out the front side of the base. When arranged at the underside of a natural lash, the backside of the artificial lash extension can point towards the user's eye. The thickness (e.g., between the top side and bottom side of the base can be between approximately 0.05 millimeters (mm) and approximately 0.15 mm (e.g., 0.05 mm+/−0.01 mm). In some embodiments, the thickness of the base can be less than 0.05 mm. In some embodiments, the low profile of the base is designed to allow the artificial lash extension to be light weight to better adhere to the underside of the natural lash and prevent obstruction of a user's view. The low profile of the base can at least in part be attributed to an attachment operation that forms the base and/or attaches clusters of artificial hairs to the base. For example, the attachment operation can include an application of heat that, at least in part, creates a base with a low profile.

In some embodiments, one or more of the top side or bottom side (e.g., surface) of the base is substantially flat (e.g., having a flatness control tolerance value of +/−0.03 mm or +/−0.015 mm). In some embodiments, the flatness of the base of the artificial lash extension 600 is designed to allow improved contact and adhesion to a surface, such as the underside of a natural eyelash or the opposing surface of another artificial lash extension. The flatness of the base can at least in part be attributed to the attachment operation.

In some embodiments, one or more of artificial lash extension 600 of FIG. 6 and artificial lash extension 700 of FIG. 7 include artificial hairs 602 and 702 that are respectively configured into clusters of artificial hairs 604A-604G (collectively referred to as "clusters 604" or "clusters of artificial hairs 604" herein) and clusters of artificial hairs 704A-704G (collectively referred to as "clusters 704" or "clusters of artificial hairs 704" herein). In some embodiments, a cluster of artificial hairs can refer to two or more artificial hairs that are grouped together. In some embodiments, one or more artificial hairs of a cluster of artificial hairs contact one another at or near the base. In some embodiments, two or more artificial hairs of a cluster can contact one another before and/or after an attachment operation, such as an application of heat. In some embodiments, 2-30 artificial hairs can be included in a cluster.

In some embodiments, the clusters of artificial hairs can be connected to or at the base with an application of heat in a similar manner as described herein (e.g., attachment operation). In some embodiments, the application of heat can at least partially melt at least some of the artificial hairs of one or more clusters of the artificial lash extension. In some embodiments, the application of heat can at least partially melt at least some of the artificial hairs of at least one cluster so that at least some of the artificial hairs of the cluster connect to one another. In some embodiments, the application of heat can at least partially melt at least some of the artificial hairs of at least one cluster so that at least some of the artificial hairs of the cluster connect to the base of the artificial lash extension (and/or form, at least in part, the base of the artificial lash extension). In some embodiments, at least some of the artificial hairs of at least one clusters are connected to one another at a respective part of the base by at least the application of heat.

In some embodiments, the clusters are connected to one another at the base by the application of heat. In some embodiments, one or more of the clusters of the artificial lash extension are directly connected to at least one adjacent cluster at the base. In some embodiments, one or more of the clusters of the artificial lash extension are indirectly connected to at least one adjacent cluster of the artificial lash extension at the base.

In some embodiments, at least two artificial hairs of an artificial lash extension crisscross each other. For example, two artificial hairs of a particular cluster can crisscross one another. In some embodiments, one or more individual clusters of artificial hairs can be formed using an application of heat as described above. Thus, the clusters can have a base (e.g., cluster base). The clusters can be arranged, and heat can be applied, as described above, to the cluster bases to form at least in part the base (e.g., base 606) of the artificial lash extension. In some embodiments, artificial lash extensions 600 or 700 may be 4-10 mm wide. In some embodiments, artificial lash extension 600 or 700 may be 5-6 mm wide. In some embodiments, the width of an artificial lash extension is much wider than a single cluster that is typically 1-2 mm wide.

Artificial lash extension 700 of FIG. 7 further illustrates adjacent artificial hairs (or adjacent clusters 704) that are coupled or secured to one another at connecting portions 710A-710H (collectively referred to as "connecting portions 710" herein) of the crisscrossing artificial hairs 702. For example, at least one hair of a particular cluster can be secured (e.g., directly or indirectly) to one or more hairs of an adjacent cluster at a connecting portion. In some embodiments, connecting portions 710 can connect artificial hairs (e.g., clusters) of an artificial lash extension together at areas between the two ends of the artificial hairs such that the artificial hairs of the artificial lash extension are connected directly or indirectly to one another to form an artificial lash extension and both ends of the artificial hairs not connected together (e.g., open ended).

In some embodiments, the connecting portions 710 (also referred to "base 710" herein) can be considered a base, as described herein. In some embodiments, the connecting portions 710 can be formed by an attachment operation, as described herein. In some embodiments, the connecting portions 710 can be formed by an attachment operation that includes an application of heat in a similar manner as described herein. In some embodiments, the connecting portions 710 can be formed by an attachment operation that includes an application of pressure in a similar manner as described herein. In some embodiments, the connecting portions 710 can be formed using one or more of an application of heat, an application of adhesive, an application of pressure, or a chemical process as described herein. For example, the crisscrossing artificial hairs 702 are connected or secured together approximately 1 mm to approximately 5 mm (+/−0.5 mm) above the ends 706 of the artificial hairs 702 (e.g., the ends 706 that are opposite the ends 708) using an attachment operation.

In some embodiments, the clusters can be secured to one another above ends 706 using an attachment operation that includes an artificial material to form connecting portions 710. In some embodiments, additional artificial material such as one or more artificial hairs or other material(s) can be placed or connected horizontally with respect to the lengthwise direction of the artificial hairs (e.g., across the area designated by the connecting portions 710). The artificial hairs or clusters of artificial hairs can be connected to the additional artificial material using an attachment operation that includes one or more of an application of heat, an application of adhesive, an application of pressure, a chemical process, or a thread as described herein. In some embodiments, the application of the additional artificial material that is used to connect the artificial hairs of artificial lash extension 700 can be similar to the application of additional artificial material used to form a base as described herein.

In some embodiments, the base (similar to base 606 of artificial lash extension 600) can be formed and subsequently removed after the formation of the connecting portions 710, such that the artificial lash extension 700 does not include the base similar to base 606. In some embodiments, the secured connecting portions 710 can hold artificial hairs 702 of the artificial lash extension 700 together in the absence of a base similar to base 606. In some embodiments, the connecting portions 710 of the crisscrossing artificial hairs 702 can be formed without forming a base that similar to base 606 of artificial lash extension 600.

It should be appreciated that artificial lash extension 600 and 700 are provided for purposes of illustration, rather than limitation.

In some embodiments, each artificial lash extension in a set of lash extensions can include multiple clusters of artificial hairs and a base (e.g., such as base 606 or a base including connecting portions 710). In some embodiments, at least the base of the artificial lash extension can include a surface that is textured, such as texture 610 of base 606 or texture 712A through 712H (generally referred to as "texture 712" herein) of connecting portions 710 (also referred to as a base). In some embodiments, the texture, such a texture 610 or texture 712 of a base can promote adhesion to a surface, such as an underside of natural eyelashes, using an adhesive.

In other embodiments, different parts of the artificial lash extension can be textured (including or not including the textured base) to help promote adhesion to a surface using an adhesive.

In some embodiments, the texture can have a pattern. A patterned texture can have at least some repeating features and/or a repeating arrangement of features. In some embodiments, the pattern texture is symmetrical. In some embodiments, the texture can be unpatterned. A patterned texture can also result from, for example, pressing, molding, or stamping the artificial lash extension such that the pressing, molding, or stamping results in a roughened or indented surface on the artificial lash extension. An unpatterned texture can have non-repeating features and/or a non-repeating arrangement of features.

In some embodiments, the surface of the top side of the base is textured, and the surface of the bottom side of the base (opposite the top side of the base) is untextured (e.g., substantially smooth, or at least not intentionally textured). In some embodiments, the surface of the top side of the base is textured, and the surface of the bottom side of the base is different from the textured surface of the top side of the base.

In some embodiments, the base of an artificial lash extension can be a single unit (e.g., monolithic) formed of a first material, such as PBT or polyester. In some embodiments, the texture, such as texture 610 and 712, and can be formed in the first material and be part of the single unit. Artificial lash extension 600 and artificial lash extension 700 illustrate example artificial lash extensions having a base and a texture thereon formed as a single unit. In some embodiments, the texture of the base is intentionally or deliberately formed to promote adhesion to a surface, such as the underside of natural eyelashes. In some embodiments, the texture of the base is intentionally or deliberately formed using a texturing operation.

Figure 8:
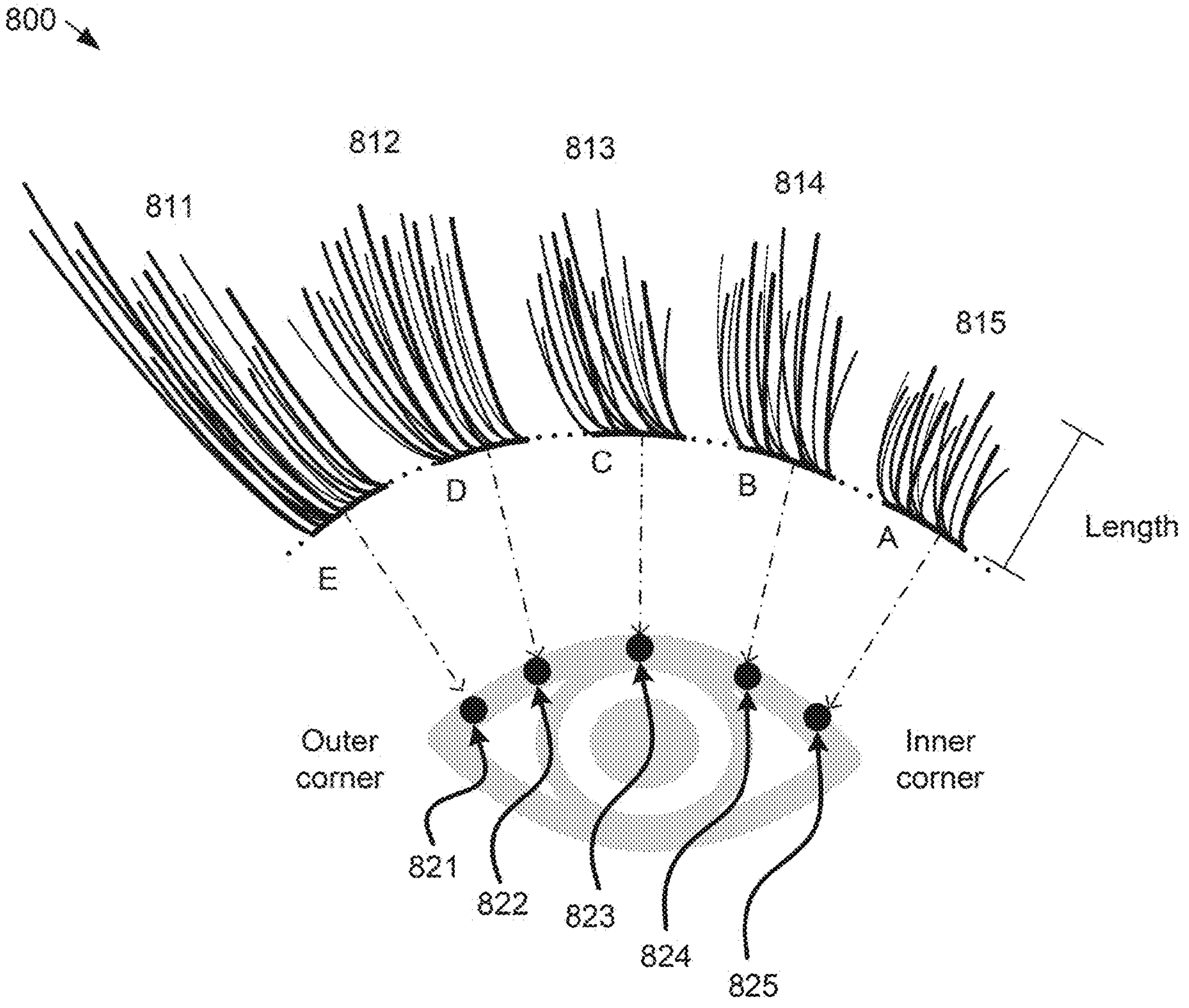
FIG. 8 depicts an arrangement of artificial lash extensions in accordance with lash configuration information, in accordance with some embodiments of the disclosure.

FIG. 8 depicts an arrangement of artificial lash extensions in accordance with lash configuration information, in accordance with some embodiments. Set of artificial lash extensions 800 illustrates artificial lash extensions 811 through 815. The description of lash configuration information with respect to artificial lash extensions is provided for purposes of illustration, rather than limitation. It can be noted that in other embodiments, lash configuration information can be implemented for false eyelashes, generally. It can be further noted that in other embodiments, a set of artificial lash extensions can have any number of artificial lash extensions. For purposes of illustration, rather than limitation a set of artificial lash extensions with respect to FIG. 8 is described as for a single eye. It can also be noted that in other embodiments that a set of artificial lash extensions can be for a pair of eyes, multiple eyes, or object or configurations.

Lash configuration information (also referred to as "lash map" herein) can refer to information related to the selection of artificial lash extensions and/or the application of artificial lash extensions at the eye area of a user. In some embodiments, lash configuration information can identify the particular artificial lash extensions of a set of lash extensions (e.g., length, style, and/or color), a location at the underside of the natural lashes at which each particular artificial lash extension of the set of artificial lash extensions is to be applied, and/or the order of each artificial lash extension in the set of artificial lash extensions. In some embodiments and as described further below, lash configuration information can include one or more of style information, length information, color information, placement information, or order information for an eye or pair of eyes of a user. An example of lash configuration information is illustrated in element 835.

In some embodiments, lash configuration information can be specific to a particular user. In some embodiments, lash configuration information can pertain to single eye where each eye of a pair of eyes can have different lash configuration information. In some embodiments, lash configuration information can pertain to a pair of eyes where each eye has the same or similar lash configuration information. In some embodiments, a set of artificial lash extension can include multiple artificial lash extensions for a single eye or a pair of eyes.

In some embodiments, lash configuration information includes style information. In some embodiments, style information can identify a style of one or more artificial lash extensions in a set of artificial lash extension. The style of an artificial lash extension can refer to a particular design of an artificial lash extension and/or a desired appearance of an arranged set of artificial lash extensions. In some embodiments, style or design of an artificial lash extension can be or can include a particular arrangement or pattern of artificial hairs of an artificial lash extension.

For example, artificial lash extensions 811 through 815 show artificial lash extensions of the set of artificial lash extensions 800 in a same style, style X (e.g., style information is style X). The artificial lash extensions of style X can have the same or similar arrangement (e.g., pattern) of artificial hairs. In other examples, one or more artificial lash extensions of a set of artificial lash extensions can be of different styles from other artificial lash extensions of the set of artificial lash extensions. For instance, artificial lash extension 813 can be of style P that is pointed at the ends (not shown) and the remining artificial lash extensions 811, 812, 814 and 815 can be of style X.

In some embodiments, the style of the artificial lash extensions in a set of artificial lash extensions can be the same or similar. In some embodiments, the style among at least some of the artificial lash extensions in a set of artificial lash extensions can be of one or more different styles. Styles can include, for example, natural style (e.g., moderate curl and volume), volume style (e.g., extra volume and pronounced curl), mega-volume style (e.g., deep curl and densely packed volume), classic style (e.g., moderate curl and balanced volume), wispy style (e.g., feathered, fine extensions that create a textured and soft appearance), spiky style (e.g., separated, uneven extensions with a jagged, textured look), crimped style (e.g., extensions that are intentionally crimped or zigzagged), etc.

In some embodiments, lash configuration information includes length information. Length information can refer to the length of an artificial lash extension. In some instances, length can be measured from the base to tip of the artificial hairs of the artificial lash extension (e.g., the tip of the longest artificial hair of the artificial lash extension). In some embodiments, the lengths of the artificial lash extensions in a set of artificial lash extensions can be the same length. In some embodiments, the lengths of the set of artificial lash extensions in a set of artificial lash extensions can be varying lengths. In some embodiments, the lengths of an artificial lash extension can range from 6 millimeters (mm) to 25 mm or 8 mm to 20 mm.

For example, artificial lash extension 811 can be 12 mm in length, artificial lash extension 812 can be 11 mm in length, artificial lash extension 813 can be 10 mm in length, artificial lash extension 814 can be 9 mm in length, and artificial lash extension 815 can be 8 mm in length. The length information can be 8 mm, 9 mm, 10 mm, 11 mm, 12 mm for the set of artificial lash extensions 800, for instance. In another example, the artificial lash extensions in a set of artificial lash extensions can be the same length and the corresponding length information can be 9 mm, 9 mm, 9 mm, 9 mm, 9 mm, for instance.

In some embodiments, varying lengths of the artificial lash extension within a lash configuration can be strategically used to create different desired appearances (e.g., looks). Varying lengths can be used to achieve, for example, a natural, textured appearance with mixed lengths or to add dimension by incorporating longer and shorter lashes within the same set of artificial lash extensions. In further examples, varying lengths can be used to achieve appearances such as a cat-eye appearance (e.g., longer extensions towards the outer corners of the eyes, creating an uplifted and elongated effect reminiscent of the eye shape of a cat), a doll-eye appearance (e.g., longer lashes at the center of the eye, producing a wide-eyed look), textured appearance (e.g., a mix of different lash lengths and types for a multidimensional look), cleopatra appearance (e.g., extended, winged extensions at the outer corners of the eye), etc.

In some embodiments, lash configuration information includes color information. Color information can refer to the color(s) of an artificial lash extension. In some embodiments, artificial lash extensions in a set of artificial lash extensions 800 can be the same color. In some embodiments, artificial lash extensions in a set of artificial lash extensions 800 can be different colors. Colors can include, for example, black, blonde, auburn, blue, green, purple, pink, and so forth. In some embodiments, an artificial lash extension can include multiple colors. For example, multi-colored lash extensions can include ombre (e.g., gradual transition of color from base to tip of the artificial hairs of dark to light or one color to another), rainbow (e.g., designed with multiple colors in a spectrum), sunset (e.g., warm and fiery hues of a sunset, blending colors like red, orange, and pink), etc. In some embodiments, a user can match the color of the artificial lash extensions of set of artificial lash extensions 800 with the color of the user's eyebrows, head hair or other feature.

In some embodiments, lash configuration information includes order information. Order information can refer to information identifying for an artificial lash extension of a set of artificial lash extensions a position in an order (e.g., sequence) of an arrangement of the set of artificial lash extensions. The order information can identify relative position of each artificial lash extension of the set of artificial lash extensions 800 with respect to one another. For example, artificial lash extensions 815, 814, 813, 812, and 811 are to be ordered as A, B, C, D, E respectively. The order information for artificial lash extension 815 can reflect position A in the order of the arrangement. The order information for artificial lash extension 814 can reflect position B, and so forth.

In some embodiments, lash configuration information includes location information. Location information can include information identifying a location of the eye area where an artificial lash extension of a set of artificial lash extensions is to be applied. For example, artificial lash extensions 815, 814, 813, 812, and 811 are to be located at points 825, 824, 823, 822, and 821 respectively. In some embodiments, the location information can include information that identifies a location on the natural lashes (e.g., a location at the underside of the natural lashes) at which an artificial lash extension of the set of artificial lash extension is to be applied. In some embodiments, location information can help guide a user on applying the set of artificial lash extension at the natural lashes. In some embodiments, the location information can include a visible guide (e.g., picture of identifying location(s) at which to apply one or more artificial lash extensions). In some embodiments, the location information can include descriptive information, such as textual information, describing a location at which to apply an artificial lash extension. For instance, location information for artificial lash extension 815 can include information that artificial lash extension 815 is to be applied at the inner corner of the right eye. Location information for artificial lash extension 814 can include information indicating that artificial lash extension 814 is to be applied directly adjacent to artificial lash extension 815, and so forth.

Figure 9:
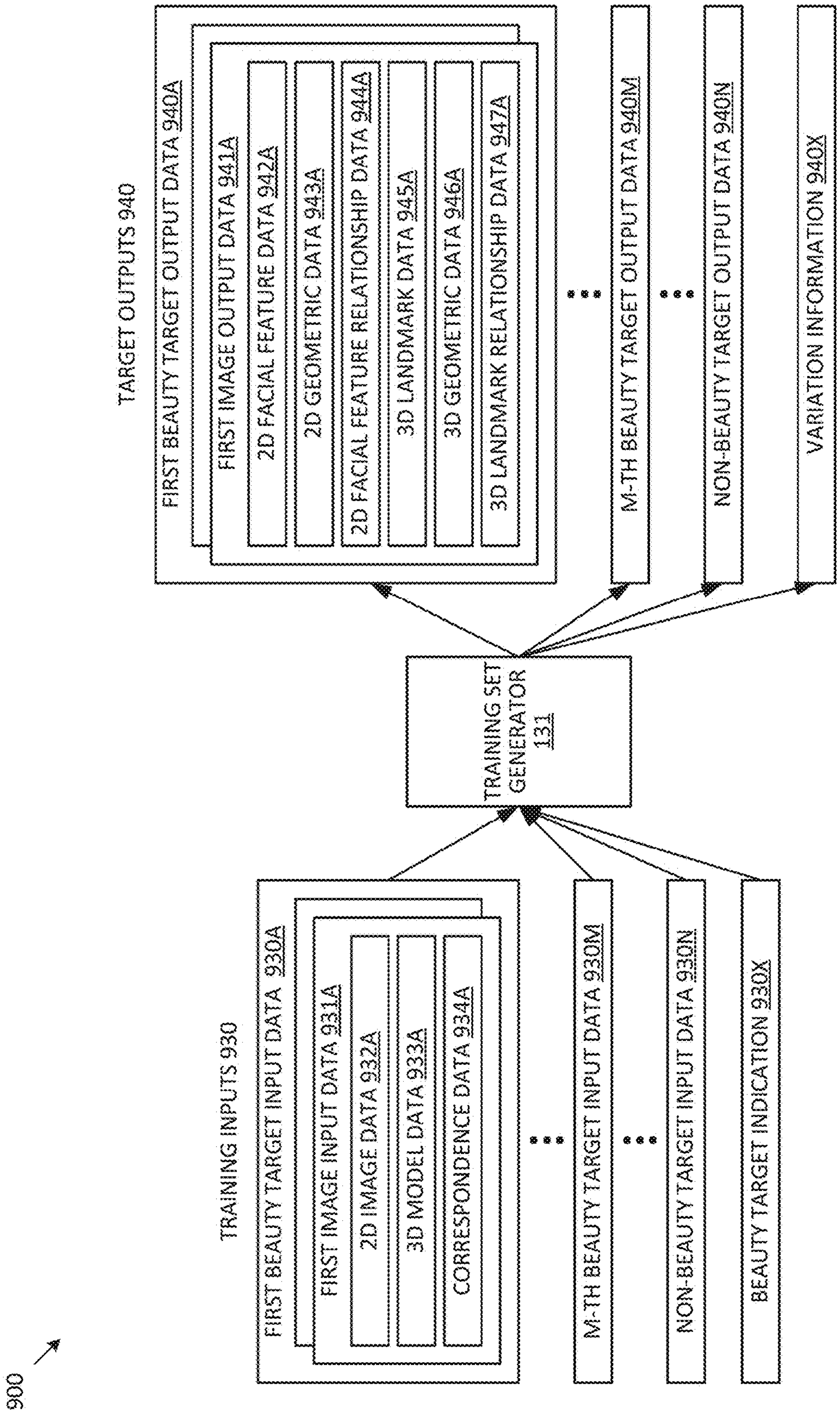
FIG. 9 is an example training set generator to create training data for a machine learning model using information pertaining to various beauty targets, in accordance with some embodiments of the disclosure.

FIG. 9 is an example training set generator to generate training data for a machine learning model using information pertaining to one or more beauty targets and one or more non-beauty target, in accordance with embodiments of the disclosure. System 900 shows a training set generator 131, training inputs 930, and target outputs 940. System 900 can include similar components as system 100, as described in FIG. 1. Components described with reference to system 100 of FIG. 1 can be used to describe system 900 of FIG. 9.

In some embodiments, training set generator 131 generates training data that includes one or more training inputs 930, and one or more target outputs 940. The training data can include mapping data that maps the training inputs 930 to the target outputs 940. Training inputs 930 can also be referred to as "features" or "attributes," herein. In some embodiments, training set generator 131 can provide the training data in a training set and provide the training set to the training engine 141 where the training set is used to train the model 160.

As noted above, the human face is one or the most variable and complex of human features. Similarly, the physical appearance of facial features can vary significantly among individuals. Beauty, and in particular beauty of a human face, is multifaceted and can be found in various forms. Rather than a single beauty architype, beauty can be found in range of skin tones, body shapes, facial features shapes, facial features sizes, hair textures, and features generally. Beauty can include and vary between and among different ethnicities, races, genders, ages, abilities, and backgrounds. Similarly, beauty targets can also vary widely.

A beauty target (also referred to as "facial beauty target" or "facial target" herein) can refer to one or more qualities or attributes (e.g., physical characteristics, such as facial features), often of a human face, that are shared between a group. In some cases, the one or more qualities or attributes are preferred (e.g., desirable aesthetic) by an individual of group of people. In some embodiments, a beauty target can be defined by multiple images (e.g., 2D images) representing facial features of one or more individuals that share qualities and/or attributes. Similar to beauty, beauty targets can vary widely between people, cultures, and historical periods. Rather than a single beauty target, multiple beauty targets can co-exist and can include a range of skin tones, body shapes, facial features shapes, facial features sizes, hair textures, and features generally.

In some embodiments, a beauty target need not necessarily correspond to beauty, but rather be a target that is preferred by an individual or group of individuals. For instance, a group of makeup artist may desire a "beauty target" that looks like a face of troll, or some other whimsical or comical target.

A non-beauty target (also referred to as a "facial non-beauty target" herein) can refer to one or more qualities or attributes (e.g., physical characteristics, such as facial features), often of a human face, that are different from a beauty target. In some cases, the one or more qualities or attributes are not preferred (e.g., undesirable aesthetic) by an individual of group of people. The non-beauty target can include one or more qualities or attributes that deviate from a beauty target.

As illustrated in FIG. 9, multiple beauty targets are represented by first beauty target input data 930A through an m-th beauty target input data 930M and first beauty target output data 940A through m-th beauty target output data (corresponding to a first beauty target input data 930A and an m-th beauty target input data 930M, respectively). In some embodiments, a beauty target can be different from other beauty targets. For example, one or more facial features or relationships between facial features can be different among beauty targets. In some embodiments, a beauty target may share some qualities and/or attributes with other beauty targets, but not all qualities or attributes. For example, a first beauty target and an m-th beauty target can share the same facial feature information representing a particular facial feature, but not other facial feature information representing other facial features. For instance, a first beauty target and an m-th beauty target may both share the same representation of a nose, but not share the same representation of other facial features. Facial feature information can include, but is not limited to, one or more of 2D information (e.g., one or more of 2D image data, 2D facial feature data, 2D geometric data, 2D facial feature relationship data, or 2D variation information) and 3D information (e.g., one or more of 3D model data, 3D landmark data, 3D geometric data, 3D landmark relationship data, or 3D variation information). In some embodiments, information pertaining to facial features can include some or all facial feature information.

Non-beauty target input data 930N and non-beauty target output data 940N can correspond to a non-beauty target. For example, a particular facial feature of a first beauty target can have substantially different facial features information (e.g., 2D lengths, widths, or ratios) facial feature information of the non-beauty target. For example, and in some embodiments, a nose length-to-width ratio corresponding to a first beauty target can significantly deviate from a nose length-to-with ratio corresponding to a non-beauty target.

Training Inputs

In some embodiments, training inputs 930 can include one or more of a first beauty target input data 930A through m-th beauty target input data 930M, a non-beauty target input data 930N (which can include one or more non-beauty targets having non-beauty target input data, also referred to collectively as "beauty target input data 930A-N" herein), and a beauty target indication 930X. It can be appreciated that for the purposes of brevity in FIG. 9, only elements of the first beauty target input data 930A are illustrated and described. The illustration and corresponding description of elements of the first beauty target input data 930A, including first image input data 931A, 2D image data 932A, 3D model data 933A, and correspondence data 934A can similarly apply to m-th beauty target input data 930M and non-beauty target input data 930N (e.g., as first beauty image input 931M/N, 2D image data 932M/N (not illustrated), etc.), unless otherwise described.

In some embodiments, each beauty target input can correspond to a respective beauty target output data. For example, the first beauty target input data 930A can correspond to the first beauty target output data 940A. Similarly, and in some embodiments, the m-th beauty target input data 930M can correspond to the m-th beauty target output data 940M, and the non-beauty target input data 930N can correspond to the non-beauty target output data 940N. In some embodiments, each beauty target input data 930A-N can include one or more image inputs (e.g., image input data) that represent a human face. For example, the first beauty target input data 930A can include first image input data 931A through Nth image input data (illustrated by the additional box behind the first image input data 931A element in FIG. 9).

In some embodiments and as noted above, each image input of each beauty target input data 930A-N can correspond to a respective image output information of a respective beauty target output data 940A-N. For example, the first image input data 931A of the first beauty target input data 930A can correspond to the first image output data 941A of the first beauty target output data 940A. In another example, an Nth image input of the first beauty target input data 930A can correspond to an Nth image output information of the first beauty target output data 940A.

In some embodiments, each image input data can include one or more of 2D image data, 3D model data, and/or correspondence data. For example, first image input data 931A includes 2D image data 932A representing a 2D image, 3D model data 933A (e.g., based on the 2D image), and correspondence data 934A, and an Nth image input data includes Nth 2D image data, Nth 3D model data, and Nth correspondence data. In some embodiments, each image input data can correspond to or be obtained from an image. For example, first image input data 931A can be obtained from a first image (e.g., a 2D image), and Nth image data can be obtained from an Nth image.

In some embodiments, each respective image input (e.g., first image input data 931A) can correspond to a distinct representation of a human face. For example, each image input data can correspond to an image of a human face (e.g., 2D image representing a human face). In some embodiments, each respective image input of a particular beauty target can correspond to the same human face or different human faces that share similar facial features. In some embodiments, each image input data can correspond to a respective image output data (e.g., first image input data 931A corresponds to first image output data 941A), and both can correspond to the same 2D image representing a human face. In some embodiments, each of different 2D images (e.g., Nth image) can correspond to respective image input data (e.g., Nth image input data) and image output data (e.g., Nth image output data).

In some embodiments, the 2D image data 932A can represent an image of a scene. In some embodiments, the scene can include one or more objects, such as an image of a person. In some embodiments, the 2D image data 932A can represent an image of a subject's face or a part of the subject's face (e.g., an image of a subject's eye area). In some embodiments, the 2D image data 932A can represent a frontal face image. A frontal face image can refer to an image taken from a front-facing perspective. For instance, in a frontal face image the subject can look directly at the camera.

In some embodiments, the 2D image data 932A can represent a still image. In some embodiments, the 2D image data 932A can represent one or more video images of a video, such as video images of a video stream. In some embodiments, the 2D image data 932A can include 2D coordinate information of points (e.g., pixels) of the 2D image (e.g., x- and y-coordinates). In some embodiments, the 2D image can lack depth information (e.g., depth information measured by a depth camera). In some embodiments, the 2D image data 932A can include digital data (e.g., pixels) representing a digital image. In some embodiments, a 2D image may be represented in various formats such as joint photographic experts group (JPEG), portable network graphics (PNG), tag image file format (TIFF), etc. In some embodiments, 2D image data 932A may include color information by for example, using values of a color model such as a red, green, blue (RGB) color model or other color model.

In some embodiments, 2D image data 932A may identify one or more facial features of a target face. A target face can refer to a face that corresponds to a particular beauty target (e.g., first beauty target represented by first beauty target output data 940A). As noted above, a facial feature can refer to a physical characteristic or element that is part of a human face. Facial features can include, but are not limited to the lips, nose, tip of the noise, bridge of the nose, eyes, inner eye, pupil, eyelids, eyebrows, inner eyebrow, outer eyebrow, center eyebrow, cheeks (e.g., cheek bones, etc.), jaw (e.g., jawline, etc.), and/or other facial features.

In some embodiments, the 2D image data 932A can have fixed dimensional values (e.g., fixed width, height, and color depth, such as 24-bit). In some embodiments, the 2D image data 932A can have variable dimensional values. In some embodiments, the 2D image data 932A can include depth information. In some embodiments, the 2D image data 932A can include metadata such as a timestamp, location information indicating where an image was taken, image sensor specifications, facial feature coordinates and identifiers, etc.

In some embodiments, 3D model data 933A can represent a three-dimensional digital representation of a scene or object (e.g., a 3D model). In some embodiments, the 3D model data is derived or generating using the respective 2D image (e.g., the 2D image represented by 2D image data). In some embodiments, the 3D model data 933A of a 3D model can include width information, height information, and depth information of the scene and/or object. The 3D model data 933A can include geometric data that describes the corresponding scene or object. The geometric data can include one or more of vertices (e.g., points), edges, and/or faces. In some embodiments, vertices (e.g., nodes or points) can include points of a 3D model. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges). In some embodiments, one or more of vertices, edges and faces can define the geometry of a 3D model.

In some embodiments, the 3D model data 933A of the 3D model can include texture information that describes an object's surface texture. In some embodiments, 3D model data 933A does not include texture information. In some embodiments, 3D model data 933A includes material information that can influence the appearance of a 3D model at rendering (e.g., how light reflects from the material). In some embodiments, 3D model data 933A does not include material information. In some embodiments, the 3D model data 933A includes lighting information that describes the interaction of light (and absence of light) with the scene or object. In some embodiments, 3D model data 933A does not include lighting information. In some embodiments, 3D model data 933A includes color information that indicates the colors of surface (e.g., faces) of a 3D model.

In some embodiments, correspondence data 934A can include data that maps 3D points (e.g., vertices) of the 3D model data 933A that represent a 3D model to 2D points (e.g., pixels) of the 2D image data 932A that represent a 2D image. In some embodiments, correspondence data can indicate a relationship between (x-, y-) coordinates of a 2D point in 2D image data 932A that represent a 2D image, and (x-, y-, z-) coordinates of a 3D point in 3D model data 933A that represent a 3D model. In some embodiments, correspondence data 934A can include information for each 3D point in the 3D model data 933A that represent a 3D model (e.g., 1:1 mapping). In some embodiments, correspondence data 934A can map a cluster or group of 2D points in the 2D image data 932A that represent a 2D image to a single 3D point in the 3D model data 933A that represent a 3D model (e.g., many-to-one (X:1) mapping), and vice versa. In some embodiments, correspondence data 934A can be generated by performing one or more pre-processing operations on 2D image data 932A to generate the 3D model data 933A. In some embodiments, an algorithm or model, such as a principal component analysis (PCA) model can be used to transform the 2D image data 932A into a new set of dimensions (e.g., 3D model data 933A). Additional details regarding using a PCA model to generate a 3D model from 2D image data is described below with reference to FIGS. 11-14B.

In some embodiments, beauty target indication 930X can include an indication of a particular beauty target among the multiple beauty targets. For example, the beauty target indication 930X can identify the first beauty target (e.g., first beauty target input data 930A and a corresponding target output data, such as first beauty target output data 940A) among the Nth beauty targets. In some embodiments, a machine learning model can be trained on multiple beauty target inputs (e.g., first beauty target input data 930A through m-th beauty target input data 930M, etc.) and outputs. At inference, a particular beauty target among the multiple beauty targets can be selected such that input data representing the subject's face can be compared to a particular beauty target (e.g., rather than to multiple beauty targets). In some embodiments, the beauty target indication 930X can be implemented to provide a selection of a beauty target for comparison.

For example, the beauty target indication 930X can identify a selected beauty target among multiple beauty targets. The beauty target indication 930X can be provided to the training input to allow a machine learning model to put greater emphasis (e.g., weights) on the beauty target identified by the beauty target indication 930X. In some embodiments and for example, at inference the trained machine learning model can receive a selection of a beauty target (e.g., user selection) and machine learning model can evaluate the subject's face against the selected beauty target (rather than multiple beauty targets). In some embodiments, the beauty target indication 930X can be used by the training set generator 131 to determine which beauty target input 930A-M to use to generate variation information 940X.

As illustrated and in some embodiments, a single machine learning model can be trained with multiple beauty targets. In some embodiments, multiple machine learning models can be trained where each machine learning model is trained using a different beauty target. In such embodiments, a user or system can select a particular machine learning model that pertains to a particular beauty target.

Target Outputs

In some embodiments, target outputs 940 can include one or more of a first beauty target output data 940A through m-th beauty target output data 940M, a non-beauty target output data 940N (which can include one or more beauty targets having respective beauty target output data, also referred to collectively as "beauty target output data 940A-N" herein), and a variation information 940X. It can be appreciated that for the purposes of brevity in FIG. 9, only elements of the first beauty target output data 940A are illustrated and described. The illustration and corresponding description of elements of first beauty target output data 940A, including first image output data 941A, 2D facial feature data 942A, 2D geometric data 943A, 2D facial feature relationship data 944A, 3D landmark data 945A, 3D geometric data 946A, and 3D landmark relationship data 947A can similarly apply to the m-th beauty target output data 940M, and the non-beauty target output data 940N, unless otherwise described.

As described above and in some embodiments, each beauty target can correspond to respective beauty target input data and beauty target output data. That is, the training set generator 131 can generate a respective beauty target output data 940A-N for each respective beauty target input data 930A-N. For example, the training set generator 131 can generate the first beauty target output data 940A for the first beauty target input data 930A, respectively. In some embodiments, each beauty target 940A-N can include one or more sets of image output data that represent a human face. For example, the first beauty target output data 940A can include first image output data through Nth image output data (illustrated by the additional box behind the first image output data 941A element in FIG. 9). In some embodiments, each respective image output data can correspond to a particular 2D image.

Similarly, as described above and in some embodiments, each image output data in each beauty target output data 940A-N can correspond to a respective image input data of a respective beauty target input data 930A-N. For example, the first image output data 941A of the first beauty target output data 940A can correspond to the first image input data 931A of the first beauty target input data 930A, and an Nth image output data of the first beauty target output data 940A can correspond to an Nth image input data of the first beauty target input data 930A.

In some embodiments, each image output data can include one or more of 2D facial feature data, 2D geometric data, 2D facial feature relationship data, 3D landmark data, 3D geometric data, and/or 3D landmark relationship data. For example, the first image output data 941A includes 2D facial feature data 942A, 2D geometric data 943A, 2D facial feature relationship data 944A, 3D landmark data 945A, 3D geometric data 946A, and 3D landmark relationship data 947A.

In some embodiments, multiple sets of image output data of a particular beauty target output data 940A-N can be aggregated into a target output data or target representation. That is, each image output data (e.g., first image output data 941A) can be aggregated such that the respective beauty target output data 940A-N can represent a target face corresponding to the respective beauty target. For example, first image output data 941A of first beauty target output data 940A can be aggregated with Nth image output data of first beauty target output data 940A, such that the aggregated output data (e.g., using averages) can represent the first target output.

In some embodiments, the 2D facial feature data 942A can include data that represents one or more facial features of the human face (such as facial features described above). In some embodiments, the 2D facial feature data 942A can correspond to a respective 2D image represented by 2D image data 932A. For example, each 2D image (represented by 2D image data 932A) can include a respective instance of 2D facial feature data 942A. In another example, one or more facial features represented in a 2D image can be identified by respective 2D facial feature data. In some embodiments, for each of the facial features represented by the 2D facial feature data 942A, the 2D facial feature data 942A can identify one or more 2D points (e.g., pixels of the 2D image data 932A) that represent a respective facial feature. For instance, the nose of can be represented by a single 2D point at the tip of the nose, or by multiple 2D points along the bridge of the nose, the tip of the nose, and/or outline of the nose. In some embodiments, the 2D facial feature data 942A can include 2D coordinate data that represent the 2D points, such as x-coordinate and y-coordinate information identifying the one or more 2D points (e.g., pixels). In some embodiments, the 2D facial feature data 942A can include textual identifiers of respective facial features represented by one or more 2D points (e.g., points X through Z represent the bridge of the nose). In some embodiments, the 2D facial feature data 942A can include color data for the 2D points. For example, the color data for a 2D point can be expressed in values of the RGB model. It can be noted that points as described with respect to 2D information, such as 2D image data and 2D facial features data, 2D geometric data, and 2D facial feature relationship data can also be interchangeably described as pixels, herein, unless otherwise described. In some embodiments, the facial features represented by the 2D facial feature data 942A can be referred to as "target 2D facial features" or "target facial features" herein.

In some embodiments, 2D geometric data 943A can describe a facial feature represented by the 2D facial feature data 942A. In some embodiments, 2D geometric data can refer to information related to 2D coordinate space (e.g., describing objects and shapes that exist in a flat plane, typically defined by two perpendicular axes). In some embodiments, the 2D geometric data 943A can include one or more of 2D points (e.g., pixels), lines or curves, and/or shapes. In some embodiments, a 2D point can have 2D coordinates (e.g., x-, and y-coordinates). In some embodiments, the 2D point can identify a location where two or more lines or curves intersect. In some embodiments, a line can include a straight- or curved line and connect at least two 2D points. In some embodiments, shapes can include bounded areas, such as connecting lines (e.g., closed-loop lines, or enclosed shapes).

In some embodiments, the 2D geometric data 943A can include data identifying a relationship between two or more 2D points of a facial feature represented by the 2D facial feature data 942A (e.g., between two or more 2D points corresponding to the same facial feature). In some embodiments, the relationship between two or more 2D points can include one or more of distances, angles, positions, areas, or ratios.

In some embodiments, the 2D geometric data 943A can include data identifying a line or curve between two or more 2D points, and the distance therebetween. For example, the 2D geometric data 943A can include data identifying the length of an eyebrow that corresponds to a line or curve between two or more 2D points representing the eyebrow.

In some embodiments, the 2D geometric data 943A can include data identifying two or more lines between three or more 2D points, and the ratio between the length of each line. For instance, the 2D geometric data can include data identifying a ratio between an eye height (represented as a first line between an eye apex and an eye bottom) and an eye width (represented as a second line between an inner eye corner and an outer eye corner).

In some embodiments, the 2D geometric data 943A can include data identifying a curve between two or more 2D points, and a curvature radius of the curve. For example, the 2D geometric data 943A can include data identifying the curvature of an eyebrow that corresponds to a curve between two or more 2D points representing the eyebrow.

In some embodiments, the 2D geometric data 943A can include data identifying two or more lines between three or more 2D points, and the angle between the two or more lines. For example, the 2D geometric data 943A can include data identifying a first line between a 2D point representing to the inner eye corner and a 2D point corresponding to the outer eye corner, a second (horizontal) line intersecting a 2D point corresponding to the center of the pupil, and an angle between the first line and the second line.

In some embodiments, the 2D geometric data 943A can include data identifying two or more 2D points and a relative position of each of the two or more 2D points with respect to the group of two or more 2D points. For example, the 2D geometric data 943A can include data identifying a first 2D point, a second 2D point, a third 2D point, and respective lengths and slopes of lines between each point (e.g., a length and slope of a line between the first and second 2D point, a length and slope of a line between the first and third 2D point, etc.). For instance, the 2D geometric data 943A can include data identifying relative positional data for respective 2D points representing the inner corner of the eyebrow, the apex of the eyebrow, and the outer corner of the eyebrow, respectively.

In some embodiments, the 2D facial feature relationship data 944A can include data identifying a relationship between 2D facial feature data 942A of two or more facial features. In some embodiments, the 2D facial feature relationship data 944A can include data identifying a relationship between 2D geometric data 943A of two or more facial features. In some embodiments, the relationships between data corresponding to a first facial feature (e.g., first 2D facial feature data, and/or first 2D geometric data) and data corresponding to a second facial feature (e.g., second 2D facial feature data, and/or second 2D geometric data) can include one or more of distances between 2D points, angles, positions, or ratios of 2D information.

In some embodiments, the 2D facial feature relationship data 944A can include data identifying a line or curve between one or more 2D points of a first facial feature represented in the 2D facial feature data 942A, and one or more 2D points of a second facial feature represented in the 2D facial feature data 942A. For example, the 2D facial feature relationship data 944A can include data identifying a distance between one or more points representing the left eye and one or more points representing the right eye.

In some embodiments, the 2D facial feature relationship data 944A can include data identifying a first line between two or more 2D points of a first facial feature and a second line between two or more 2D points of a second facial feature, and the angle between the first line and the second line. For example, the 2D facial feature relationship data 944A can include data identifying an angle between a horizontal line between 2D points representing the right and left pupils, and a right eye line between 2D points representing the inner corner of the right eye and the outer corner of the right eye.

In some embodiments, the 2D facial feature relationship data 944A can include data identifying a first measurement (e.g., size, length, depth width, area, etc.) corresponding to a first facial feature (represented by one or more 2D points) and a second measurement corresponding to a second facial feature (represented by one or more 2D points), and a ratio between the first measurement and the second measurement. For example, the 2D facial feature relationship data 944A can include data identifying a ratio between an eye size (represented by one or more 2D points representing the eye) and a mouth size (represented by one or more 2D points representing the mouth).

Additional details regarding 2D facial feature data, 2D geometric data, and 2D facial feature relationship data are described with reference to FIGS. 5A-B.

In some embodiments, the 3D landmark data 945A can include data that represents one or more 3D landmarks corresponding to one or more facial features of the human face (e.g., represented by 2D facial feature data 942A). In some embodiments, 3D landmark data can correspond to associated 2D facial feature data (e.g., represent the same facial feature). In some embodiments, 3D landmark data 945A can identify one or more 3D points (e.g., vertices of the 3D model data 933A) that represent a respective facial feature represented by the 2D facial feature data 942A. For example, the nose of a subject can be represented by a single 3D point (and corresponding 2D point of the 2D facial feature data 942A) at the tip of the nose, or by multiple 3D points (and corresponding 2D points of the 2D facial feature data 942A) along the bridge of the nose, the tip of the nose, and/or outline of the nose.

In some embodiments, the 3D landmark data 945A can include 3D coordinate data that represents the 3D points, such as x-coordinate, y-coordinate, and z-coordinate information identifying the one or more 3D points (e.g., vertices) in three-dimensional space. In some embodiments, the 3D landmark data 945A can include textual identifiers of respective facial features represented by one or more 3D points. For example, a 3D landmark that represents a nose can include or be associated with a textual identifier, "nose." In some embodiments, the 3D landmarks identified by the 3D landmark data that correspond to facial features represented by the 2D facial feature data 942A can be referred to as "target 3D landmarks" or "3D landmarks" herein.

In some embodiments, the 3D landmark data 945A can correspond to a respective 3D model represented by a 3D model data. For example, each 3D model can include a respective instance of 3D landmark data 945A.

In some embodiments, 3D geometric data 946A can describe a 3D landmark represented by the 3D landmark data 945A. In some embodiments, the 3D geometric data 946A can include one or more of vertices (e.g., 3D points), edges, and/or faces. In some embodiments, vertices (e.g., nodes or points) can include 3D points of a 3D model represented by 3D landmark data 945A. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges).

In some embodiments, the 3D geometric data 946A can include data identifying a relationship between two or more 3D points of a facial feature represented by the 3D landmark data 945A (e.g., between two or more 3D points corresponding to the same facial feature). In some embodiments, the relationship between two or more 2D points can include one or more of distances, angles, positions, areas, or ratios.

In some embodiments, the 3D geometric data 946A can include data identifying a line or curve between two or more 3D points, and the distance therebetween. For example, the 3D geometric data 946A can include data identifying the length of an eyebrow that corresponds to a line or curve between two or more 3D points representing the eyebrow.

In some embodiments, the 3D geometric data 946A can include data identifying two or more lines between three or more 3D points, and the ratio between the length (e.g., magnitude) of each line. For example, the 3D geometric data can include data identifying a ratio between a 3D eye height (represented as a first line between an eye apex and an eye bottom) and a 3D eye width (represented as a second line between an inner eye corner and an outer eye corner).

In some embodiments, the 3D geometric data 946A can include data identifying a curve between two or more 3D points, and a curvature radius of the curve. For example, the 3D geometric data 946A can include data identifying the curvature of an eyebrow that corresponds to a curve between two or more 3D points representing the eyebrow.

In some embodiments, the 3D geometric data 946A can include data identifying two or more lines between three or more 3D points, and the angle between the two or more lines. For example, the 3D geometric data 946A can include data identifying a first line between a 3D point corresponding to the inner eye corner and a 3D point corresponding to the outer eye corner, and a second (horizontal) line intersecting a 2D point corresponding to the center of the pupil, and an angle between the first line and the second line.

In some embodiments, the 3D geometric data 946A can include data identifying two or more 3D points and a relative position of each of the two or more 3D points with respect to the group of two or more 3D points. For example, the 3D geometric data 946A can include data identifying a first 3D point, a second 3D point, a third 3D point, and respective lengths and slopes of lines between each point (e.g., a length and slope of a line between the first and second 3D point, a length and slope of a line between the first and third 3D point, etc.). For instance, the 3D geometric data 946A can include data identifying relative positional data for respective 3D points representing the inner eyebrow corner, the eyebrow apex, and the outer eyebrow corner, respectively.

In some embodiments, the 3D landmark relationship data 947A can include data identifying a relationship between 3D landmark data 945A corresponding to two or more respective facial features. In some embodiments, the 3D landmark relationship data 947A can include data identifying a relationship between 3D geometric data 946A corresponding to two or more facial features. In some embodiments, the relationships between data corresponding to a first facial feature (e.g., 3D landmark data 945A and/or 3D geometric data 946A) and data corresponding to a second facial feature (e.g., second 3D landmark data and/or 3D geometric data) can include one or more of distances, angles, positions, areas, or ratios of 3D information.

In some embodiments, the 3D landmark relationship data 947A can include data identifying a line or curve between one or more 3D points corresponding to a first facial feature and one or more 3D points corresponding to a second facial feature. For example, the 3D landmark relationship data 947A can include data identifying a distance between one or more points representing the left eye and one or more points representing the right eye (e.g., the distance between the left and right eye).

In some embodiments, the 3D landmark relationship data 947A can include data identifying a first line between two or more 3D points of a first facial feature and a second line between two or more 3D points of a second facial feature, and an angle(s) between the first line and the second line. For example, the 3D landmark relationship data 947A can include data identifying angle(s) between a horizontal plane that intersects the 3D points representing the right and left pupils, and a right eye line between 3D points representing the inner corner of the right eye and the outer corner of the right eye.

In some embodiments, the 3D landmark relationship data 947A can include data identifying a first measurement (e.g., size, length, depth, width, area, etc.) corresponding to a first facial feature (corresponding to one or more 3D points) and a second measurement corresponding to a second facial feature (corresponding to one or more 3D points), and a ratio between the first measurement and the second measurement. For example, the 3D landmark relationship data 947A can include data identifying a ratio between an eye size (represented by one or more 3D points representing the eye) and a mouth size (represented by one or more 3D points representing the mouth).

Additional details regarding the 3D landmark data 945A, 3D geometric data 946A, and 3D landmark relationship data 947A are described with reference to FIGS. 5A-B.

In some embodiments, variation information 940X can include information identifying one or more variations (e.g., differences) between a target face corresponding to a particular beauty target and a target face corresponding non-beauty target. As described above, a target face corresponding to the first beauty target can be represented by aggregating some or all the image output data of the first beauty target output data 940A (e.g., aggregating the first image output data 941A with Nth image output data, etc.). Thus, in some embodiments, variation information 940X can include information identifying differences between aggregated image output data (e.g., first image output data 941A through Nth image output data, etc.) of the first beauty target output data 940A, and aggregated image output data (e.g., first image output data 941A through Nth image output data, etc.) of the non-beauty target output data 940N.

In some embodiments, variation information 940X can be generated for each pairing between a respective beauty target and a non-beauty target. For example, the variation information 940X can be generated to include information identifying differences between first beauty target output data 940A (e.g., representing a first beauty target face) and non-beauty target output data 940N (e.g., representing a non-beauty target face). In another example, the variation information 940X can be generated to include information identifying differences between m-th beauty target output data 940M (e.g., representing an m-th beauty target face) and non-beauty target output data 940N (e.g., representing a non-beauty target face).

In some embodiments, variation information 940X can include information identifying differences between one or more elements of first beauty target output data 940A (aggregated or non-aggregated) and corresponding elements of non-beauty target output data 940N. For example, variation information 940X can include information identifying a difference between aggregated first beauty 2D facial feature data (e.g., similar to, or including 2D facial feature data 942A of the first beauty target output data 940A) and aggregated non-beauty 2D facial feature data (e.g., similar to, or including 2D facial feature data of the non-beauty target output data 940N (not illustrated)). In another example, variation information 940X can include information identifying a difference between first beauty 3D landmark data (e.g., similar to, or including 3D landmark data 945A of the first beauty target output data 940A), and non-beauty 3D landmark data (e.g., similar to, or including 3D landmark data of the non-beauty target output data 940N (not illustrated)).

In some embodiments, variation information 940X can include data representing a magnitude difference (e.g., such as a difference in x-, y-, z-coordinates of a particular facial feature of a beauty target face and a non-beauty target face respectively). In some embodiments, data identifying a magnitude difference can be a difference between elements of first beauty target output data 940A and corresponding elements of non-beauty target output data 940N. For example, a magnitude difference can be a difference in a width (e.g., magnitude) of a particular facial feature corresponding to a first beauty target output data 940A representing a first beauty target, in comparison to a width of the particular facial feature corresponding to the non-beauty target. For instance, variation information 940X may include data that indicates that a 3D width of the beauty target eye is three millimeters greater than the width of the non-beauty target eye.

In some embodiments, variation information 940X can include data representing a ratio difference (e.g., such as a difference in a size of a particular facial feature of a beauty target face and a non-beauty target face respectively). In some embodiments, data identifying a ratio difference can be a difference (e.g., a difference in size, etc.) between elements of first beauty target output data 940A and corresponding elements of non-beauty target output data 940N (e.g., a beauty target face and a non-beauty target face). For example, a ratio difference can be a difference between a beauty target ratio corresponding to a particular facial feature of the beauty target face and a non-beauty target ratio corresponding the particular facial feature of the non-beauty target face. For example, variation information 940X can include data that indicates an eye-to-nose size ratio of the first beauty target is 1:1.2, and an eye-to-nose size ratio of the non-beauty target is, for example, 1:1.3. The data included in the variation information can indicate that the non-beauty target ratio is 1.083 times greater (e.g., 1.3/1.2) than the beauty target ratio.

In some embodiments, variation information 940X can be generated as a target output 940 by training set generator 131 based the beauty target indication 930X. In some embodiments, the indication of a beauty target indication 930X can indicate to generate variation information 940X between a particular beauty target (e.g., first beauty target output data 940A) and non-beauty target output data 940N. As described above, beauty target indication 930X can include an indication of a beauty target corresponding to a particular beauty target (e.g., beauty target input data 930A-M). At inference, variation information 940X can be generated based on the selection information indicated in beauty target indication 930X.

Figure 10:
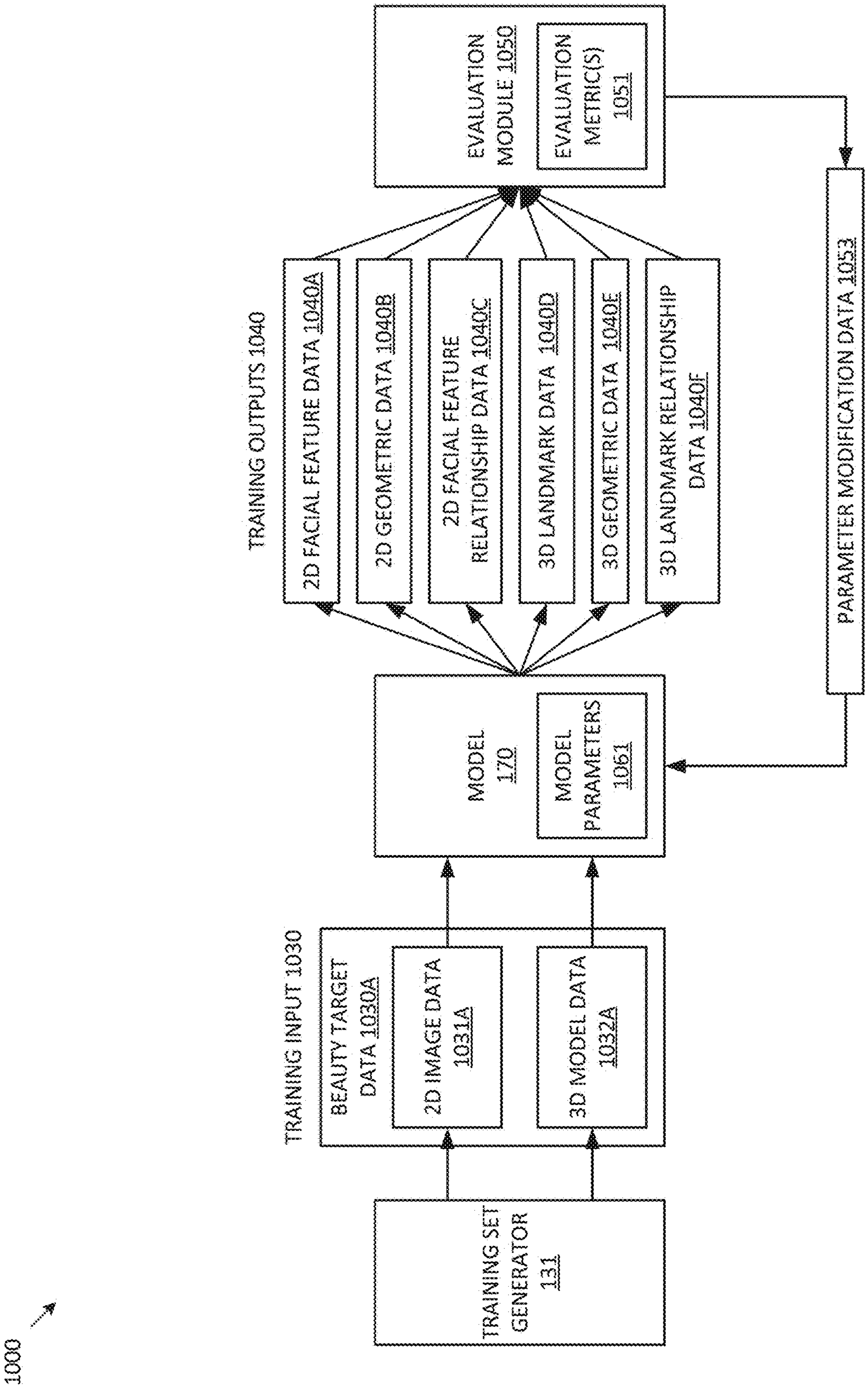
FIG. 10 is an example training set generator to create training data for a machine learning model using information pertaining to various beauty targets, in accordance with some embodiments of the disclosure.

FIG. 10 is an example system for training a machine learning model using information pertaining to various beauty targets, in accordance with embodiments of the disclosure. System 1000 illustrates a training set generator 131, training inputs 1030, generative machine learning model 170 with model parameters 1061, training outputs 1040, and evaluation module 1050 with evaluation metric 1051. System 1000 can include similar components as system 100, as described in FIG. 1. Components described with reference to system 100 of FIG. 1 can be used to describe system 1000 of FIG. 10. In some embodiments, the parameter modification data 1053 can be generated by evaluation module 1050 based on the evaluation metric 1051 and can be used as an input to generative machine learning model 170 and/or to alter one or more of the model parameters 1061. It can be noted that system 1000 can also be used in inference to, for example, generate new facial feature information.

In some embodiments, generative machine learning model 170 is a generative machine learning model. In some embodiments, generative machine learning model 170 is trained using unsupervised (e.g., learn patterns and information from data without explicit labeled output) or semi-supervised machine learning (e.g., where some of the input and/or output data is labeled (e.g., supervised) and some of the input and/or output data is not labeled (e.g., unsupervised)). In some embodiments, the generative machine learning model 170 can be trained to generate new data, such as computer-derived features, such as computer-derived 2D facial feature data, computer-derived 2D geometric data, computer-derived 2D facial feature relationship data, computer-derived 3D landmark data, computer-derived 3D geometric data, and computer-derived 3D landmark data. A computer-derived feature can refer to attributes or information, often about an individual's face, that is extracted, analyzed, recognized by a computer (e.g., processing device implementing digital image processing). In some embodiments, a computer-derived feature may be a feature that is generated by a machine learning model. In some embodiments, the computer-derived features may be generated by a machine learning model without direct human intervention. In some embodiments, the computer derived features can be new data and can include previously unknown features (e.g., 2D facial feature data, 3D landmark data, etc.) or unknown relationships between features (e.g., 2D facial feature relationship data, 3D landmark relationship data, etc.). It can be noted that although generative machine learning model 170 is described as a generative machine learning model, in some embodiments a discriminative machine learning model may be implemented.

In some embodiments, training inputs 1030 can be used as input to a machine learning model, such as generative machine learning model 170. In some embodiments, the training input 1030 can include beauty target data 1030A. In some embodiments, beauty target data 1030A can include one or more of 2D image data 1031A and 3D model data 1032A. 2D image data 1031A and 3D model data 1032A can be the same as, or similar to 2D image data 932A and 3D model data 933A respectively, as described above with reference to FIG. 9. As described above, in some embodiments, 3D model data 1032A can be generated from 2D image data 1031A that represents one or more 2D images. In some embodiments, 3D model data 1032A can be generated from 2D image data 1031A. While not illustrated here, 2D image data 1031A and 3D model data 1032A can represent multiple 2D images and 3D models, respectively, that can be used as input to the generative machine learning model 170. For example, 2D image data 1031A that represents multiple 2D images, and 3D model data 1032A that represents multiple 3D models generated using the 2D images can be used as beauty target data 1030A.

In some embodiments, the 2D image data 1031A and the 3D model data 1032A can be associated with labeled data. In some embodiments, the 2D image data 1031A and the 3D model data 1032A can be labeled by one or more human evaluators. For example, the 2D image data and 3D model data can be associated with one or more respective labels identifying one or more of 2D facial feature data, 2D geometric data, 2D facial feature relationships data, 3D landmark data, 3D geometric data, and 3D landmark data. In some embodiments, the labeled data can be used as evaluation metrics 1051 and compared to training outputs 1040.

In some embodiments, the 2D image data 1031A and the 3D model data 1032A can be preprocessed prior to being input to the generative machine learning model 170. In some embodiments, after the 3D model data 1032A is generated from the 2D image data 1031A, information from the 3D model data 1032A is used to add visual augmentations to the 2D image data 1031A (e.g., used to enhance the 2D image data 1031A). For example, information in the 3D model data 1032A associated with an outline of the eye, such as the curve of an eyelid, can be used to augment the 2D image data 1031A or 3D model data 1031A. In another example, information in the 3D model data 1032A associated with the shape of the face or shape of facial features (e.g., represented by 2D facial feature data 1040A) can be used to crop the 2D image (e.g., modify the 2D image data 1031A) to the shape of the face, or a particular facial feature. In some embodiments, a generative machine learning model (e.g., VLM) or discriminative machine learning model is used to determine whether the 2D image data 1031A or the 3D model data 1032A is to be included in model training data. In some embodiments, a human evaluator can manually perform any combination of these and other preprocessing techniques on the 2D image data 1031A and the 3D model data 1032A before the 2D image data 1031A and/or 3D model data 1032A are input into the generative machine learning model 170.

In some embodiments, the generative machine learning model 170 can be trained to generate training outputs 1040 based on one or more of the training inputs 1030. In some embodiments, training outputs 1040 include one or more of 2D facial feature data 1040A, 2D geometric data 1040B, 2D facial feature relationship data 1040C, 3D landmark data 1040D, 3D geometric data 1040E, and 3D landmark relationship data 1040F. In some embodiments, the generative machine learning model 170 can be trained to generate some or all of the training outputs 1040 for each instance of beauty target data 1030A. For instance, the generative machine learning model 170 can be trained to generate the 2D facial feature data 1040A for the training input of 2D image data 1031A. In some embodiments, multiple sets of 2D image data 1031A can be used as input to the generative machine learning model 170, and the generative machine learning model 170 can generate distinct outputs (e.g., training outputs 1040) for each distinct input of 2D image data 1031A. For example, 2D image data 1031A that represents a first 2D image and second 2D image data representing a second 2D image can be used as input for the generative machine learning model 170. The generative machine learning model 170 can generate a first 2D facial feature data (e.g., 2D facial feature data 1040A) corresponding to the first 2D image (e.g., represented by 2D image data 1031A) and a second 2D facial feature data corresponding to the second 2D image.

In some embodiments, the generative machine learning model 170 can include one or more of the model parameters 1061. The values of the model parameters 1061 can affect how the beauty target data 1030A generates the training outputs 1040. In some embodiments, as described above, the model parameters 1061 can be adjusted to adjust how the generative machine learning model 170 generates the training outputs 1040 from the training input 1030.

In some embodiments, the model parameters 1061 can be adjusted based on parameter modification data 1053 generated by evaluation module 1050. In some embodiments, evaluation module 1050 can receive the training outputs 1040 and determine whether the training outputs 1040 satisfy one or more of the evaluation metrics 1051.

In some embodiments, the evaluation metrics 1051 can include one of one or more ground truths corresponding to respective outputs (e.g., training outputs 1040), or training rule data identifying correct answers corresponding to the training outputs, and/or threshold data corresponding to the training outputs 1040. In some embodiments, the evaluation module 1050 can determine whether a particular training output represents a respective ground truth of the evaluation metrics 1051.

In some embodiments, the evaluation metrics 1051 can include a beauty threshold that corresponds to one or more of the training outputs 1040 (e.g., a 2D facial feature data beauty threshold, a 2D geometric data beauty threshold, etc.). For example, the beauty thresholds can be derived from a beauty target (e.g., a first beauty target as described with reference to FIG. 9). The training outputs 1040 can be compared to respective beauty thresholds.

In some embodiments, the evaluation module 1050 can perform reinforcement learning by rewarding the generative machine learning model 170 when one or more of the training outputs 1040 satisfies one or more of the corresponding evaluation metrics (e.g., evaluation metrics 1051), or penalizing the model when one or more of the training outputs 1040 does not satisfy one or more of the evaluation metrics 1051.

In some embodiments, evaluation metric 1051 can include a training rule represented by training rule data. In some embodiments, training rule data can include rules for the training outputs 1040. For example, training rule data can require that a first portion of a facial feature and a second portion of a facial feature have a minimum correspondence value. That is, that the first portion of a facial feature (e.g., a computer-defined facial feature) is sufficiently related to a second portion of the facial feature. For instance, if the generative machine learning model 170 identifies a facial feature (e.g., a computer derived facial feature represented by 2D facial feature data 1040A) as including the human-defined facial features of the "nose" and "mouth," training rule data from the evaluation metric 1051 can determine whether the first portion (e.g., the nose) and the second portion (e.g., the mouth) are sufficiently related (e.g., using metrics of similarity, proximity, shared 2D points and/or 3D landmarks, etc.).

In some embodiments, a portion of the processes of the evaluation module 1050 can be performed by a human reviewer. In some embodiments, the evaluation metric 1051 can include or reflect a human-derived metric. For example, one or more human evaluators can determine whether a particular training output matches a respective ground truth. For example, a human reviewer can indicate whether one or more of the training outputs 1040 satisfies a beauty threshold corresponding to a particular beauty target. In other embodiments, the evaluation metric 1051 can include a computer-derived metric.

In some embodiments, a portion of the processes of the evaluation module 1050 can be performed by users of a machine learning model 160. That is, users of the machine learning model 160 can provide feedback explicitly as prompted, or implicitly, by making one or more selections for beauty targets (e.g., with beauty target indication 930X), and the feedback received from users of the machine learning model 160 can be used to further train the generative model 170. In some embodiments, the generative machine learning model 170 is a model used to supplement or provide data to the machine learning model 160 (e.g., training data). That is, users of the machine learning model 160 do not directly interact with or use the generative machine learning model 170. However, the data collected from users using the machine learning model 160 can be used to improve the generative machine learning model 170. For example, if multiple users of the machine learning model 160 consistently select a certain beauty target (reflected by beauty target indication 930X), the selected beauty target can be used as a reference to further train the generative machine learning model 170 (e.g., the certain beauty target can be used as an input to generate refinement training data for the generative machine learning model 170).

In some embodiments, the evaluation module 1050 can generate parameter modification data 1053 based on whether one or more evaluation metrics 1051 were satisfied by the training outputs 1040. In some embodiments, if the training outputs 1040 do not satisfy one or more of the evaluation metrics 1051, the parameter modification data 1053 can reflect that the particular training output does not satisfy the evaluation metric 1051. In some embodiments, the parameter modification data 1053 can identify information to change one or more of the model parameters 1061 of generative machine learning model 170. In some embodiments, the parameter modification data 1053 can include new, or modified values for model parameters 1061. For example, parameter modification data 1053 can include replacement values for the model parameters 1061, or relative changes to values of the model parameters 1061. For instance, if a particular model parameter has a value of "X," the parameter modification data 1053 can indicate "+Y," such that once integrated, the particular model parameter can have a value of "X+Y."

Figure 11:
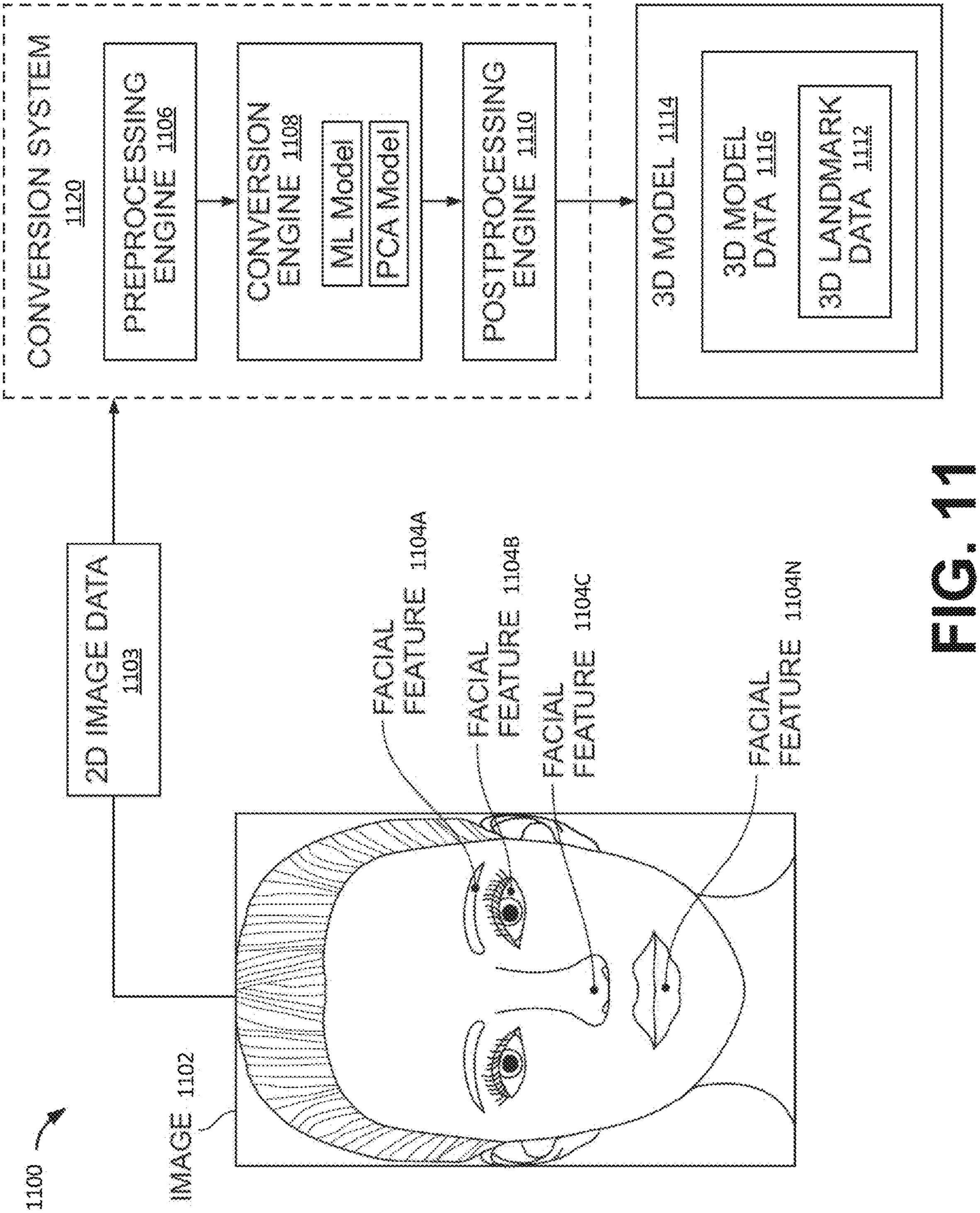
FIG. 11 is a block diagram of an example conversion system architecture for providing conversion of two-dimensional (2D) image data corresponding to a 2D image to a corresponding three-dimensional (3D) model, in accordance with some embodiments of the disclosure.

FIG. 11 is a block diagram of an example conversion system architecture 1100 for providing conversion of 2D image data corresponding to a 2D image to a corresponding 3D model, in accordance with embodiments of the disclosure. In some embodiments, conversion system 1120 can include one or more of preprocessing engine 1106, conversion engine 1108, and/or postprocessing engine 1110. In some embodiments, conversion system 1120 can use the 2D image data 1103 corresponding to image 1102 to generate the 3D model data 1116 of a 3D model 1114. In some embodiments, image 1102 is a 2D image that is represented by 2D image data 1103. As described above, in some embodiments, image 1102 can include an image of a subject's face or a part of the subject's face (e.g., an image of a subject's eye area).

Image 1102 may depict one or more facial features, such as facial features 1104A-N of the subject's face. As described above, a facial feature can refer to a physical characteristic or element that is part of a human face. Examples of facial features that may be depicted in image 1102 include eyebrow features (e.g., inner eyebrow, eyebrow apex, center eyebrow, outer eyebrow) represented by facial feature 1104A, eye features (e.g., pupil, inner eye, outer eye, upper lid, tightline) represented by facial feature 1104B, nose features (e.g., bridge, nostrils) represented by facial feature 1104C, lip features (e.g., upper lip, lower lip) represented by facial feature 1104N, mouth features (e.g., corner of the mouth), and so forth.

In some embodiments and as noted above, conversion system 1120 can use the 2D image data 1103 corresponding to the image 1102 as input to the conversion system 1120.

In some embodiments and as noted above, conversion system 1120 can use the 2D image data 1103 of image 1102 to generate information corresponding to 3D model 1114 (e.g., 3D model data 1116). As described above, 3D model 1114 can refer to a three-dimensional digital representation of a scene or object. The 3D model can be represented by 3D model data 1116. As described above, in some embodiments, one or more of vertices, edges and faces can define the geometry of a 3D model 1114.

As described above, in some embodiments, 3D model data 1116 of the 3D model 1114 includes material information that can influence the appearance of the 3D model 1114 at rendering (e.g., how light reflects from the material).

In some embodiments, the 3D model data 1116 of the 3D model 1114 can include landmark data, such as 3D landmark data 1112. In some embodiments, one or more landmarks can be represented by 3D landmark data 1112. As described above, a landmark can be represented by the grouping of points of the 3D model 1114 that represent the right eye, the inner corner of the eyes, the bridge of the nose, a centerline of a face, or some other facial feature.

In some embodiments, 3D landmark data 1112 can include information identifying one or more points of the 3D model 1114 (e.g., specific grouping of points and/or 3D coordinate data of the points) that correspond to a feature, such as a facial feature. In some embodiments, 3D landmark data 1112 can include information identifying the relationship between one or more points of a landmark. To identify the relationship between the one or more points of a landmark, the 3D landmark data 1112 can include information identifying one or more of edges, faces, geometric data, such as length, height, and depth, and/or ratios of geometric data. To identify the relationship between the one or more points of a landmark, the 3D landmark data 1112 can include one or more of absolute or relative values (e.g., deviations from average or template values). As described above, in some embodiments, 3D landmark data 1112 can include information identifying relationships between multiple landmarks.

In some embodiments, preprocessing engine 1106 of conversion system 1120 can perform one or more preprocessing operations on 2D image data 1103. In some embodiments, preprocessing engine can clean, transform, and/or organize the 2D image data 1103 of image 1102 in a manner suitable to be received by conversion engine 1108 (also referred to as "preprocessed 2D image data" herein). For example, preprocessing engine 1106 may scale or crop the image 1102 and generate corresponding 2D image data (e.g., preprocessed image data, such as 2D image data 1103). In some embodiments, preprocessing engine 1106 can convert image 1102 from an RGB color space to a grayscale color space, or vice versa. In some embodiments, preprocessing engine 1106 can convert image 1102 to a common or preferred format (e.g., JPEG).

In some embodiments, preprocessing engine 1106 may perform preprocessing with one or more machine learning (ML) models. For example, a machine learning (ML) model may be implemented to identify one or more facial features, such as facial features 1104A-N (which may be added to 2D image data 1103 (e.g., metadata) of image 1102). In another example, an ML model can be used to enhance contrast or resolution of image 1102. In some embodiments, an ML model can be used to remove objects or a background element from image 1102. For instance, an ML model can be used to remove glasses from a subject's face and fill the area where the glasses were removed with color and/or texture that is similar or that appears seamless with the surrounding area.

In an embodiment where conversion engine 1108 includes an ML model as described below, preprocessing engine 1106 may select or exclude various input images (e.g., image 1102) as part of a training procedure to achieve a desired effect in training the ML model of conversion engine 1108. In an embodiment, preprocessing engine 1106 may not be implemented, and 2D image data 1103 (e.g., raw 2D image data) of image 1102 may be provided as input to conversion engine 1108.

In some embodiments, conversion engine 1108 uses the 2D image data 1103 (e.g., raw, or preprocessed) to generate a 3D model 1114 (e.g., 3D model data 1116 of 3D model 1114). In some embodiments, conversion engine 1108 can generate the 3D model 1114 with or without postprocessing engine 1110.

In some embodiments, conversion engine 1108 can implement one or more techniques to convert the 2D image data 1103 to a 3D model 1114. In some embodiments, conversion engine 1108 may include an ML technique (e.g., statistical learning, deep learning, reinforcement learning, etc.) to convert the 2D image data 1103 into a 3D model 1114. For example, conversion engine 1108 may include a neural radiance field (NeRF) ML model. In another example, conversion engine 1108 may include an ML model based on differential rendering or inverse rendering techniques. ML models of conversion engine 1108 may operate in a training mode or an inference mode. In a training mode, 2D and/or 3D training data may be provided as input and/or output of the ML model for supervised or unsupervised training. In an inference mode, 2D image data 1103 may be provided as input to the ML model for generation of 3D model data 1116 of 3D model 1114 in accordance with previous training.

In some embodiments, conversion engine 1108 may include a principal component analysis (PCA) model (further described below with reference to FIGS. 13-14) to convert the 2D image data 1103 to a 3D model 1114.

In some embodiments, conversion engine 1108 may include a non-machine learning technique for converting the 2D image data 1103 into 3D model 1114. For example, conversion engine 1108 may include parametric techniques based on various mathematical or physical principals, heuristics, or similar. In some embodiments, conversion engine 1108 may include an ML module and/or a non-machine learning module for converting the 2D image data 1103 into 3D model data 1116 of 3D model 1114.

In some embodiments, postprocessing engine 1110 of conversion system 1120 can perform one or more postprocessing operations on 3D model data 1116 (e.g., also referred to as "postprocessed 3D model data" herein). In some embodiments, postprocessing engine 1110 can perform further analysis, refinement, transformations and/or other modifications of 3D model data 1116 received from conversion engine 1108. For example, postprocessing engine 1110 may generate a set of 3D landmark data of one or more landmarks corresponding to facial features by grouping particular vertices of the 3D model 1114 that represent respective landmarks. In another example, postprocessing engine 1110 can remove or modify the 3D model data 1116. In some embodiments, postprocessing engine can emphasize particular landmarks (e.g., weighting or PCA techniques) and/or define particular landmarks and/or remove particular landmarks and/or de-emphasize particular landmarks. In some embodiments, postprocessing engine 1110 is not implemented, and thus 3D landmark data 1112 can be generated by conversion engine 1108.

Figure 12:
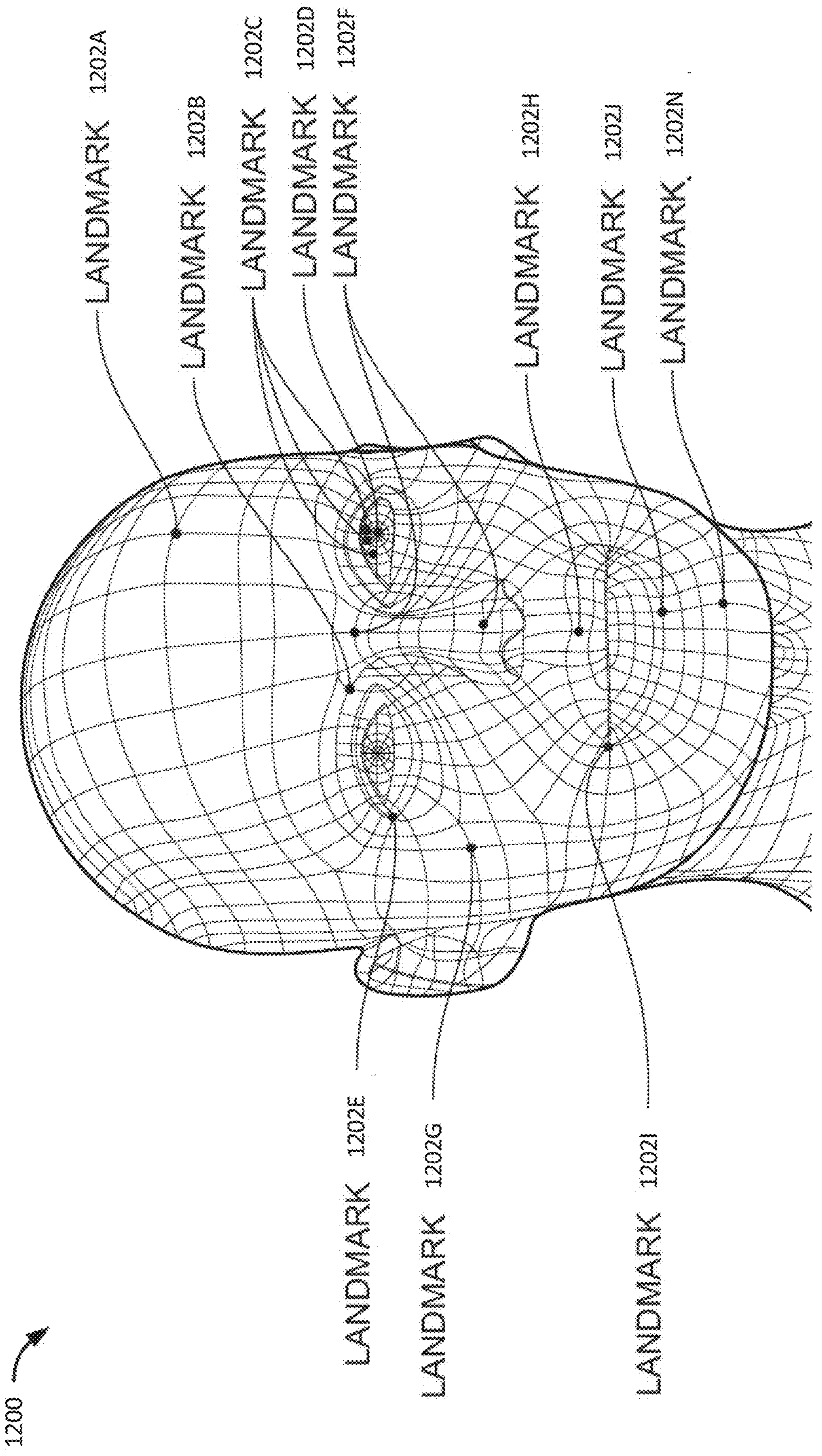
FIG. 12 depicts an example 3D model of the face of a subject, in accordance with some embodiments of the disclosure.

FIG. 12 depicts an example of a 3D model 1200 of a face of a subject, in accordance with embodiments of the disclosure. In some embodiments, 3D model 1200 (e.g., rendered 3D model) may, for the sake of illustration and not limitation, correspond to image 1102 of FIG. 11.

3D model data 1116 may be used to generate, render, or modify the 3D model 1200 to represent the subject's face. Landmarks 1202A-N of 3D model 1200 may correspond to and be represented by 3D landmark data 1112 of FIG. 11. As noted herein, landmarks can correspond to features such as facial features. For example, landmark 1202F can correspond to the bridge of the nose. Landmark 1202C can correspond to the lash line of the left eye. Landmark 1202D can correspond to the center point of the pupil of the left eye, and so forth.

In some embodiments, 3D model 1200 may correspond to various types of 3D modeling techniques. For example, in an embodiment, 3D model 1200 may be a mathematical model. In some embodiments, a mathematical model can include a parametric model where landmarks 1202A-N and other 3D features may be represented by mathematical functions such as one or more of points, lines, arcs, Bezier curves, functional manifolds, and so on. In another embodiment, 3D model 1200 may be a mesh model, a point cloud model, or similar model comprising multiple objects such as vertices, lines, and faces to represent the subject's face. Landmarks 1202A-N may correspond to one or more vertices, one or more lines, one or more faces, or sets thereof. In some embodiments, landmarks 1202A-N may share or overlap geometry. For example, two overlapping landmarks may share vertices, lines, etc. In another embodiment, 3D model 1200 may be an ML model, such as a neural radiance field model trained to produce 2D views of the subject's face from multiple positions in 3D space. Landmarks 1202A-N may correspond to weights, convolutional filters, or other aspects of the ML model (which can be captured in corresponding 3D model data). In another embodiment, 3D model 1200 may comprise multiple model representations, such as a parametric representation combined with a mesh representation or similar.

In an embodiment, 3D model 1200 may be a morphological model. A morphological model can represent the shape and structure of objects (e.g., human faces) using morphological data. In some embodiments, morphological data can describe the form and structural relationships between geometry (e.g., vertices, lines, planes and/or landmarks) of the model and enables manipulation of the geometry based on those relationships. In some embodiments, a morphological model may include a template model (e.g., 3D template model) of a human face. The template model may be initialized with template 3D model values (e.g., template landmark data) reflecting average values (e.g., average positions, sizes, colors, etc.) for an object, such as a human face. The template 3D model values may be derived from a representative collection of objects, such as human faces or features thereof. In some embodiments, the template model can be used as a reference model that can be compared to values representing a subject's unique face. In some embodiments, the comparison can generate difference information (e.g., metric) reflecting differences (e.g., deltas or deviations) between the template 3D model values, and in particular the template landmark data, and values representing corresponding points and/or facial features of the subject's face. The difference information can be stored as part of 3D landmark data 1112. To generate the 3D model of the subject's face, conversion system 1120 may adjust the template model based on the difference information corresponding to a particular subject, which can contribute to computational efficiency in generating a 3D model. In some embodiments, a morphological model can be used with a PCA model to generate a 3D model, as described further below.

Figure 13A:
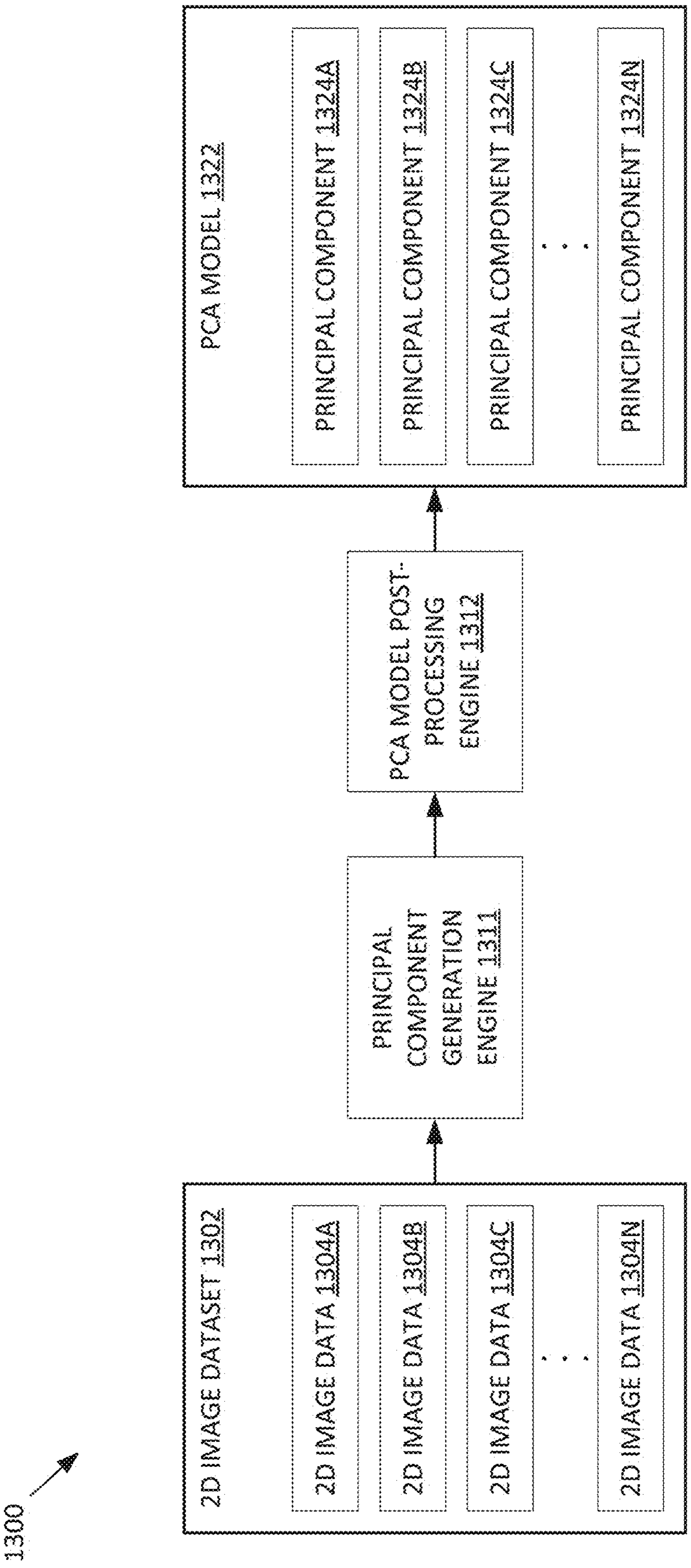
FIG. 13A is an example pipeline block diagram for a principal component analysis (PCA) model generation architecture to train a PCA model of principal components, in accordance with some embodiments of the disclosure.
Figure 13B:
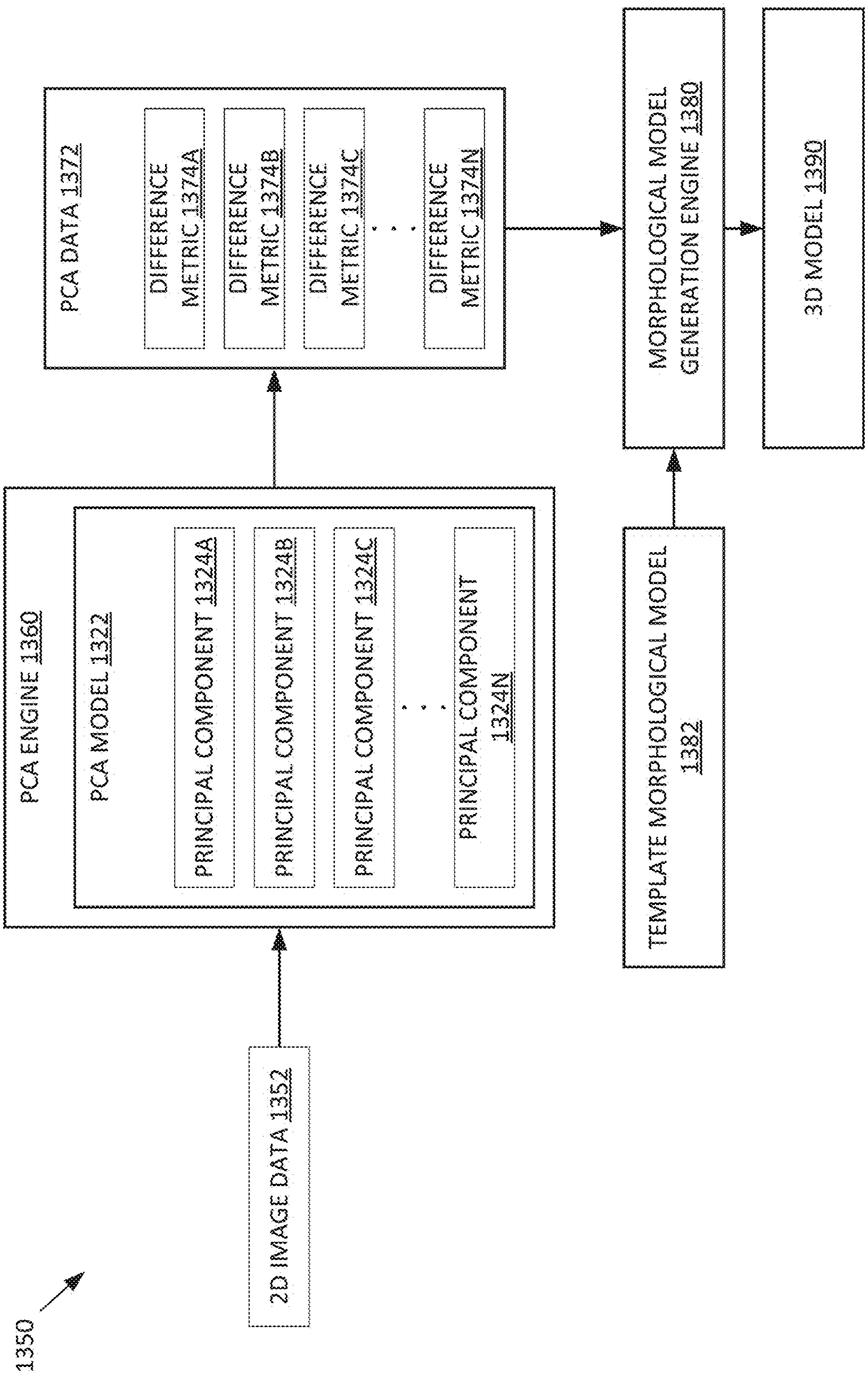
FIG. 13B is an example pipeline block diagram for generating a 3D model from 2D image data using a trained PCA model and a morphological model, in accordance with some embodiments of the disclosure.

FIG. 13A is an example pipeline block diagram of an architecture 1300 for a principal component analysis (PCA) model generation architecture to train a PCA model of principal components, in accordance with some embodiments. FIG. 13B is an example pipeline block diagram of a 3D model generation architecture 1350 for generating a 3D model from 2D image data using a trained PCA model and a morphological model.

In some embodiments, PCA can refer to a technique that can be used to transform a dataset into a new set of dimensions (principal components). The principal components may include linear combinations of original data features in the dataset. The combinations can be derived to capture variance (e.g., maximum variance) in the dataset. The principal components may be orthogonal (e.g., uncorrelated) and ranked according to the variance. In some embodiments, the resulting principal components can form, at least in part, a trained PCA model based on the dataset (the training data). The trained PCA model can be used to characterize or transform other data into respective principal components by projecting the other data onto the principal components of the trained PCA model. In some embodiments, PCA techniques can be used to transform features (e.g., facial features) of the original data, such as 2D image data, into a new set of principal components, which may be used to generate the 3D models and perform other analyses on the 2D image data.

Referring to FIG. 13A, architecture 1300 includes 2D image dataset 1302, principal component generation engine 1311, PCA model postprocessing engine 1312, and PCA model 1322. In some embodiments, 2D image dataset 1302 includes one or more 2D image data 1304A-N each corresponding to a respective 2D image. In some embodiments, each of 2D image data 1304A-N may correspond to a 2D image of a human face, such as image 1102 of FIG. 11. In some embodiments, 2D image dataset 1302 may be derived from a training set of 2D images of human faces, which may be manually or automatically curated. In some embodiments, and as described with reference to FIG. 11, the data of 2D image dataset 1302 may be preprocessed with various techniques to change resolutions, adjust color depths, prune undesirable image data, or similar.

In some embodiments, PCA model 1322 includes one or more principal components 1324A-N each associated with a feature, such as 2D facial feature. In some embodiments, a principal component of principal components 1324A-N may correspond to a human-derived facial feature, such as eye color, inner eye distance, eye angle, jaw shape, or similar. As described above, a human-derived facial feature can refer to a physical characteristic or element that is part of a human face and that naturally occurs on an individual's face and can be assessed or recognized by a human eye (e.g., human perception). In some embodiments, a principal component of principal components 1324A-N may correspond to a computer-derived facial feature, such as a correlation between multiple human-derived facial features (e.g., a correlation between inner eye distance and jaw shape), non-human derived facial features, or a combination thereof.

In some embodiments, a principal component of principal components 1324A-N may correspond to a computer-derived facial feature. A computer-derived facial feature can refer to attributes or information about an individual's face that is extracted, analyzed, or recognized by a computer (e.g., processing device implementing digital image processing). A computer-derived facial feature may not be assessed or recognized by a human eye. In some embodiments, the computer-derived facial feature is generated by an algorithm (e.g., PCA model, machine learning model, etc.). In some embodiments, the computer-derived facial feature is generated by an algorithm without human intervention. In some embodiments, the principal components of a trained PCA model 1322 (including principal components corresponding to human-derived and/or computer-derived features) may represent an average or template set of facial features based on the variance of facial features present in 2D image dataset 1302. A difference (e.g., difference metric) between an individual subject's facial feature and the principal component template can thus be expressed as a weight (e.g., a multiplier or a difference) of the corresponding principal component (e.g., the facial features is stronger/weaker than average as indicated by a larger/smaller weight or a positive/negative weight), as described below with reference to FIG. 13B.

In some embodiments, PCA model 1322 can be generated or trained by one or more of principal component generation engine 1311 or PCA model postprocessing engine 1312. In some embodiments, principal components 1324A-N may be derived from 2D image dataset 1302 using PCA training techniques. In some embodiments, 2D image dataset 1302 may be modified to elicit select principal components. In some embodiments, 2D image dataset 1302 may be modified to elicit principal components corresponding to human-derived facial features. For example, a dataset representing human faces may be manually or automatically chosen (e.g., by preprocessing engine 1306) to encourage identification of specific human-derived facial features. A feedback loop may be used with multiple generation cycles in principal component generation engine 1311 to refine the dataset and/or resulting principal components. In some embodiments, the principal components may be selected, modified, pruned, or a combination thereof to retain principal components corresponding to one or criteria such as human-derived facial features. For example, principal components corresponding to computer-derived features may be manually or automatically removed (e.g., by PCA model postprocessing engine 1312 or postprocessing engine 1310) to obtain PCA model 1322. In another example, principal components associated with different 2D image datasets (e.g., 2D image dataset 1302) may be combined to form a composite PCA model (e.g., a PCA model 1322) corresponding to human-derived facial features, where principal components 1324A-N of the composite model may not necessarily be orthogonal (e.g., uncorrelated) to each other as would be expected in a set of principal components derived from a single dataset.

Referring to FIG. 13B, 3D model generation architecture 1350 includes 2D image data 1352, PCA engine 1360, PCA data 1372, morphological model generation engine 1380, template morphological model 1382, and 3D model 1390. In some embodiments, 2D image data 1352 may correspond to an image of a scene or object, such as a subject's face (e.g., image 1102 of FIG. 11). In some embodiments, PCA engine 1360 includes PCA model 1322 of FIG. 13A, with each principal component 1324A-N corresponding to a facial feature as previously described. In some embodiments, PCA engine 1360 can be used to transform or project the 2D image data 1352 into the facial feature eigenspace of PCA model 1322 (or non-eigenspace for a composite PCA model, such as a PCA model 1322 as previously described) to generate PCA data 1372. PCA engine 1360 may perform a set of operations (e.g., a set of dot product operations) to perform the projection. In some embodiments, PCA engine 1360 may correspond to conversion system 1120 of FIG. 11.

In some embodiments, PCA data 1372 may include difference metrics 1374A-N (also referred to as "difference information" herein) representing the projection of 2D image data 1352 over each of principal components 1324A-N. A difference metric of difference metrics 1374A-N may correspond to a deviation (or delta, weight, strength, prominence, or other metric) of a facial feature of 2D image data 1352 from an average or template value represented by the corresponding principal component of principal components 1324A-N. For example, difference metric 1374A may represent a deviation of the subject's inner eye distance from the average distance within the images associated with 2D image dataset 1302. As previously described, difference metrics 1374A-N may correspond to a multiplier, difference, or other operation with respect to the template facial features represented by principal components 1324A-N.

In some embodiments, template morphological model 1382 may correspond to a generic 3D model of an object, such as a human face (e.g., 3D model 1114 of FIG. 11). The 3D landmark data of the generic 3D model can each correspond to a principal component of principal components 1324A-N and an average or template value associated with the corresponding principal component. In some embodiments, template morphological model 1382 may be generated or configured (e.g., manually, or automatically) based on principal components 1324A-N such that each landmark represents the average facial feature of the corresponding principal component. In some embodiments, each landmark may correspond to one or more vertices, lines, faces, or other geometry of the model associated with the landmark's facial feature, and landmarks may share geometry. Template morphological model 1382 may further be configured such that a landmark may be modified (e.g., morphed) based on a difference metric of PCA data 1372. For example, a landmark may be associated with a control variable that modifies the landmark to increase or decrease the prominence (or other metric) of the corresponding facial feature. The geometry associated with the landmark will be modified as a result. In an example, a vertex of template morphological model 1382 located at the inner corner of the eye may be associated with both an inner eye distance landmark (corresponding to an inner eye distance facial feature) and an eye angle landmark (corresponding to an eye angle facial feature). Morphing the control variables of either landmark may change the coordinates of the vertex.

In some embodiments, PCA data 1372 and template morphological model 1382 may be provided as input to morphological model generation engine 1380 for generation of 3D model 1390. 3D model 1390 can be similar to 3D model 1114 of FIG. 11, unless otherwise described. Morphological model generation engine 1380 may use difference metrics 1374A-N of PCA data 1372 to modify the corresponding landmarks of template morphological model 1382 to generate in 3D model 1390 that is representative of the subject's face. For example, a control variables of template morphological model 1382 may be multiplied by or added to respective ones of difference metrics 1374A-N to accurately represent the subject's unique facial features in 3D model 1390.

Figure 14A:
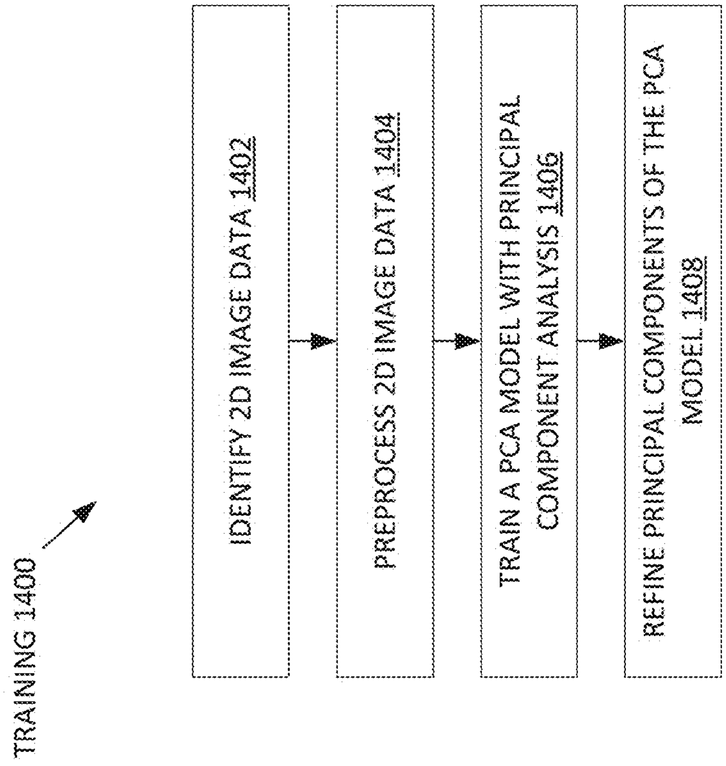
FIG. 14A illustrates a flow diagram of an example method for training a PCA model, in accordance with some embodiments of the disclosure.
Figure 14B:
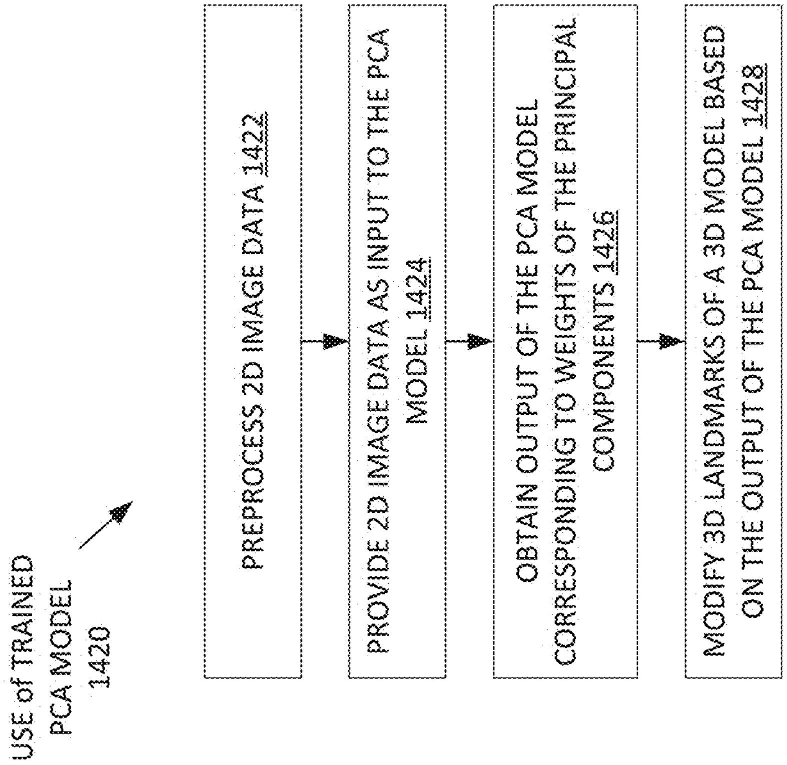
FIG. 14B illustrates a flow diagram of an example method for using a trained PCA model, in accordance with some embodiments of the disclosure.

FIG. 14A illustrates a flow diagram of an example of a method 1400 for training a PCA model, in accordance with embodiments of the disclosure. FIG. 14B illustrates a flow diagram of an example of a method 1420 for using a trained PCA model, in accordance with embodiments of the disclosure. Methods 1400 and 1420 may be performed by processing logic that may comprise hardware (e.g., circuitry, dedicated logic, etc.), computer-readable instructions such as software or firmware (e.g., run on a general-purpose computing system or a dedicated machine), or a combination thereof. Methods 1400 and 1420 may also be associated with sets of instructions stored on a non-transitory computer-readable medium (e.g., magnetic, or optical disk, etc.). The instructions, when executed by a processing device, may cause the processing device to perform operations comprising the blocks of methods 1400 and 1420. In an embodiment, methods 1400 and 1420 are performed by system 100 of FIG. 1. In an embodiment, blocks of a particular method depicted in FIGS. 14A-B can be performed simultaneously or in different orders than depicted. Various embodiments may include additional blocks not depicted in FIGS. 14A-B or a subset of blocks depicted in FIGS. 14A-B.

Referring to FIG. 14A, at block 1402, processing logic identifies 2D image data, which may correspond to images of human faces. For example, processing logic may identify the 2D image data 1303 corresponding to one or more images 1302. The 2D images of human faces may be images of a training set, which may be manually or automatically curated.

At block 1404, the processing logic preprocesses the 2D image data. For example, preprocessing engine 1306 may select 2D image data to elicit human-derived principal components corresponding to human-derived facial features as described above with reference to FIG. 13. Other preprocessing may occur at block 1404, such as normalizing the 2D image data, cropping the 2D image data to consistent dimensions, augmenting the 2D image data to generate additional training data, etc.

At block 1406, the processing logic trains a PCA model with principal component analysis techniques using the 2D image data from the previous blocks. In some embodiments, the resulting principal components of the trained PCA model may correspond to human-derived facial features or computer-derived facial features or a combination thereof. In an embodiment, blocks 1404-1406 may be repeated in a loop to achieve desired principal components (e.g., corresponding to human-derived facial features) as described above with reference to FIGS. 12A-B.

At block 1408, processing logic refines the principal components of the PCA model. For example, postprocessing engine 1310 may prune or modify non-human-derived principal components or may combine human-derived components from different training blocks (e.g., each block 1406 associated with a different training set of 2D image data).

Referring to FIG. 14B, at block 1422, processing logic preprocesses input 2D image data (e.g., corresponding to an image of a subject's face). For example, preprocessing engine 1306 may normalize the input 2D image data, flatten it to a vector, or perform other preprocessing operations.

At block 1424, processing logic provides the preprocessed 2D image data as input to the trained PCA model.

At block 1426, processing logic obtains an output of the PCA model corresponding to weights of the principal components. For example, in blocks 1424 and 1426, the preprocessed input 2D image data may be projected onto the eigenspace defined by the principal components, and the weights indicating the deviation of the input 2D image data from the training set (e.g., difference metrics) may be obtained from the projection.

At block 1428, the processing logic modifies landmarks of a 3D model (e.g., a morphological model of a template face) based on the output of the PCA model. For example, landmarks 1202A-N of 3D model 1200 may be modified based on a deviation (e.g., difference metrics) from the template model indicated by the weights obtained at block 1426.

Figure 15:
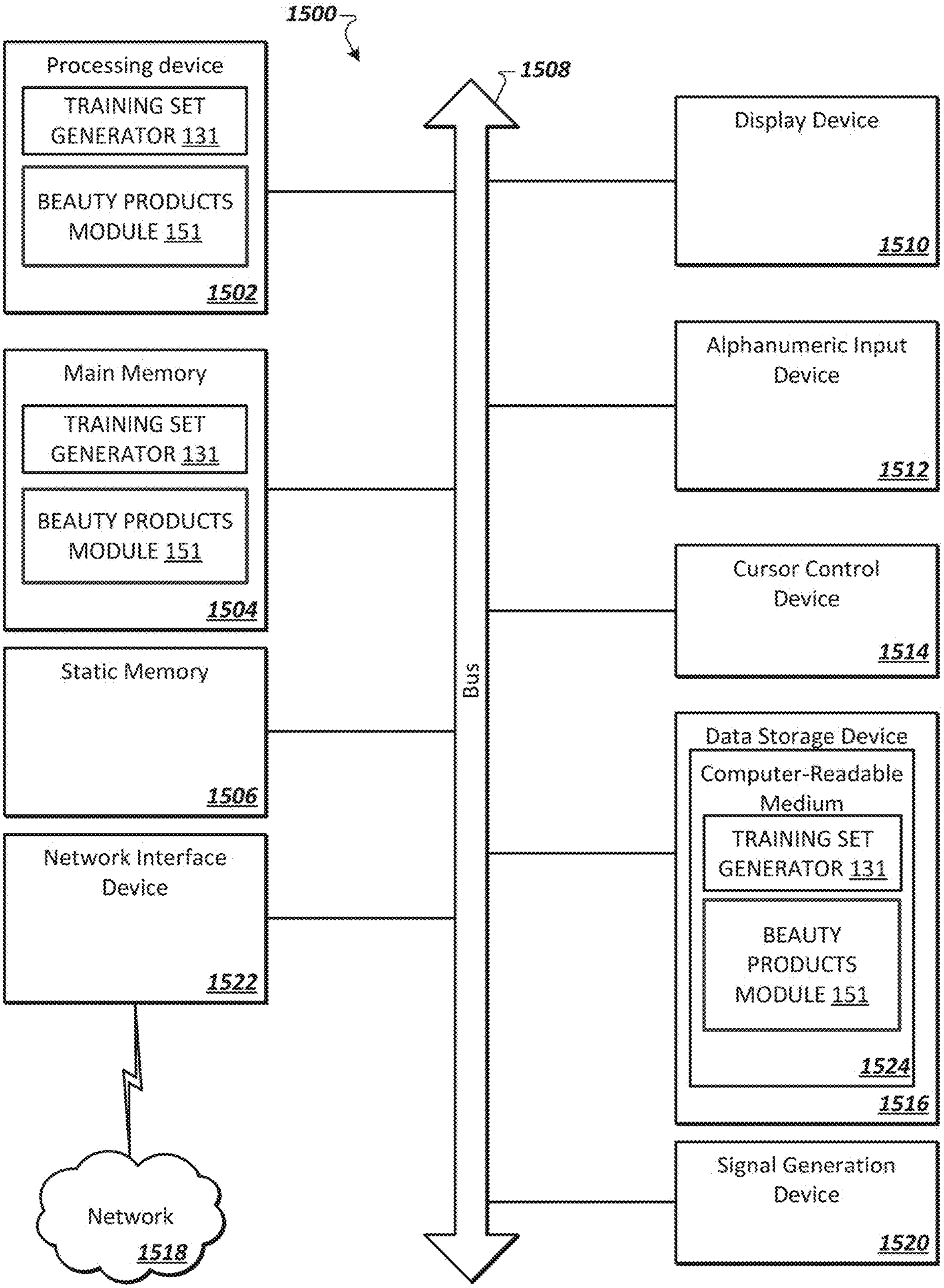
FIG. 15 is a block diagram illustrating an exemplary computer system, in accordance with some embodiments of the disclosure.

FIG. 15 is a block diagram illustrating an exemplary computer system, system 1500, in accordance with embodiments of the disclosure. The system 1500 executes one or more sets of instructions that cause the machine to perform any one or more of the methodologies discussed herein. Set of instructions, instructions, and the like can refer to instructions that, when executed system 1500, cause the system 1500 to perform one or more operations of training set generator 131 or beauty products module 151. The machine can operate in the capacity of a server or a client device in client-server network environment, or as a peer machine in a peer-to-peer (or distributed) network environment. The machine can be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The system 1500 includes a processing device 1502, a main memory 1504 (e.g., read-only memory (ROM), flash memory, dynamic random-access memory (DRAM) such as synchronous DRAM (SDRAM) or Rambus DRAM (RDRAM), etc.), a static memory 1506 (e.g., flash memory, static random-access memory (SRAM), etc.), and a data storage device 1516, which communicate with each other via a bus 1508.

The processing device 1502 represents one or more general-purpose processing devices such as a microprocessor, central processing unit, or the like. More particularly, the processing device 1502 can be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 1502 can also be one or more special-purpose processing devices such as an application specific integrated circuit (ASIC), a field programmable gate array (FPGA), a digital signal processor (DSP), network processor, or the like. The processing device 1502 is configured to execute instructions of the system 100A or system 100B and the training set generator 131 or beauty products module 151 for performing the operations discussed herein.

The system 1500 can further include a network interface device 1522 that provides communication with other machines over a network 1518, such as a local area network (LAN), an intranet, an extranet, or the Internet. The system 1500 also can include a display device 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1520 (e.g., a speaker).

The data storage device 1516 can include a computer-readable storage medium 1524 on which is stored the sets of instructions of the system 100A or system 100B and of training set generator 131 or of beauty products module 151 embodying any one or more of the methodologies or functions described herein. The computer-readable storage medium 1524 can be a non-transitory computer-readable storage medium. The sets of instructions of the system 100 and of training set generator 131 or of beauty products module 151 can also reside, completely or at least partially, within the main memory 1504 and/or within the processing device 1502 during execution thereof by the system 1500, the main memory 1504 and the processing device 1502 also constituting computer-readable storage media. The sets of instructions can further be transmitted or received over the network 1518 via the network interface device 1522.

While the example of the computer-readable storage medium 1524 is shown as a single medium, the term “computer-readable storage medium” can include a single medium or multiple media (e.g., a centralized or distributed database, and/or associated caches and servers) that store the sets of instructions. The term “computer-readable storage medium” can include any medium that is capable of storing, encoding, or carrying a set of instructions for execution by the machine and that cause the machine to perform any one or more of the methodologies of the disclosure. The term “computer-readable storage medium” can include, but not be limited to, solid-state memories, optical media, and magnetic media.

In the foregoing description, numerous details are set forth. It will be apparent, however, to one of ordinary skill in the art having the benefit of this disclosure, that the disclosure can be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise, it is appreciated that throughout the description, discussions utilizing terms such as “generating,” “providing,” “obtaining,” “identifying,” “determining,” or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus can be specially constructed for the required purposes, or it can include a general-purpose computer selectively activated or reconfigured by a computer program stored in the computer. Such a computer program can be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words “example” or “exemplary” are used herein to mean serving as an example, instance, or illustration. Any aspect or design described herein as “example’ or “exemplary” is not necessarily to be construed as preferred or advantageous over other aspects or designs. Rather, use of the words “example” or “exemplary” is intended to present concepts in a concrete fashion. As used in this application, the term “or” is intended to mean an inclusive “or” rather than an exclusive “or.” That is, unless specified otherwise, or clear from context, “X includes A or B” is intended to mean any of the natural inclusive permutations. That is, if X includes A; X includes B; or X includes both A and B, then “X includes A or B” is satisfied under any of the foregoing instances. In addition, the articles “a” and “an” as used in this application and the appended claims can generally be construed to mean “one or more” unless specified otherwise or clear from context to be directed to a singular form. Moreover, use of the term “an implementation” or “one implementation” or “an embodiment” or “one embodiment” throughout is not intended to mean the same implementation or embodiment unless described as such. The terms “first,”

"second," "third," "fourth," etc. as used herein are meant as labels to distinguish among different elements and cannot necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure can, therefore, be determined with reference to the appended claims, along with the full scope of equivalents to which such claims are entitled.

What is claimed is:

1. A method comprising:

receiving, by a processing device, first two-dimensional (2D) image data corresponding to a first 2D image of exterior facial features of a human face of a subject;

identifying, among a plurality of target models, first metrics corresponding to a first target model of a target human face, wherein the first metrics identify a first ratio of a first target exterior facial feature to a second target exterior facial feature of the target human face;

generating, based on the first 2D image data, second metrics that represent one or more exterior facial features of the human face of the subject, wherein the second metrics identify a second ratio of a first exterior facial feature of the one or more exterior facial features to a second exterior facial feature of the one or more exterior facial features of the human face of the subject;

determining variation information identifying one or more differences between the first metrics corresponding to the first target model of the target human face and the second metrics that represent the one or more exterior facial features of the human face of the subject, wherein the variation information identifies a difference between the first ratio and the second ratio; and providing, to a client device, a notification reflecting the variation information.

2. The method of claim 1, wherein the notification identifies user instructions pertaining to an application of a beauty product to decrease the one or more differences.

3. The method of claim 1, further comprising:

generating, based on the variation information, a visual indicator that reflects the one or more differences between the first metrics corresponding to the first target model of the target human face and the second metrics that represent the one or more exterior facial features of the human face of the subject; and generating the notification by compositing the visual indicator with the first 2D image of the human face of the subject.

4. The method of claim 3, wherein the first target model is a first target 3D model, the method further comprising:

wherein generating, based on the first 2D image data, the second metrics that represent the one or more exterior facial features of the human face of the subject comprises: generating, using the first 2D image data, a first three-dimensional (3D) model of the human face of the subject, wherein the second metrics correspond to the first 3D model;

wherein generating the visual indicator comprises: generating a modified 3D model of the human face of the subject based on the first 3D model of the human face of the subject and the first target 3D model of the target human face, the modified 3D model comprising a region corresponding to the one or more differences between the first metrics corresponding to the first target 3D model and the second metrics corresponding to the first 3D model; and wherein generating the notification by compositing the visual indicator on the first 2D image of the human face of the subject comprises: compositing the modified 3D model with the first 2D image of the human face.

5. The method of claim 4, wherein generating the first 3D model of the human face of the subject, comprises:

identifying a landmark corresponding to an exterior facial feature of the one or more exterior facial features of the human face of the subject.

6. The method of claim 5, wherein generating the modified 3D model of the human face comprises:

determining a difference between the landmark corresponding to the exterior facial feature of the human face of the subject and a target landmark of the first target 3D model of the target human face, wherein the target landmark corresponds to the landmark.

7. The method of claim 3, further comprising:

receiving second 2D image data corresponding to a second 2D image of the human face of the subject, the second 2D image of the human face comprising a representation of a beauty product applied at a region of the human face of the subject;

generating, based on the second 2D image data, third metrics that represent the one or more exterior facial features with the applied beauty product;

determining additional variation information identifying one or more additional differences between the first metrics corresponding to the first target model and the third metrics that represent the one or more exterior facial features with the applied beauty product;

generating, based on the additional variation information, an additional visual indicator that reflects the one or more additional differences between the first metrics and the third metrics; and generating the notification by compositing the additional visual indicator to the second 2D image of the human face of the subject.

8. The method of claim 1, wherein identifying, among the plurality of target models, the first metrics corresponding to the first target model of the target human face comprises:

providing an indication of the plurality of target models for user selection at the client device; and receiving, from the client device, an indication of a user selection of the first target model from the plurality of target models.

9. The method of claim 1, wherein generating, based on the first 2D image data, the second metrics that represent the one or more exterior facial features of the human face of the subject, comprises:

providing the first 2D image data as input to a machine learning model; and obtaining one or more outputs of the machine learning model, the one or more outputs identifying the second metrics.

10. A system comprising:

a memory device; and a processing device coupled to the memory device, the processing device to perform operations comprising:

receiving first two-dimensional (2D) image data corresponding to a first 2D image of exterior facial features of a human face of a subject;

identifying, among a plurality of target models, first metrics corresponding to a first target model of a target human face, wherein the first metrics identify a first ratio of a first target exterior facial feature to a second target exterior facial feature of the target human face;

generating, based on the first 2D image data, second metrics that represent one or more exterior facial features of the human face of the subject, wherein the second metrics identify a second ratio of a first exterior facial feature of the one or more exterior facial features to a second exterior facial feature of the one or more exterior facial features of the human face of the subject;

determining variation information identifying one or more differences between the first metrics corresponding to the first target model of the target human face and the second metrics that represent the one or more exterior facial features of the human face of the subject, wherein the variation information identifies a difference between the first ratio and the second ratio; and providing, to a client device, a notification reflecting the variation information.

11. The system of claim 10, wherein the notification identifies user instructions pertaining to an application of a beauty product to decrease the one or more differences.

12. The system of claim 10, the operations further comprising:

generating, based on the variation information, a visual indicator that reflects the one or more differences between the first metrics corresponding to the first target model of the target human face and the second metrics that represent the one or more exterior facial features of the human face of the subject; and generating the notification by compositing the visual indicator with the first 2D image of the human face of the subject.

13. The system of claim 12, wherein the first target model is a first target 3D model, the operations further comprising:

wherein generating, based on the first 2D image data, the second metrics that represent the one or more exterior facial features of the human face of the subject comprises: generating, using the first 2D image data, a first three-dimensional (3D) model of the human face of the subject, wherein the second metrics correspond to the first 3D model;

wherein generating the visual indicator comprises: generating a modified 3D model of the human face of the subject based on the first 3D model of the human face of the subject and the first target 3D model of the target human face, the modified 3D model comprising a region corresponding to the one or more differences between the first metrics corresponding to the first target 3D model and the second metrics corresponding to the first 3D model; and wherein generating the notification by compositing the visual indicator on the first 2D image of the human face of the subject comprises: compositing the modified 3D model with the first 2D image of the human face.

14. The system of claim 12, the operations further comprising:

receiving second 2D image data corresponding to a second 2D image of the human face of the subject, the second 2D image of the human face comprising a representation of a beauty product applied at a region of the human face of the subject;

generating, based on the second 2D image data, third metrics that represent the one or more exterior facial features with the applied beauty product;

determining additional variation information identifying one or more additional differences between the first metrics corresponding to the first target model and the third metrics that represent the one or more exterior facial features with the applied beauty product;

generating, based on the additional variation information, an additional visual indicator that reflects the one or more additional differences between the first metrics and the third metrics; and generating the notification by compositing the additional visual indicator to the second 2D image of the human face of the subject.

15. A non-transitory computer-readable medium comprising instructions that, when executed by a processing device, cause the processing device to perform operations comprising:

receiving first two-dimensional (2D) image data corresponding to a first 2D image of exterior facial features of a human face of a subject;

identifying, among a plurality of target models, first metrics corresponding to a first target model of a target human face, wherein the first metrics identify a first ratio of a first target exterior facial feature to a second target exterior facial feature of the target human face;

generating, based on the first 2D image data, second metrics that represent one or more exterior facial features of the human face of the subject, wherein the second metrics identify a second ratio of a first exterior facial feature of the one or more exterior facial features to a second exterior facial feature of the one or more exterior facial features of the human face of the subject;

determining variation information identifying one or more differences between the first metrics corresponding to the first target model of the target human face and the second metrics that represent the one or more exterior facial features of the human face of the subject, wherein the variation information identifies a difference between the first ratio and the second ratio; and providing, to a client device, a notification reflecting the variation information.

16. The non-transitory computer-readable medium of claim 15, wherein the notification identifies user instructions pertaining to an application of a beauty product to decrease the one or more differences.

17. The non-transitory computer-readable medium of claim 15, further comprising:

generating, based on the variation information, a visual indicator that reflects the one or more differences between the first metrics corresponding to the first target model of the target human face and the second metrics that represent the one or more exterior facial features of the human face of the subject; and generating the notification by compositing the visual indicator with the first 2D image of the human face of the subject.

18. The non-transitory computer-readable medium of claim 17, wherein the first target model is a first target 3D model, the operations further comprising:

wherein generating, based on the first 2D image data, the second metrics that represent the one or more exterior facial features of the human face of the subject comprises: generating, using the first 2D image data, a first three-dimensional (3D) model of the human face of the subject, wherein the second metrics correspond to the first 3D model;

wherein generating the visual indicator comprises: generating a modified 3D model of the human face of the subject based on the first 3D model of the human face of the subject and the first target 3D model of the target human face, the modified 3D model comprising a region corresponding to the one or more differences between the first metrics corresponding to the first target 3D model and the second metrics corresponding to the first 3D model; and wherein generating the notification by compositing the visual indicator on the first 2D image of the human face of the subject comprises: compositing the modified 3D model with the first 2D image of the human face.

19. The non-transitory computer-readable medium of claim 17, further comprising:

receiving second 2D image data corresponding to a second 2D image of the human face of the subject, the second 2D image of the human face comprising a representation of a beauty product applied at a region of the human face of the subject;

generating, based on the second 2D image data, third metrics that represent the one or more exterior facial features with the applied beauty product;

determining additional variation information identifying one or more additional differences between the first metrics corresponding to the first target model and the third metrics that represent the one or more exterior facial features with the applied beauty product;

generating, based on the additional variation information, an additional visual indicator that reflects the one or more additional differences between the first metrics and the third metrics; and generating the notification by compositing the additional visual indicator to the second 2D image of the human face of the subject.

* * * * *